United States Patent
Rosenblatt et al.

(10) Patent No.: US 8,401,681 B2
(45) Date of Patent: Mar. 19, 2013

(54) SYSTEM AND METHOD FOR PLACESHIFTING MEDIA PLAYBACK

(75) Inventors: Michael Rosenblatt, Campbell, CA (US); Gloria Lin, San Ramon, CA (US); Amir Mahmood Mikhak, Cambridge, MA (US); Taido Lantz Nakajima, Cupertino, CA (US); Sean Anthony Mayo, Dover, NH (US); Andrew Hodge, Palo Alto, CA (US); Anthony Michael Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1070 days.

(21) Appl. No.: 12/286,509

(22) Filed: Sep. 30, 2008

(65) Prior Publication Data

US 2010/0082136 A1   Apr. 1, 2010

Related U.S. Application Data

(60) Provisional application No. 61/059,804, filed on Jun. 8, 2008.

(51) Int. Cl.
*G06F 17/00* (2006.01)
*H04B 5/00* (2006.01)
*H04R 27/00* (2006.01)
*H02B 1/00* (2006.01)

(52) U.S. Cl. ............ 700/94; 455/41.1; 381/85; 381/123

(58) Field of Classification Search .................... 700/94; 709/231; 455/41.1, 41.2; 381/85, 123
See application file for complete search history.

(56) References Cited

U.S. PATENT DOCUMENTS

| | | | |
|---|---|---|---|
| 4,701,601 A | 10/1987 | Francini et al. |
| 4,868,376 A | 9/1989 | Lessin et al. |
| 4,929,819 A | 5/1990 | Collins, Jr. |
| 5,239,167 A | 8/1993 | Kipp |
| 5,276,311 A | 1/1994 | Hennige |
| 5,540,301 A | 7/1996 | Dumont |
| 5,634,052 A | 5/1997 | Morris |
| 5,917,913 A | 6/1999 | Wang |
| 6,175,922 B1 | 1/2001 | Wang |
| 6,311,180 B1 | 10/2001 | Fogarty |
| 6,311,214 B1 | 10/2001 | Rhoads |
| 6,343,316 B1 | 1/2002 | Sakata |

(Continued)

FOREIGN PATENT DOCUMENTS

| CN | 1697426 A | 11/2005 |
|---|---|---|
| EP | 1331561 A2 | 7/2003 |

(Continued)

OTHER PUBLICATIONS

Ticketmaster UK & Live Nation Introduce State of the Art Access Control in Live Nation Theatres; Ticketmaster Press Release; Jul. 28, 2008.

(Continued)

*Primary Examiner* — Jesse Elbin
(74) *Attorney, Agent, or Firm* — Fish & Richardson P.C.

(57) ABSTRACT

Systems and methods of placeshifting media playback between two or more devices are provided. For example, a method for placeshifting media may include sending a first message from a media-receiving electronic device to a media-playing electronic device playing a media file and receiving a response identifying the media file and a point at which the media file was being played when the first message was received. The media-receiving electronic device may play a copy of the media file at the point where the media-playing electronic device left off.

30 Claims, 54 Drawing Sheets

U.S. PATENT DOCUMENTS

| | | |
|---|---|---|
| 6,400,270 B1 | 6/2002 | Person |
| 6,542,927 B2 | 4/2003 | Rhoads |
| 6,553,236 B1 | 4/2003 | Dunko et al. |
| 6,684,269 B2 | 1/2004 | Wagner |
| 6,694,387 B2 | 2/2004 | Wagner |
| 6,874,037 B1 | 3/2005 | Abram et al. |
| 6,910,697 B2 | 6/2005 | Varatharajah et al. |
| 7,008,322 B1 | 3/2006 | Suzuki et al. |
| 7,024,364 B2 | 4/2006 | Guerra et al. |
| 7,089,214 B2 | 8/2006 | Wang |
| 7,128,274 B2 | 10/2006 | Kelley et al. |
| 7,149,503 B2 | 12/2006 | Aarnia et al. |
| 7,240,036 B1 | 7/2007 | Mamdani et al. |
| 7,251,561 B2 | 7/2007 | Dotan et al. |
| 7,286,818 B2 | 10/2007 | Rosenberg |
| 7,316,347 B2 | 1/2008 | Poor |
| 7,325,068 B2 | 1/2008 | Roberts et al. |
| 7,334,728 B2 | 2/2008 | Williams |
| 7,376,591 B2 | 5/2008 | Owens |
| 7,398,298 B2 | 7/2008 | Koch |
| 7,437,428 B1 | 10/2008 | Muti et al. |
| 7,464,050 B1 | 12/2008 | Deaton et al. |
| 7,509,679 B2 | 3/2009 | Alagna et al. |
| 7,533,349 B2 | 5/2009 | Saul et al. |
| 7,610,296 B2 | 10/2009 | Hughes et al. |
| 7,730,164 B1 | 6/2010 | Palaniappan |
| 7,747,797 B2 | 6/2010 | Abraham et al. |
| 7,818,734 B2 | 10/2010 | Giannini et al. |
| 7,899,829 B1 | 3/2011 | Malla |
| 7,904,622 B2 | 3/2011 | Paulos et al. |
| 7,917,034 B2 | 3/2011 | Yu et al. |
| 7,920,169 B2 | 4/2011 | Jung et al. |
| 7,941,167 B2 | 5/2011 | Xu et al. |
| 7,941,197 B2 | 5/2011 | Jain et al. |
| 7,942,337 B2 | 5/2011 | Jain |
| 7,948,925 B2 | 5/2011 | Miyabayashi et al. |
| 7,959,065 B2 | 6/2011 | Rosenblatt et al. |
| 8,060,627 B2 | 11/2011 | Rosenblatt et al. |
| 8,131,645 B2 | 3/2012 | Lin et al. |
| 8,215,546 B2 | 7/2012 | Lin et al. |
| 8,239,276 B2 | 8/2012 | Lin et al. |
| 2002/0049640 A1 | 4/2002 | Sheriff et al. |
| 2002/0082931 A1 | 6/2002 | Siegel et al. |
| 2002/0174243 A1* | 11/2002 | Spurgat et al. ............. 709/231 |
| 2002/0178088 A1 | 11/2002 | Lurie et al. |
| 2002/0198965 A1 | 12/2002 | Kraft |
| 2003/0033214 A1 | 2/2003 | Mikkelsen et al. |
| 2003/0105812 A1 | 6/2003 | Flowers et al. |
| 2003/0145056 A1 | 7/2003 | Fujisawa et al. |
| 2004/0064642 A1 | 4/2004 | Roskind |
| 2004/0117804 A1 | 6/2004 | Scahill et al. |
| 2004/0203352 A1 | 10/2004 | Hall et al. |
| 2004/0203636 A1 | 10/2004 | Chan et al. |
| 2005/0049937 A1 | 3/2005 | Sanders |
| 2005/0116027 A1 | 6/2005 | Aigiene et al. |
| 2005/0125343 A1 | 6/2005 | Mendelovich |
| 2005/0131871 A1 | 6/2005 | Howard et al. |
| 2005/0222961 A1 | 10/2005 | Staib et al. |
| 2005/0232247 A1 | 10/2005 | Whitley et al. |
| 2006/0058948 A1 | 3/2006 | Blass et al. |
| 2006/0095514 A1 | 5/2006 | Wang et al. |
| 2006/0111944 A1 | 5/2006 | Sirmans et al. |
| 2006/0129829 A1 | 6/2006 | Aaron et al. |
| 2006/0168574 A1 | 7/2006 | Giannini et al. |
| 2006/0176305 A1 | 8/2006 | Arcas et al. |
| 2006/0213972 A1 | 9/2006 | Kelley et al. |
| 2006/0243609 A1 | 11/2006 | Cole et al. |
| 2006/0266822 A1 | 11/2006 | Kelley et al. |
| 2006/0287004 A1 | 12/2006 | Fuqua |
| 2007/0019616 A1 | 1/2007 | Rantapuska et al. |
| 2007/0022058 A1 | 1/2007 | Labrou et al. |
| 2007/0026826 A1* | 2/2007 | Wilson ..................... 455/130 |
| 2007/0043670 A1 | 2/2007 | Dionne |
| 2007/0043678 A1 | 2/2007 | Dionne |
| 2007/0150369 A1 | 6/2007 | Zivin |
| 2007/0161382 A1 | 7/2007 | Melinger et al. |
| 2007/0161402 A1 | 7/2007 | Ng. et al. |
| 2007/0173266 A1 | 7/2007 | Barnes, Jr. |
| 2007/0174246 A1 | 7/2007 | Sigurdsson et al. |
| 2007/0190939 A1 | 8/2007 | Abel |
| 2007/0205275 A1 | 9/2007 | Nicola et al. |
| 2007/0226384 A1 | 9/2007 | Robbin et al. |
| 2007/0228179 A1 | 10/2007 | Atkinson |
| 2007/0235539 A1 | 10/2007 | Sevanto et al. |
| 2007/0239725 A1 | 10/2007 | Bhat et al. |
| 2007/0255652 A1 | 11/2007 | Tumminaro et al. |
| 2007/0265033 A1 | 11/2007 | Brostrom |
| 2007/0278290 A1 | 12/2007 | Messerges et al. |
| 2008/0005195 A1 | 1/2008 | Li |
| 2008/0030309 A1 | 2/2008 | Darrouzet |
| 2008/0034133 A1 | 2/2008 | Thomas et al. |
| 2008/0052243 A1 | 2/2008 | Narayanaswami et al. |
| 2008/0059323 A1 | 3/2008 | Chang et al. |
| 2008/0066181 A1 | 3/2008 | Haveson et al. |
| 2008/0081558 A1* | 4/2008 | Dunko et al. ............. 455/41.1 |
| 2008/0113614 A1 | 5/2008 | Rosenblatt |
| 2008/0154734 A1 | 6/2008 | Fernandez et al. |
| 2008/0155057 A1 | 6/2008 | Khedouri et al. |
| 2008/0155615 A1 | 6/2008 | Craner et al. |
| 2008/0184127 A1* | 7/2008 | Rafey et al. ............... 715/736 |
| 2008/0195735 A1 | 8/2008 | Hodges et al. |
| 2008/0205291 A1 | 8/2008 | Li et al. |
| 2008/0301580 A1 | 12/2008 | Alams et al. |
| 2008/0320560 A1 | 12/2008 | Casey et al. |
| 2009/0003240 A1 | 1/2009 | Negron et al. |
| 2009/0061925 A1 | 3/2009 | Finkelstein et al. |
| 2009/0111378 A1 | 4/2009 | Sheynman et al. |
| 2009/0248913 A1 | 10/2009 | Salokannel |
| 2009/0276439 A1 | 11/2009 | Rosenblatt et al. |
| 2009/0276547 A1 | 11/2009 | Rosenblatt et al. |
| 2009/0282102 A1* | 11/2009 | Geurts et al. ............. 709/204 |
| 2009/0282130 A1 | 11/2009 | Antoniou et al. |
| 2010/0027966 A1 | 2/2010 | Harrang et al. |
| 2010/0078471 A1 | 4/2010 | Lin et al. |
| 2010/0078472 A1 | 4/2010 | Lin et al. |
| 2010/0080201 A1 | 4/2010 | Rosenblatt et al. |
| 2010/0081375 A1 | 4/2010 | Rosenblatt et al. |
| 2010/0081385 A1 | 4/2010 | Lin et al. |
| 2010/0082444 A1 | 4/2010 | Lin et al. |
| 2010/0082445 A1 | 4/2010 | Hodge et al. |
| 2010/0082448 A1 | 4/2010 | Lin et al. |
| 2010/0082455 A1 | 4/2010 | Rosenblatt et al. |
| 2010/0082481 A1 | 4/2010 | Lin et al. |
| 2010/0082485 A1 | 4/2010 | Lin et al. |
| 2010/0082490 A1 | 4/2010 | Rosenblatt et al. |
| 2010/0082491 A1 | 4/2010 | Rosenblatt et al. |
| 2010/0082567 A1 | 4/2010 | Rosenblatt et al. |
| 2010/0082784 A1 | 4/2010 | Rosenblatt et al. |
| 2010/0203833 A1 | 8/2010 | Dorsey |
| 2010/0256251 A1 | 10/2010 | Dyer et al. |
| 2010/0257251 A1 | 10/2010 | Mooring et al. |
| 2011/0041063 A1 | 2/2011 | Lee et al. |
| 2011/0066691 A1 | 3/2011 | Jideani |

FOREIGN PATENT DOCUMENTS

| | | |
|---|---|---|
| JP | 2005236629 A | 2/2005 |
| JP | 2006244514 A | 9/2006 |
| JP | 2007274556 | 10/2007 |
| JP | 11232226 A | 6/2011 |
| KR | 1020050078341 A | 5/2005 |
| KR | 100733742 B1 | 6/2007 |
| WO | 02/08863 A2 | 1/2002 |
| WO | 2006116368 | 11/2006 |
| WO | 2007137626 | 12/2007 |
| WO | 2008/112497 A1 | 9/2008 |
| WO | 2009/018255 A2 | 2/2009 |

OTHER PUBLICATIONS

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

Access Files on a PC with Mobilefile, 2002, pp. 1-4.

Rogers, Ready for the Net?—Network managers struggle to meet new bandwidth demands, 1996, pp. 1-3.

BART NFC trial first to use mobile phones to pay for fares, food. Contactless News. Published Jan. 29, 2008. Retrieved Dec. 17, 2008. Retrieved from the Internet:URL<http://www.contactlessnews.com/2008/01/29/bart-nfc-trial-first-to-use-mobile-phones-to-pay-for-fares-food/>, 5 Pages.

Configuring Remote Desktop, Microsoft TechNet. Published Nov. 3, 2005, Retrieved Aug. 26, 2012. Retrieved from the Internet: URL<http://technet.mircrosoft.com/en-us/library/bb457106(d=printer).aspx>, pp. 1-16.

HOWTO: Copy and Paste between Local and Remote Desktop, Black God: Bits and Bytes of Life. Published Jan. 3, 2007, Retrieved Aug. 27, 2012. Retrieved from the internet: URL< http://karuppuswamy.com/wordpress/2007/01/03/howto-copy-paste-between-local-and-remote-desktop>, p. 1.

How-To Geek, View Last Modified Files on Windows Vista, Published Oct. 3, 2007, Retrieved Aug. 18, 2011. URL< http://www.howtogeek.com/howto/windows-vista/view-last-modified-files-on-windows-vista/>, pp. 1-2.

Jaquette, George. Configuring QuickBooks 2007 on a Network. Technical White Paper, v. 1.1. Published Oct. 16, 2006, pp. 1-13.

Mobiqa, Mobile barcode solutions, Where Would You Like to Go? Retrieved Jan. 20, 2009. Retrieved from the Internet: URL<http://www.mobiqa.com>, 1 Page.

Mobiqa Airlines; Mobilising the business. Retrieved Jan. 20, 2009. Retrieved from the Internet: URL<http://www.mobiqa.com/airlines/>, 2 Pages.

Mobiqa Cinema; mobi ticket™ coming to a cinema near you. Retrieved Jan. 20, 2009. Retrieved from the Internet: URL<http://www.mobiqa.com/cinema/ >, 2 Pages.

Mobiqa Live Events; mobi ticket™ let me entertain you. Retrieved Jan. 20, 2009. Retrieved from the Internet: URL<http://www.mobiqa.com/live/ >, 2 Pages.

Mobiqa Rail; Keep on track with mobi ticket™. Retrieved Jan. 20, 2009. Retrieved from the Internet: URL<http://www.mobiqa.com/rail/ >, 2 Pages.

Mobiqa Retail; Shop for success with mobi coupon™. Retrieved Jan. 20, 2009. Retrieved from the Internet: URL<http://www.mobiqa.com/retail/ >, 2 Pages.

Near Field Communication in the real world part I, Turning the NFC promise into profitable, everyday applications. Innovation Research & Technology plc. Gloucestershire, United Kingdom. Published Aug. 2006. Retrieved from the Internet: URL<http://www.nfc-forum.org/resources/white_papers/Innovision_whitePaper1.pdf>, 13 Pages.

Near Field Communication in the real world part II, Using the right NFC tag type for the right NFC application. Innovation Research & Technology plc; Gloucestershire, United Kingdom. Published Dec. 2006. Retrieved from the Internet: URL<http://www.nfc-forum.org/resources/white_papers/Innovision_whitePaper2.pdf>. 13 pages.

Near Field Communication in the real world part III, Moving to System on Chip (SoC) integration. Innovation Research & Technology plc; Gloucestershire, United Kingdom. Published Mar. 2007. Retrieved from the Internet: URL<http://www.nfc-forum.org/resources/white_papers/Innovision_whitePaper3.pdf>, 10 pages.

New NFC trial launched in Spokane. Contactless News. Published Jan. 28, 2008. Retrieved Dec. 17, 2008. Retrieved from the Internet:URL<http://www.contactlessnews.com/2008/01/28/new-nfc-trial-launched-in-spokane/>, 5 pages.

Near Field Communication and the NFC Forum: The Keys to Truly Interoperable Communications. NFC Forums. Wakefield, MA, USA. Published Oct. 31, 2007. Retrieved from the Internet:URL<http://www.nfc-forum.org/resources/white_papers/nfc_forum_marketing_white_paper.pdf>, 10 pages.

NFC trial in NYC enables merchant and transit payment via cell phones. Contactless News. Published Dec. 14, 2006. Retrieved Dec. 17, 2008. Retrieved from the Internet:URL<http://www.contactlessnes.com/2006/12/14/nfc-trial-in-nyv-enables-merchant-and-transit-paymnets-via-cell-phones>, 4 Pages.

Translation of Chinese Office Action issued in Chinese application No. 200980121533.2, Oct. 9, 2012, 10 pages.

Port Authority, NK TRANSIT to test contactless cards. Contactless News. Published Feb. 25, 2008. Retrieved Dec. 17, 2008. Retrieved from the Internet:URL<http://www.contactlessnews.com/2008/02/25/port-authority-nj-transit-to-test-contactless-cards/>, 4 pages.

QuickBooks Remote Data Sharing, Published Feb. 18, 2004, Retrieved Aug. 16, 2011. Retrieved from the Internet: URL<http://web.archive.org/web/20041022211147/ http://www.support.tabs3.com/main/R10884.htm>, pp. 1-7.

Ricker, Thomas; Nokia's 6212 with Bluetooth NFC: Let the pairing revolution begin! Engadget. Published Apr. 15, 2008. Retrieved Dec. 17, 2008. Retrieved from the Internet:URL<http://www.engadget.com/2008/04/15/nokias-6212-with-bluetooth-nfc-let-the-pairing-revolution-begi/>, 4 pages.

International Search Report and Written Opinion for PCT Application No. PCT/US2009/043349 filed May 8, 2009, sent Nov. 13, 2009. 12 pages.

* cited by examiner

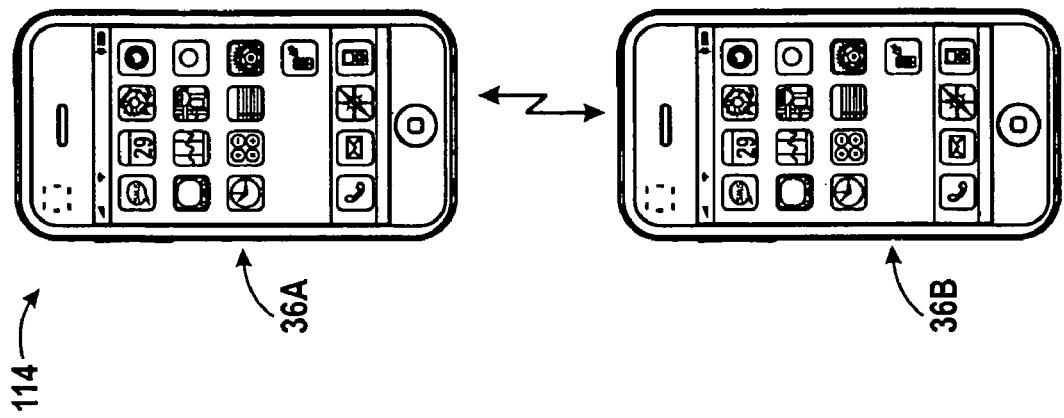
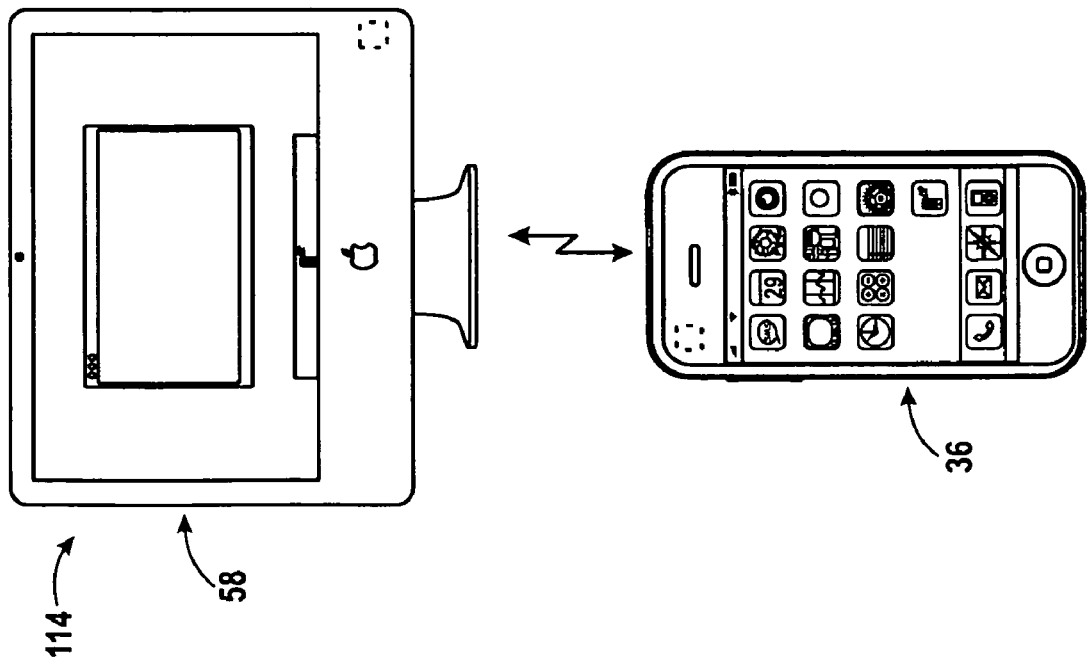

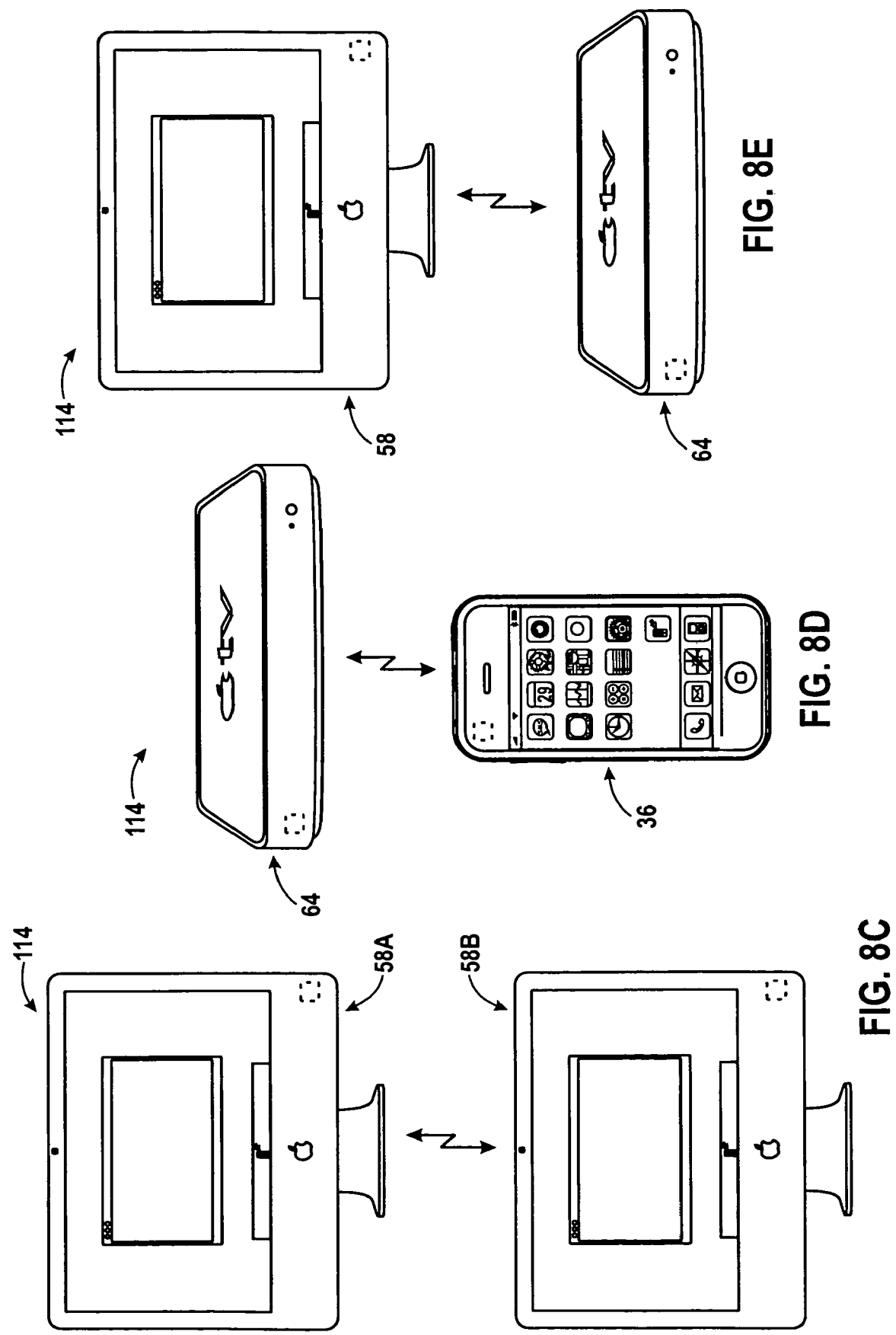

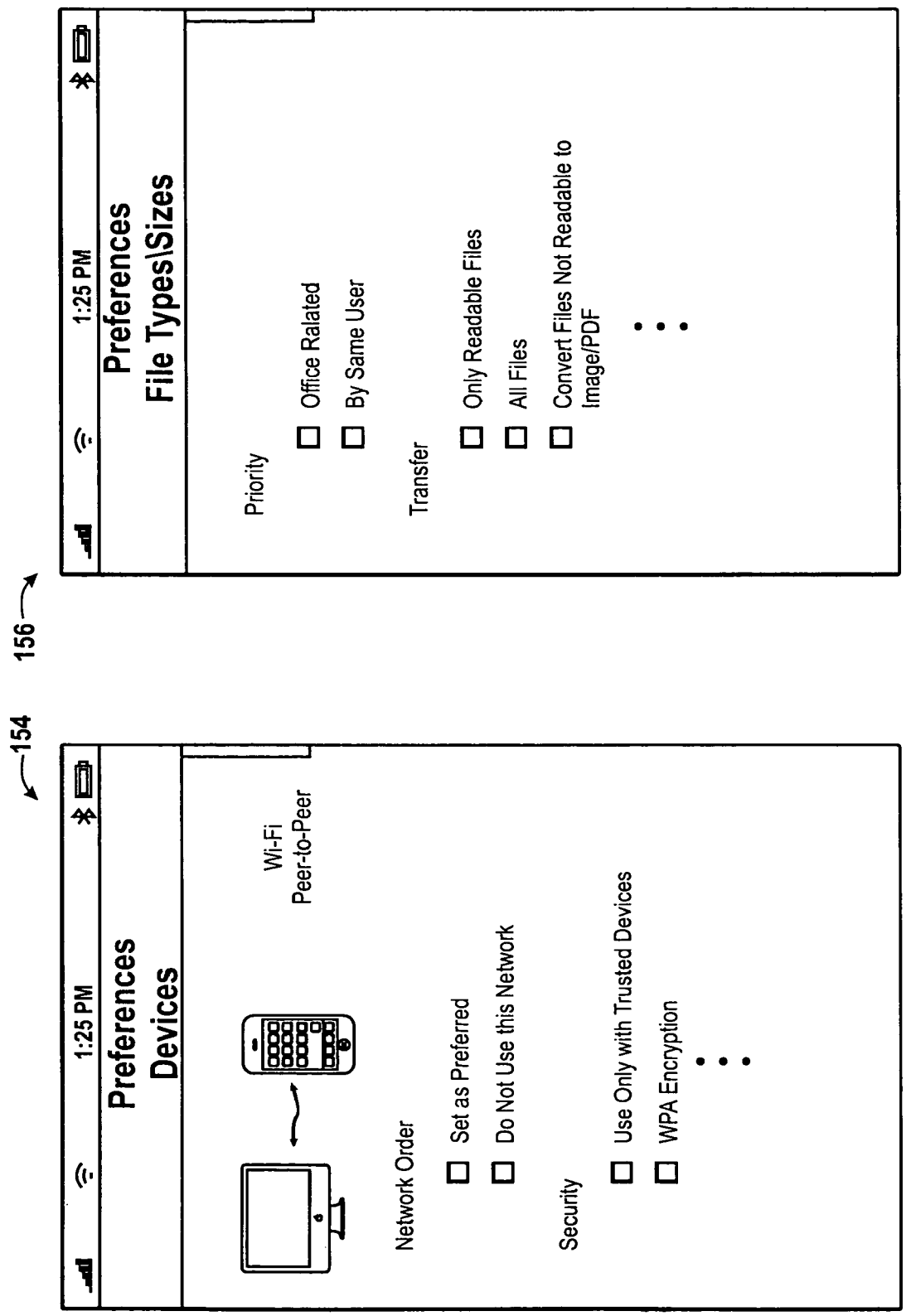

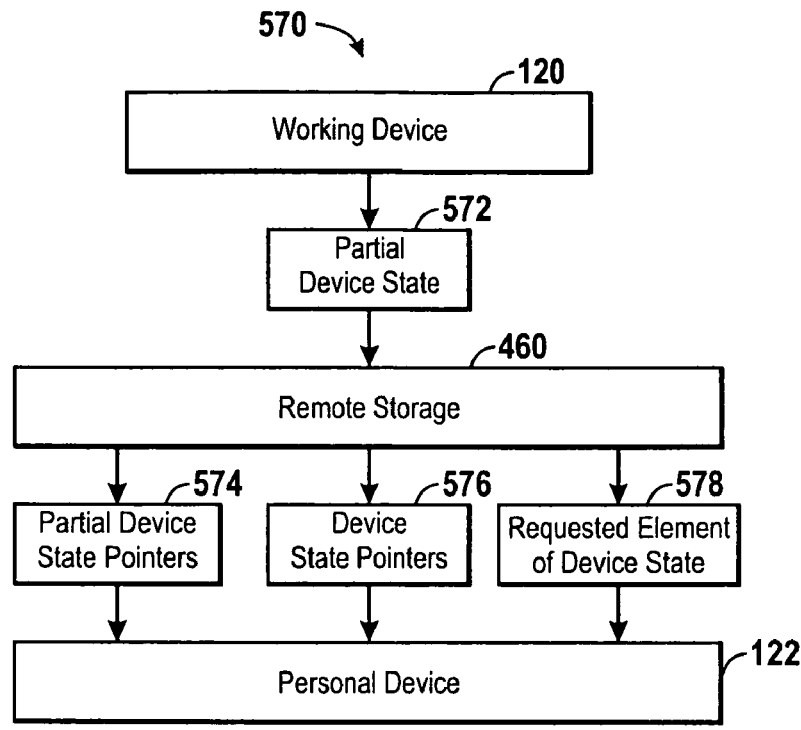
FIG. 37
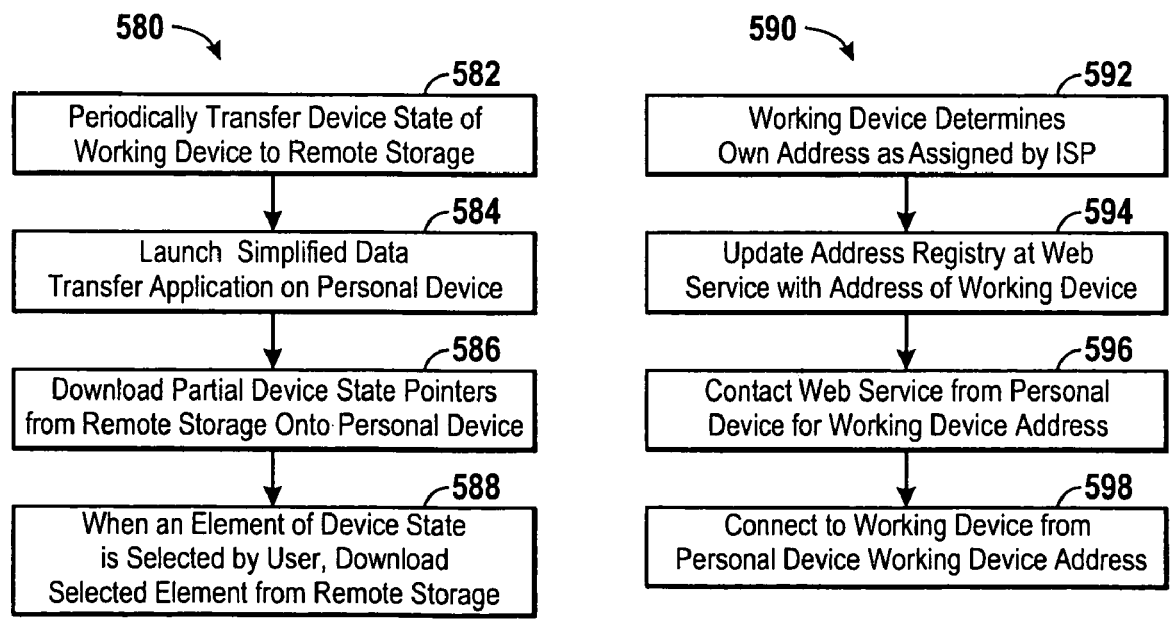
FIG. 38
FIG. 39

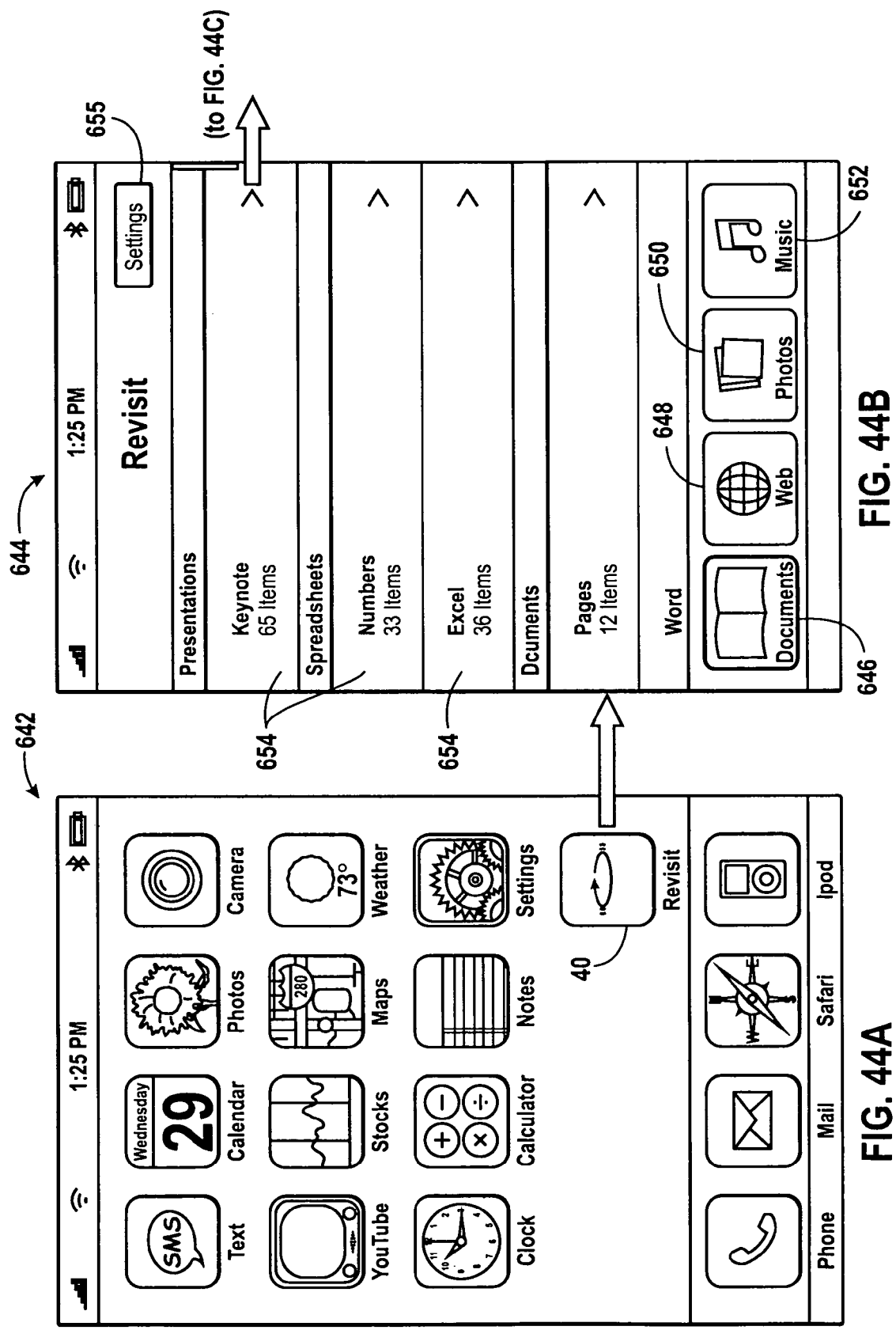

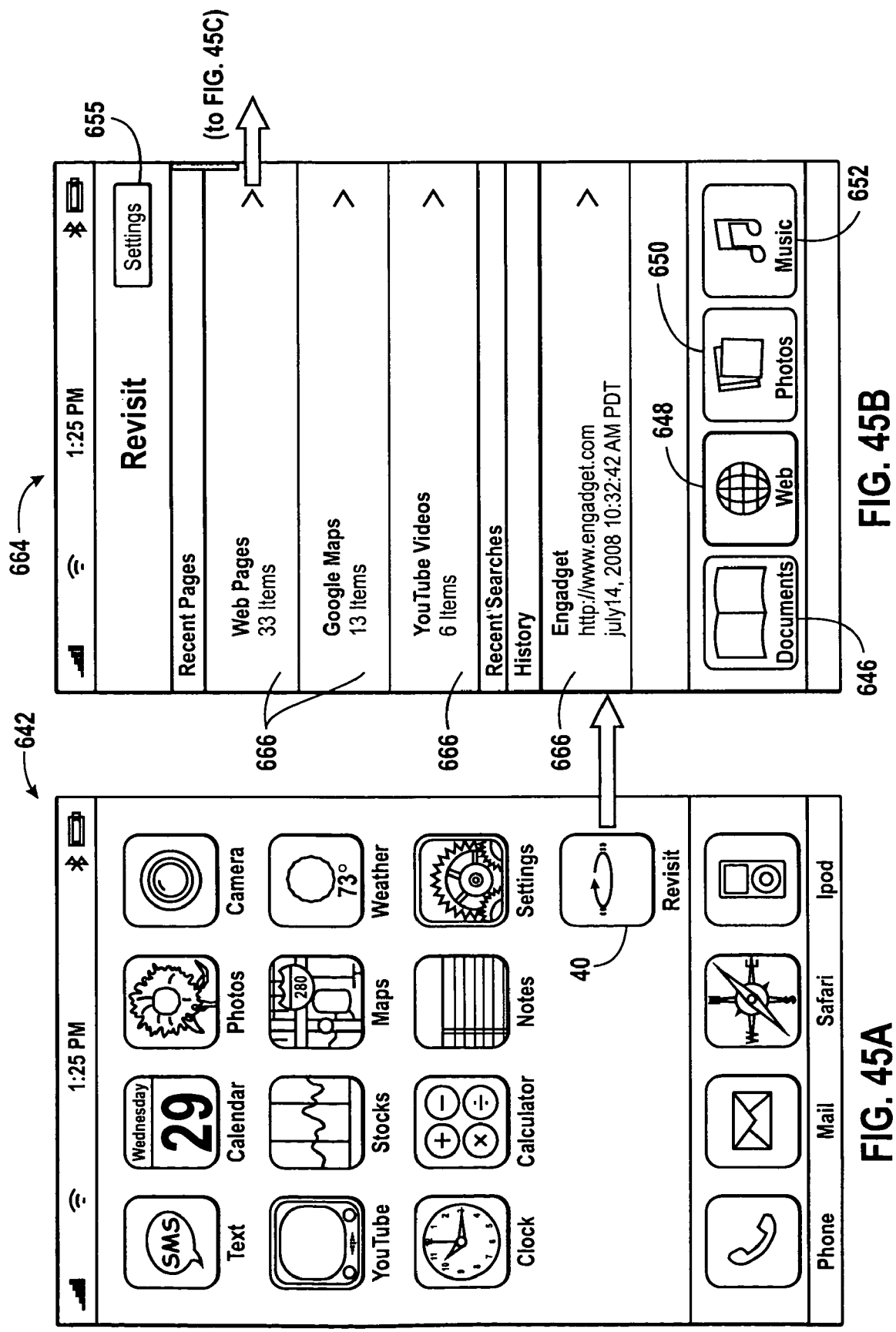

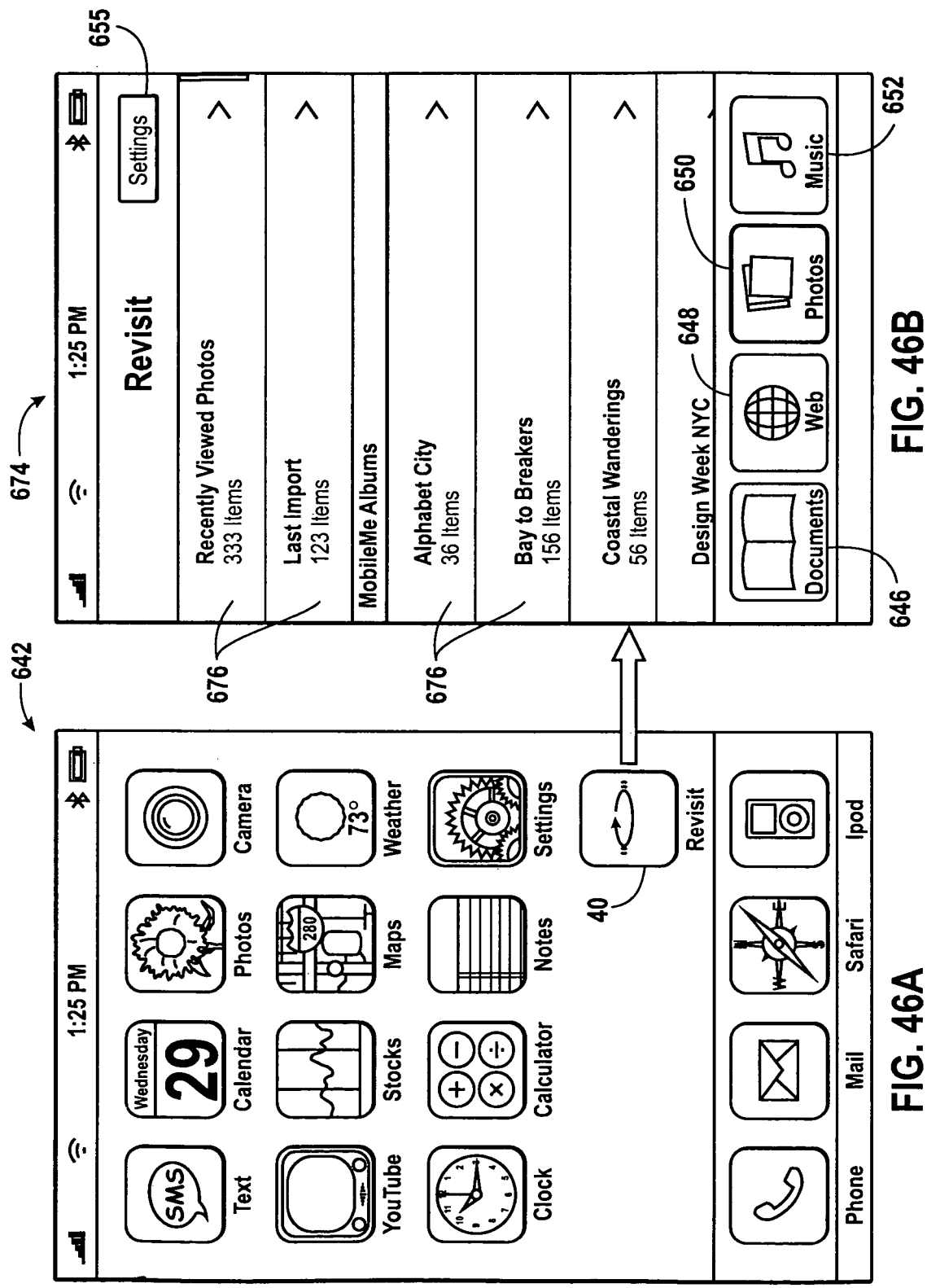

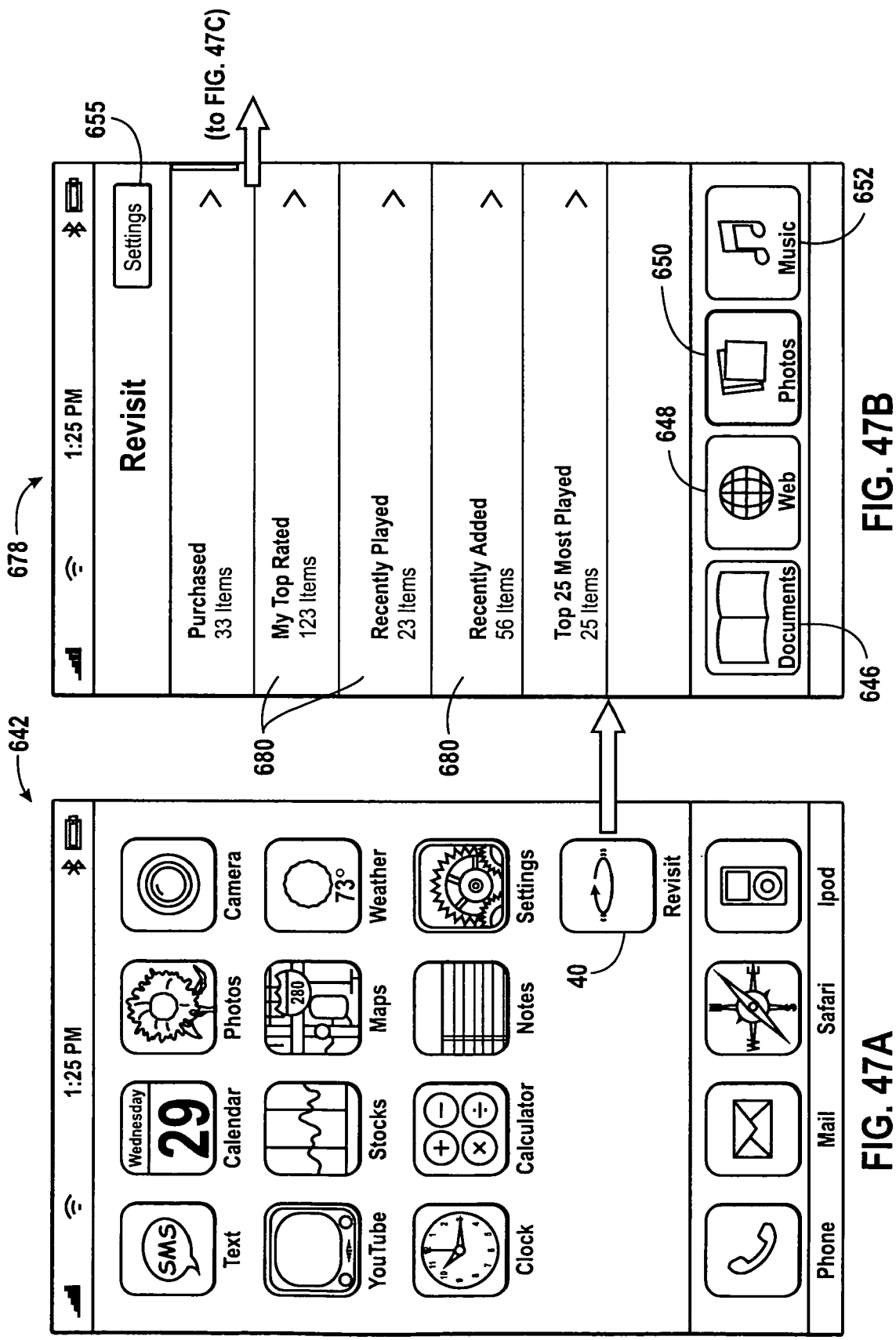

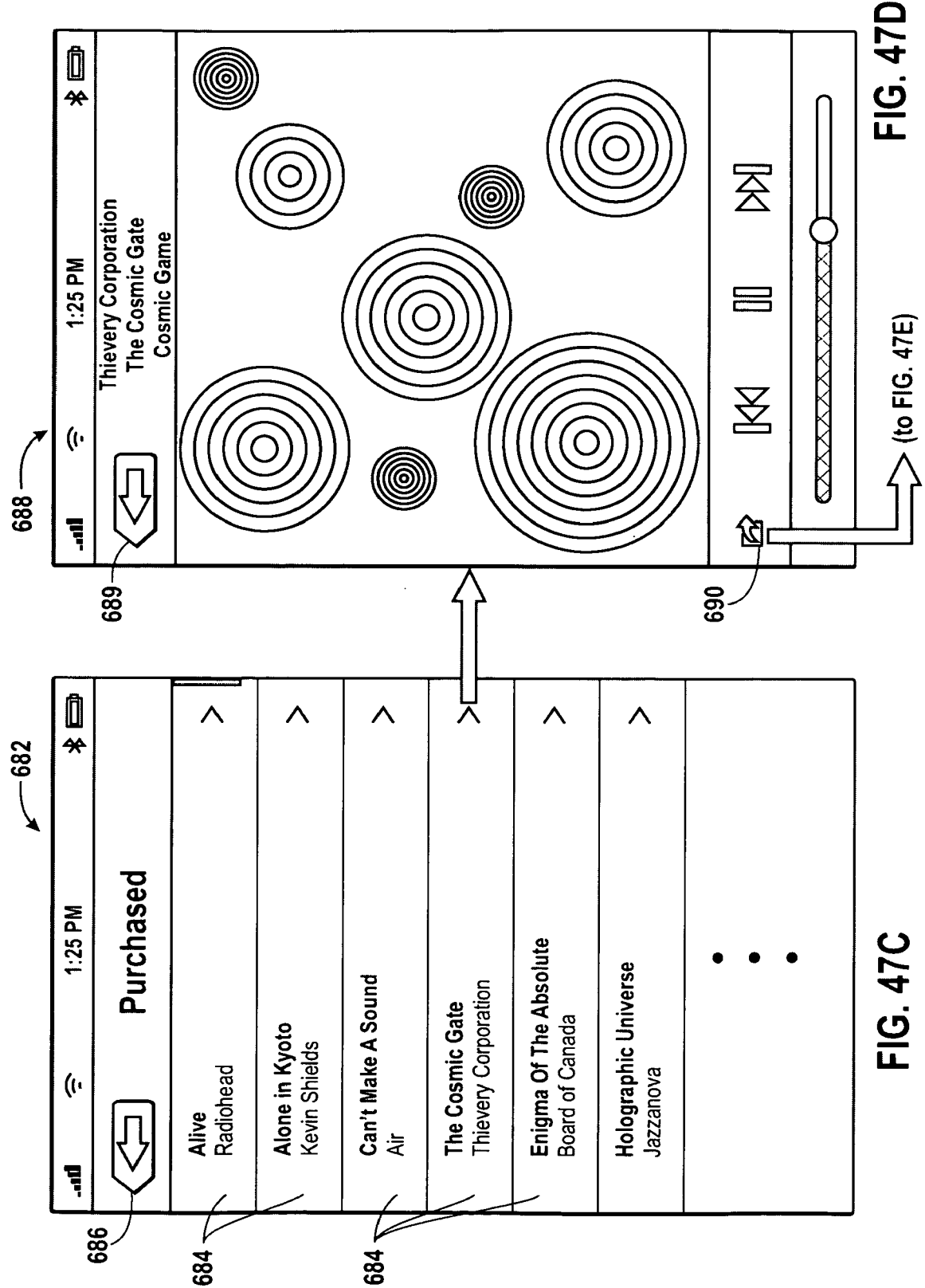

SYSTEM AND METHOD FOR PLACESHIFTING MEDIA PLAYBACK

CROSS REFERENCE TO RELATED APPLICATIONS

This application claims the benefit of U.S. Provisional Application No. 61/059,804, filed Jun. 8, 2008. This application is also related to U. S. Application Nos. 12/286,398 filed Sep. 30, 2008; 12/286,496 filed Sep. 30, 2008; and 12/286, 497 filed Sep. 30, 2009. All of these applications are hereby incorporated by reference herein in their entirety.

BACKGROUND

1. Technical Field

The present disclosure relates generally to transferring media between electronic devices and, more particularly, to transferring media between one or more electronic devices in a simplified manner.

2. Description of the Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

A person may use many electronic devices and/or media players to play music, movies, and other media. When watching or listening to media on one device, the person may decide to watch or listen to the same media on another device. Though the other device may be capable of playing back the media, the process of transferring the media between the devices may include many user decisions, such as which data to save, where the data is saved, which formats each device may be capable of processing, how to interconnect the devices for a most effective data transfer, etc. Such complexity may increase the difficulty or time spent transferring data between two electronic devices.

SUMMARY

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may be set forth below.

Systems and methods of placeshifting media are provided. For example, a method for placeshifting media may include sending a first message from a media-receiving electronic device to a media-playing electronic device playing a media file and receiving a response identifying the media file and a point at which the media file was being played when the first message was received. The media-receiving electronic device may play a copy of the media file at the point where the media-playing electronic device left off.

BRIEF DESCRIPTION OF THE DRAWINGS

Advantages of the disclosure may become apparent upon reading the following detailed description and upon reference to the drawings in which:

FIG. 8A-E are schematics of various configurations for carrying out a simplified data transfer between two embodiments of the electronic device of FIG. 1;

FIGS. 12A-D are schematics illustrating user preferences which may relate to the simplified data transfer system of FIG. 10;

FIG. 37 is a block diagram illustrating a simplified data transfer between a working device and a personal device via a remote storage location;

FIG. 38 is a flowchart describing an embodiment of a method for performing the simplified data transfer of FIG. 37;

FIG. 39 is a flowchart describing an embodiment of a method for establishing a direct connection between a working device and a personal device;

FIGS. 44A-D are schematics of screens that may be displayed on a personal device for the simplified data transfer of FIG. 37 or FIG. 40;

FIGS. 45A-C are schematics of other screens that may be displayed on a personal device for the simplified data transfer of FIG. 37 or FIG. 40;

FIGS. 46A-B are schematics of other screens that may be displayed on a personal device for the simplified data transfer of FIG. 37 or FIG. 40;

FIGS. 47A-E are schematics of other screens that may be displayed on a personal device for the simplified data transfer of FIG. 37 or FIG. 40.

DETAILED DESCRIPTION OF SPECIFIC EMBODIMENTS

Many people use more than one electronic device from day to day to play media, but transferring media from one device to another may be onerous. For example, a person watching a movie on a media player at home may want to continue watching the movie on their phone when they leave the house. The techniques described in the following disclosure may allow a person to easily transfer the movie between two or more devices. Moreover, using the techniques disclosed below, the playback on their phone may begin where playback left off at home.

Figure 1:
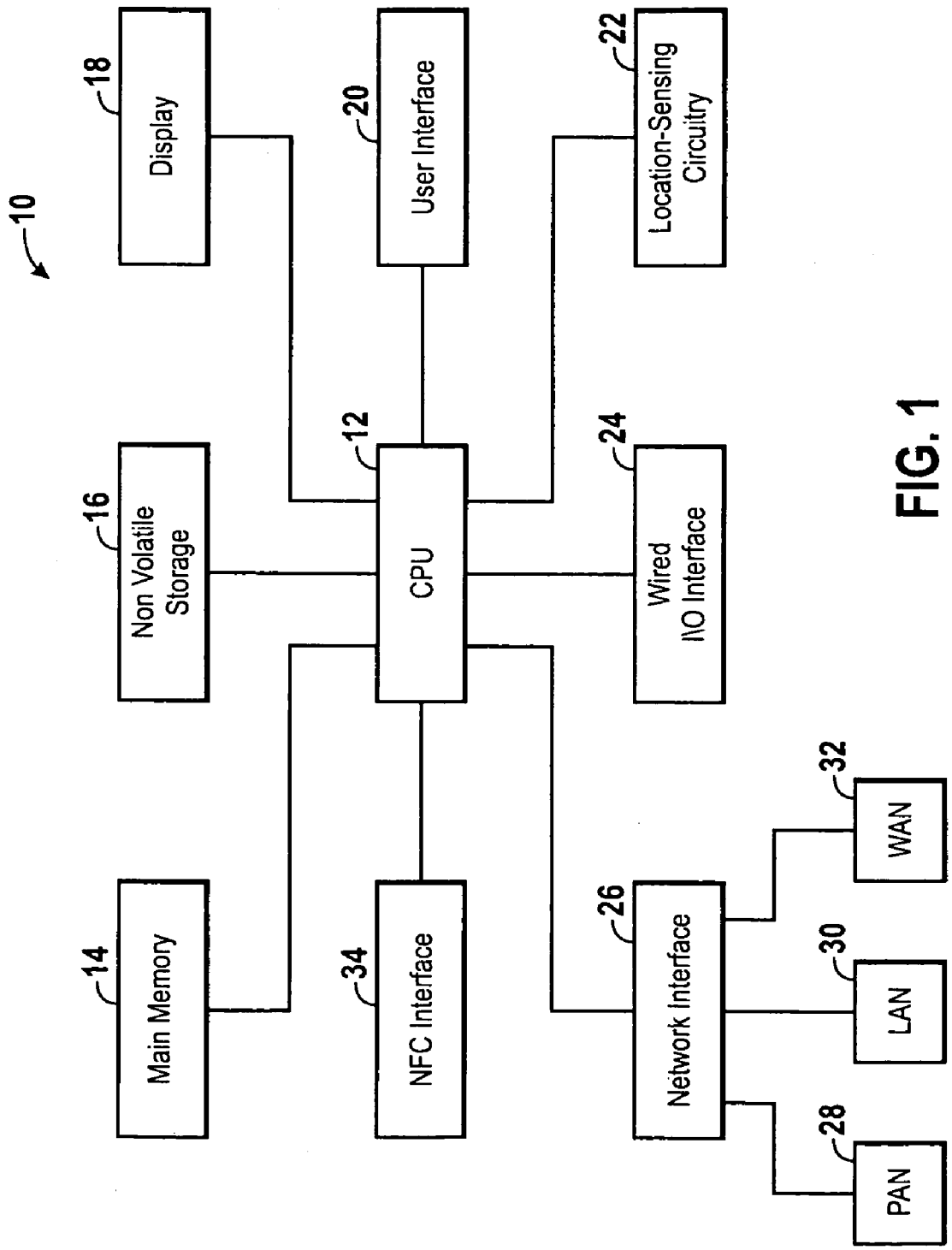
FIG. 1 is a block diagram illustrating an embodiment of an electronic device 10 configured for simplified data transfer.

Turning first to FIG. 1, an electronic device 10 may be configured for simplified data transfer. As discussed below with reference to FIGS. 2-6, the electronic device 10 may represent, among other things, a handheld device, a computer, a media player, a remote control, or a game controller adapted to perform the simplified data transfer techniques described in greater detail below. As such, the electronic device 10 may represent, for example, an iPhone® or iPod®, an iMac® or MacBook®, an AppleTV®, or an AppleTV® remote control available from Apple, Inc. or similar devices by any other manufacturer.

The electronic device 10 may be configured to perform the techniques for simplified data transfer described in greater detail below and, as such, the electronic device 10 may be capable of storing and processing data, as described below with reference to FIG. 7. Embodiments of the electronic device 10 may transfer the data in a simplified manner, as described generally with reference to FIGS. 8-9. A more detailed discussion of the simplified data transfer techniques appears below with reference to FIGS. 10-37.

With reference to FIG. 1, the electronic device 10 may include at least one central processing unit (CPU) 12. For example, the CPU 12 may represent one or more microprocessors, and the microprocessors may be "general purpose" microprocessors, a combination of general and special purpose microprocessors, or ASICS. Additionally or alternatively, the CPU 12 may include one or more reduced instruction set (RISC) processors, video processors, or related chip sets. The CPU 12 may provide processing capability to execute an operating system, run various applications, and/or provide processing for one or more of the simplified data transfer techniques described herein.

A main memory 14 may be communicably coupled to the CPU 12, which may store data and executable code. The main memory 14 may represent volatile memory such as RAM, but may also include nonvolatile memory, such as read-only memory (ROM) or Flash memory. In buffering or caching data related to operations of the CPU 12, the main memory 14 may store user data associated with open applications running on the electronic device 10.

The electronic device 10 may also include nonvolatile storage 16. The nonvolatile storage 16 may represent any suitable nonvolatile storage medium, such as a hard disk drive or nonvolatile memory, such as Flash memory. Being well-suited to long-term storage, the nonvolatile storage 16 may store data files such as media (e.g., music and video files), software (e.g., for implementing functions on the electronic device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), as well as telephone information (e.g., telephone numbers). It should be appreciated that user data associated with open applications may be saved in the nonvolatile storage 16.

A display 18 may display images and data for the electronic device 10. It should be appreciated that only certain embodiments may include the display 18. The display 18 may be any suitable display, such as liquid crystal display (LCD), a light emitting diode (LED) based display, an organic light emitting diode (OLED) based display, a cathode ray tube (CRT) display, or an analog or digital television. In some embodiments, the display 18 may function as a touch screen through which a user may interact with the electronic device 10.

The electronic device 10 may further include a user interface 20. The user interface 20 may represent indicator lights and user input structures, but may also include a graphical user interface (GUI) on the display 18. In practice, the user interface 20 may operate via the CPU 12, using memory from the main memory 14 and long-term storage in the nonvolatile storage 16. In an embodiment lacking the display 18, indicator lights, sound devices, buttons, and other various input/output (I/O) devices may allow a user to interface with the electronic device 10. In a GUI embodiment, the user interface 20 may permit a user to interact with interface elements on the display 18 by way of various user input structures, user input peripherals such as a keyboard or mouse, or a touch sensitive implementation of the display 18.

As should be appreciated, one or more applications may be open and accessible to a user via the user interface 20 and displayed on the display 18 of the electronic device 10. The applications may run on the CPU 12 in conjunction with the main memory 14, the nonvolatile storage 16, the display 18, and the user interface 20. User data may be associated with each open application. As will be discussed in greater detail below, instructions stored in the main memory 14, the nonvolatile storage 16, or the CPU 12 of the electronic device 10 may permit a simplified transfer of pertinent user data associated with open applications running the electronic device 10 to another electronic device 10. Rather than require a user to undertake a number of complicated steps to transfer the user data from one electronic device 10 to another electronic device 10, the user data may be automatically transferred with minimal user effort, as discussed below. As such, it should be appreciated that the instructions for carrying out the simplified data transfer of may represent a standalone application, a function of the operating system, or a function of the hardware of the CPU 12, the main memory 14, or the nonvolatile storage 16.

In certain embodiments, the electronic device 10 may include location sensing circuitry 22. The location sensing circuitry 22 may represent separate global positioning system (GPS) circuitry, but may also represent algorithms, stored in the nonvolatile storage 16 or main memory 14 and carried out by the CPU 12, which may be used to infer location based on various observed factors. For example, the location sensing circuitry 22 may represent an algorithm for approximating geographic location based on the detection of local 802.11x (Wi-Fi) networks or nearby cellular phone towers. As discussed below, the electronic device 10 may employ the location sensing circuitry 22 as a factor for carrying out a smart data transfer. For example, the location sensing circuitry 22 may assist the electronic device 10 in properly determining the most effective network for simplified data transfer.

With continued reference to FIG. 1, the electronic device 10 may also include a wired input/output (I/O) interface 24 for a wired interconnection between one electronic device 10 and another electronic device 10. The wired I/O interface 24 may represent, for example, a universal serial bus (USB) port or an IEEE 1394 or FireWire® port, but may also represent a proprietary connection. Additionally, the wired I/O interface 24 may permit a connection to user input peripheral devices, such as a keyboard or a mouse.

One or more network interfaces 26 may provide additional connectivity for the electronic device 10. The network interfaces 26 may represent, for example, one or more network interface cards (NIC) or a network controller. In certain embodiments, the network interface 26 may include a personal area network (PAN) interface 28. The PAN interface 28 may provide capabilities to network with, for example, a Bluetooth® network, an IEEE 802.15.4 (e.g., ZigBee) network, or an ultra wideband network (UWB). As should be appreciated, the networks accessed by the PAN interface 28 may, but do not necessarily, represent low power, low bandwidth, or close range wireless connections. The PAN interface 28 may permit one electronic device 10 to connect to another local electronic device 10 via an ad-hoc or peer-to-peer connection. However, the connection may be disrupted if the separation between the two electronic devices 10 exceeds the range of the PAN interface 28.

The network interface 26 may also include a local area network (LAN) interface 30. The LAN interface 30 may represent an interface to a wired Ethernet-based network, but may also represent an interface to a wireless LAN, such as an IEEE 802.11x wireless network. The range of the LAN interface 30 may generally exceed the range available via the PAN interface 28. Additionally, in many cases, a connection between two electronic devices 10 via the LAN interface 30 may involve communication through a network router or other intermediary device.

For some embodiments of the electronic device 10, the network interfaces 26 may include the capability to connect directly to a wide area network (WAN) via a WAN interface 32. The WAN interface 32 may permit a connection to a cellular data network, such as the Enhanced Data rates for GSM Evolution (EDGE) network or other 3G network. When connected via the WAN interface 32, the electronic device 10 may remain connected to the Internet and, in some embodiments, to another electronic device 10, despite changes in location that might otherwise disrupt connectivity via the PAN interface 28 or the LAN interface 30. As will be discussed below, the wired I/O interface 24 and the network interfaces 26 may represent high-bandwidth communication channels for transferring user data using the simplified data transfer techniques discussed herein.

Certain embodiments of the electronic device 10 may also include a near field communication (NFC) interface 34. The NFC interface 34 may allow for extremely close range communication at relatively low data rates (464 kb/s), and may comply with such standards as ISO 18092 or ISO 21481, or it may allow for close range communication at relatively high data rates (e.g., 560 Mbps), and may comply with the TransferJet® protocol. The NFC interface 34 may have a range of approximately 2 to 4 cm. The close range communication with the NFC interface 34 may take place via magnetic field induction, allowing the NFC interface 34 to communicate with other NFC interfaces 34 or to retrieve information from tags having radio frequency identification (RFID) circuitry. As discussed below, the NFC interface 34 may provide a manner of initiating or facilitating a simplified transfer of user data from one electronic device 10 to another electronic device 10.

Figure 2:
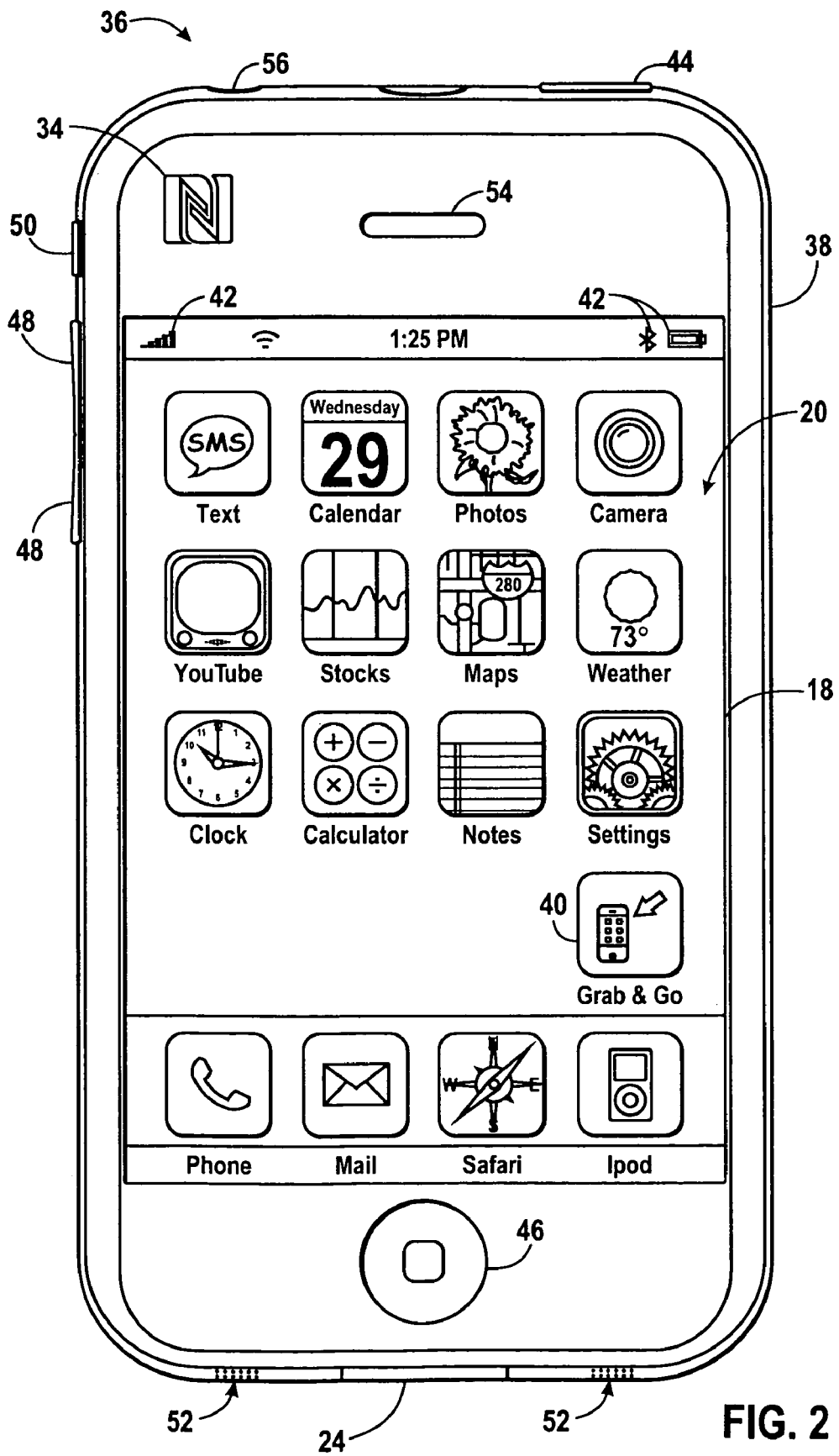
FIG. 2 is a schematic of a handheld device representing an embodiment of the electronic device of FIG. 1.

FIGS. 2-6 illustrate various specific embodiments of the electronic device 10 of FIG. 1. It should be appreciated that the specific embodiments of the electronic device 10 depicted in FIGS. 2-6 are representative only and should not be understood as exclusive. Turning first to FIG. 2, a handheld device 36 may represent an embodiment of the electronic device 10 of FIG. 1. By way of example, the handheld device 36 may be a portable phone or a portable media player, such as an iPhone® or an iPod® available from Apple Inc.

The handheld device 36 may have an enclosure 38 of plastic, metal, composite materials, or other suitable materials in any combination. The enclosure 38 may protect the interior components of the handheld device 36 from physical damage and electromagnetic interference (EMI). Additionally, the enclosure 38 may allow certain frequencies of electromagnetic radiation to pass through to wireless communication circuitry within the handheld device 36 to facilitate wireless communication.

The display 18 of the handheld device 36 may include the user interface 20 in the form of a GUI, which may have a number of individual icons representing applications that may be activated. In some embodiments of the handheld device 36, the display 18 may serve as a touch-sensitive input device and the icons may be selected by touch. In some embodiments, a simplified data transfer application icon 40 may be selectable by a user. Here, the simplified data transfer application is designated as "Grab & Go" to indicate to a user that selection of the icon 40 will allow the electronic device 10 to "grab" data from open applications from another electronic device 10 so the user can "go" with this data.

When the simplified data transfer application icon 40 is selected, the simplified data transfer application may open. The simplified data transfer application may facilitate data transfer using the simplified data transfer techniques described herein. The user interface 20 on the display 18 of the handheld device 36 may also include status indicator icons 42, which indicate the status of components of the handheld device 36. For example, the status indicator icons may include a cellular reception meter, an icon to indicate when the PAN interface 28 is active, or a battery life meter.

The handheld device 36 may connect to another electronic device 10, such as by using the wired I/O interface 24 located at the bottom of the device. For example, the wired I/O interface 24 may be a proprietary connection for interconnecting the handheld device 36 and another electronic device 10 via USB or FireWire®. Once connected, the devices may synchronize and/or transfer certain data. In particular, the wired I/O interface 24 on the handheld device 36 may permit a communication channel to another electronic device 10 for simplified data transfer in accordance with techniques discussed herein.

User input structures 44, 46, 48, and 50 may supplement or replace the touch-sensitive input capability of the display 18 for interaction with the user interface 20. By way of example, the user input structures 44, 46, 48, and 50 may include buttons, switches, a control pad, keys, knobs, a scroll wheel, or any other suitable input structures. The user input structures 44 and 46 may work in conjunction with the display 18 to control functions of the device. Particularly, the user input structure 44 may be a lock/unlock sliding button to lock or unlock the handheld device 36; the user input structure 46 may be a navigation button for navigating the user interface 20 to a default or home screen; the user input structures 48 may be a pair of buttons for navigating up or down a screen of the user interface 20 or for controlling volume; and the user input structure 50 may be an on/off button.

Certain embodiments of the handheld device 36 may include telephone functionality. As such, the handheld device 36 may include audio input structures 52 and audio output structure 54. The audio input structures 52 may be one or more microphones for receiving voice data from a user, and the audio output structure 54 may be a speaker for outputting audio data, such as data received by the handheld device 36 over a cellular network. In certain embodiments, an audio port 56 may facilitate peripheral audio input and output devices, such as headsets, speakers, or microphones, to be used with the handheld device 36.

As noted above, some embodiments of the electronic device 10 may include the NFC interface 34. The handheld device 36 depicted in FIG. 2 may include the NFC interface 34 in any suitable location within the enclosure 38. Because the NFC interface 34 may permit communication at a very short range, the location of the NFC interface 34 in the handheld device 36 may be indicated on the enclosure 38, as illustrated in FIG. 2. The NFC interface 34 may enable the handheld device 36 to engage in near field communication (NFC) with other NFC enabled electronic devices 10. For example, in the discussion below, the NFC interface 34 may present a manner of initiating a simplified data transfer between the handheld device 36 and another electronic device 10.

Figure 3:
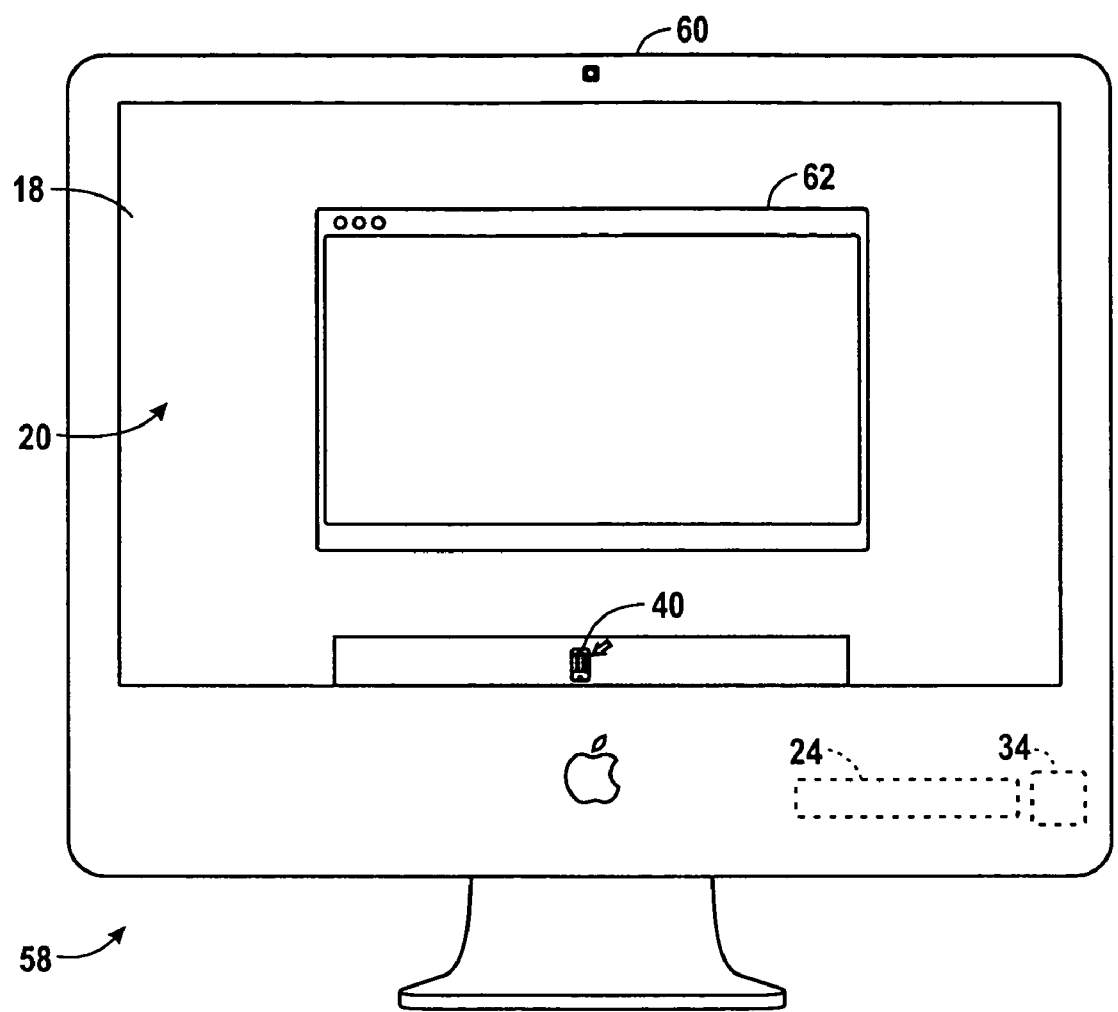
FIG. 3 is a schematic of a computer representing an embodiment of the electronic device of FIG. 1.

Turning to FIG. 3, a computer 58 may represent another embodiment of the electronic device 10 of FIG. 1. The computer 58 may be any computer, such as a desktop computer, a server, or a notebook computer, but may also be a standalone media player or gaming machine. By way of example, the computer 58 may be an iMac®, a MacBook®, or an AppleTV® by Apple Inc. It should be noted that the computer 58 may also represent a personal computer (PC) by another manufacturer. An enclosure 60 may protect internal components of the computer 58, including the NFC interface 34. The NFC interface 34 may permit very close range communication between the computer 58 and other NFC enabled electronic devices 10, such as the handheld device 36.

The display 18 of the computer 58 may display the user interface 20 in the form of a GUI. The user interface 20 of the computer 58 may depict any user data associated with applications running on the computer 58, generally referred to herein as the device state and indicated by numeral 62. Additionally, the user interface 20 may include a variety of icons related to applications installed on the computer 58. One such icon may be the simplified data transfer application icon 40. When the simplified data transfer application icon 40 is selected, the simplified data transfer application may open. The simplified data transfer application may facilitate data transfer using the simplified data transfer techniques described herein.

A user of the computer 58 may interact with the user interface 20 with various peripheral input devices, such as a keyboard or mouse, which may connect to the computer 58 via the wired I/O interface 24. The wired I/O interface 24 may also provide a high bandwidth communication channel for interconnecting other electronic devices 10, such as the handheld device 36, to the computer 58. In certain embodiments, the computer 58 may also include the network interfaces 26.

Figure 4:
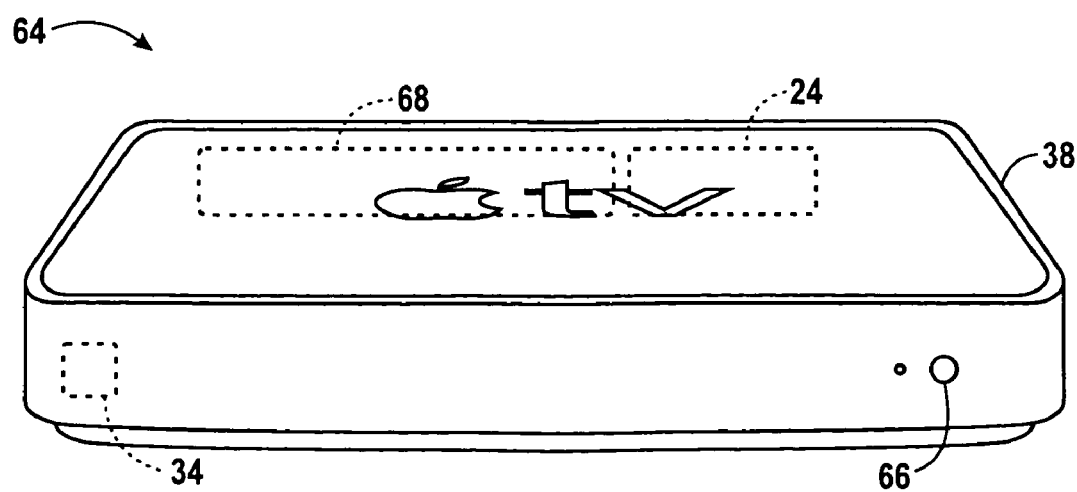
FIG. 4 is a schematic of a standalone media player representing an embodiment of the electronic device of FIG. 1.

FIG. 4 depicts a standalone media player 64 which represents another embodiment of the electronic device 10 of FIG. 1. The standalone media player 64 may be configured to operate with the simplified data transfer techniques described herein. By way of example, the standalone media player 64 may be an AppleTV® device by Apple, Inc. However, the standalone media player 64 may also represent a media player by another manufacturer.

Within the enclosure 38 of the standalone media player 64 may reside various components of the electronic device 10. For example, the enclosure 38 may house the nonvolatile storage 16 for storing media files and media playback software and the CPU 12 for processing the media files. Wireless network interfaces 26, such as the PAN interface 28 and LAN interface 30, may also be located within the enclosure 38, allowing the standalone media player 64 to communicate with other electronic devices 10 or to connect to the Internet. Using the wireless network interfaces 26, the standalone media player 64 may obtain or exchange media content.

The standalone media player 64 may also include, among other things, an indicator light and infrared (IR) port 66 and audio/video (A/V) outputs 68. The indicator light and IR port 66 may receive an IR control signal from a remote control and indicate to a user when the standalone media player 64 is on, off, receiving or exchanging content, or preparing for a simplified data transfer in accordance with techniques described herein. The AN outputs 68 may provide a manner for connecting the standalone media player 64 to an analog or digital television or other media display devices. The standalone media player 64 may additionally include the wired I/O interface 24, which may permit the standalone media player 64 to communicate rapidly with a wired connection to another electronic device 10.

The standalone media player 64 may also include the NFC interface 34. With the NFC interface 34, the standalone media player 64 may communicate with another electronic device 10 having another NFC interface 34. Using NFC communication via the NFC interface 34, the standalone media player 64 and another electronic device 10 may initiate a simplified data transfer of media stored on the standalone media player 64, as described in greater detail below.

Figure 5:
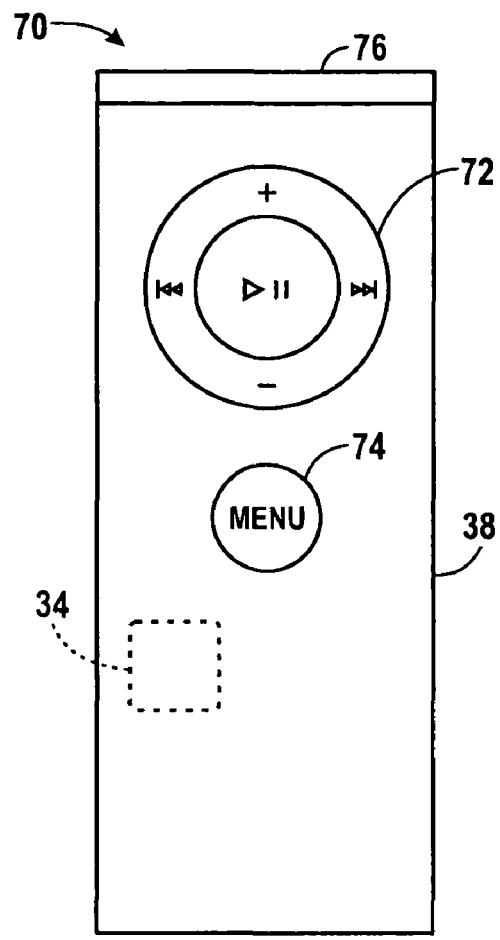
FIG. 5 is a schematic of a remote control representing an embodiment of the electronic device of FIG. 1.

FIG. 5 illustrates a remote control 70, which may be used to control the standalone media player 64 of FIG. 4 or the computer 58 of FIG. 3. For example, the remote control 70 may represent another embodiment of the electronic device 10 of FIG. 1 and may be configured to operate with the simplified data transfer techniques described herein. By way of example, the remote control 70 may be an AppleTV® remote control adapted to perform the simplified data transfer techniques described below. It should be understood, however, that the remote control 70 may represent any remote control capable of performing the simplified data transfer techniques.

The enclosure 38 of the remote control 70 may protect the internal components of the remote control 70 from physical damage or extraneous electromagnetic radiation, while permitting control signals, such as IR control signals, to exit for controlling the standalone media player 64 or the computer 58. Internal components protected by the enclosure 38 may include, for example, the CPU 12, the main memory 14, the nonvolatile storage 16, or the wireless network interfaces 26 of the PAN interface 28 or the LAN interface 30. The internal components may permit the remote control 70 to store and transfer data in a simplified data transfer, as discussed below.

The remote control 70 may include a multifunction button 72, which may permit a user to play, pause, fast forward, or rewind media, increase or decrease volume, or navigate a menu. Additionally, the remote control 70 may include a menu button 74 for navigating the standalone media player 64 or the computer 58 to a main menu screen. To control the standalone media player 64 or the computer 58, an infrared (IR) window 76 may permit control signals to exit the enclosure 38 of the remote control 70. The control signals which exit the IR window 76 may be received by the indicator light and IR port 66 of the standalone media player 64 or by an IR peripheral device communicably coupled to the computer 58.

As indicated in FIG. 5, the remote control 70 may also include the NFC interface 34. With the NFC interface 34, the remote control 70 may communicate with another electronic device 10 having another NFC interface 34. Using NFC communication via the NFC interface 34, the remote control 70 and the other electronic device 10 may initiate a simplified data transfer to or from the remote control 70 according to techniques described in greater detail below.

Figure 6:
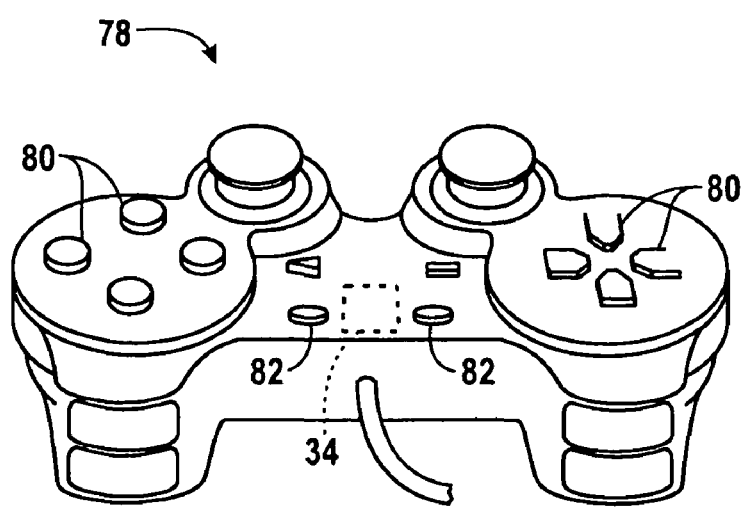
FIG. 6 is a schematic of a game controller representing an embodiment of the electronic device of FIG. 1.

FIG. 6 illustrates a game controller 78 for use with a video gaming system, the computer 58, or the standalone media player 64. The game controller 78 may represent another embodiment of the electronic device 10 of FIG. 1 configured to perform the simplified data transfer techniques described below. The game controller 78 may provide a manner of interfacing with a game running on another electronic device 10. The enclosure 38 of the game controller 78 may protect the internal components of the remote control 70 from physical damage or extraneous electromagnetic radiation. Internal components protected by the enclosure 38 may include, for example, the CPU 12, the main memory 14, the nonvolatile storage 16, or the wireless network interfaces 26 of the PAN interface 28 or the LAN interface 30. The internal components may permit the game controller 78 to store and transfer user data (e.g., game save data, digital photos, or music) using the simplified data transfer techniques discussed below.

To interface with the video gaming system, the computer 58, or the standalone media player 64, the game controller 78 may include various control buttons 80, such as a directional pad or other selection buttons. Indicator lights 82 may indicate to a user, among other things, when the game controller is on, off, or communicating with another electronic device 10.

The game controller 78 may also include the NFC interface 34. With the NFC interface 34, the game controller 78 may communicate with another electronic device 10 having another NFC interface 34. Using NFC communication via the NFC interface 34, the game controller 78 and the other electronic device 10 may initiate a simplified data transfer to or from the game controller 78 according to techniques described in greater detail below.

As described above, the electronic device 10 may take many forms and provide many different functions, yet all are similar to the extent that it may be useful to transfer the state of one electronic device 10 and/or data on one electronic device 10 to another. FIG. 7 is a schematic view of an embodiment of a device state 62, which may represent a device state, e.g., pointers, open applications, and/or associated user data capable of running on the electronic device 10 of FIG. 1. Using the simplified data transfer techniques discussed below, certain elements of the device state 62 may be transferred from one electronic device 10 to another electronic device 10 with minimal user effort. The device state 62 may accordingly be present on the handheld device 36 of FIG. 2, the computer 58 of FIG. 3, the standalone media player 64 of FIG. 4, the remote controller 70 of FIG. 5, or the game controller 78 of FIG. 6, to continue with the above examples.

By way of example, the device state 62 may include a web browser 84, such as Safari®; a spreadsheet application 86, such as Numbers '08®; a presentation application 88, such as Keynote '08®; a media management application 90, such as iTunes®; a gaming platform 92; or a backup application 94 for storing and accessing recently modified or saved files, such as Time Machine®. The applications of the device state 62 may run independently of or may form a part of the operating system of the electronic device 10. Moreover, though Safari®, Numbers '08®, Keynote '08®, iTunes®, and Time Machine® are products of Apple Inc., it should be understood that the device state 62 may include applications by any manufacturer and designed for any platform.

Figure 7:
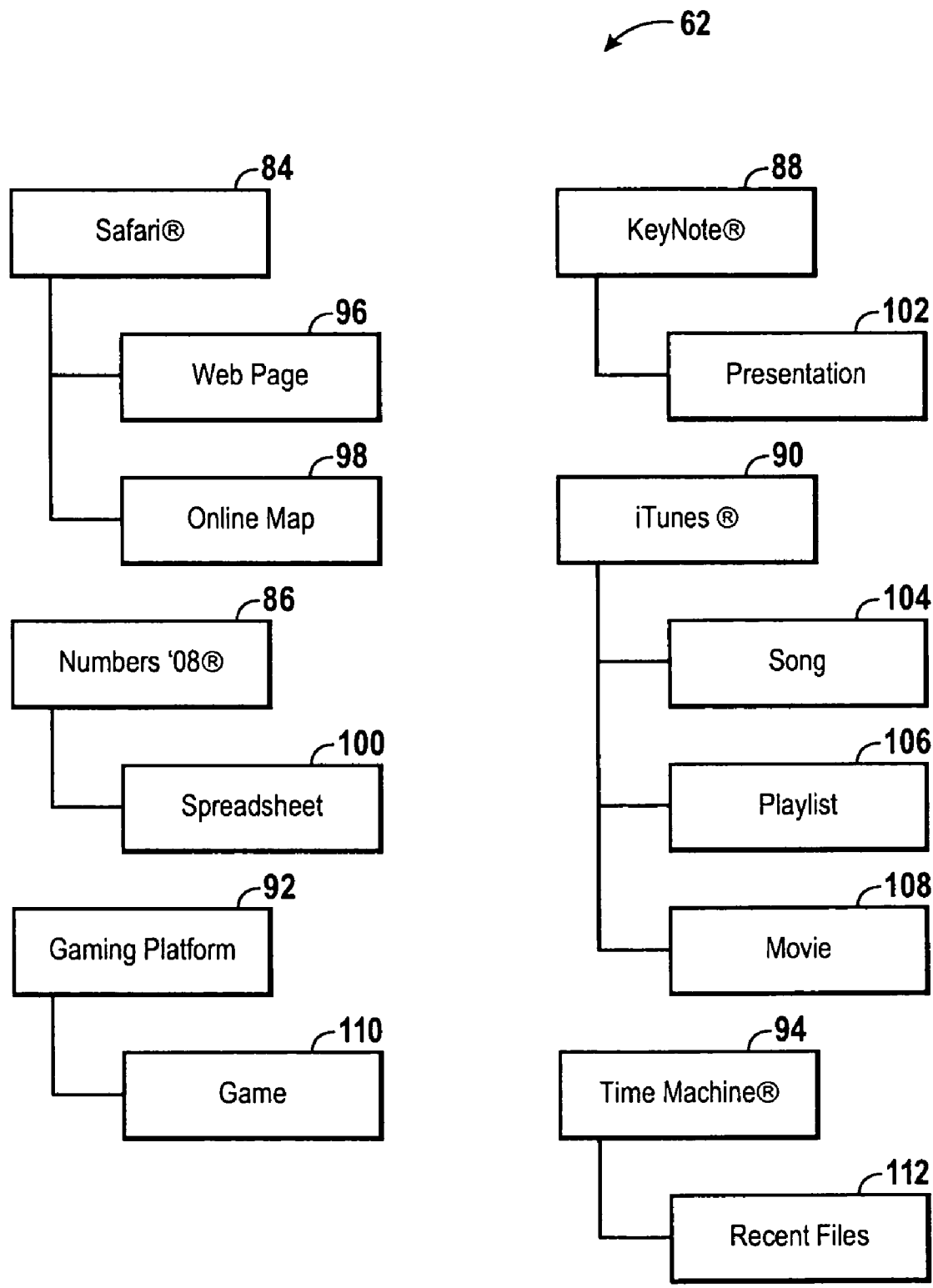
FIG. 7 is a schematic view of a device state, e.g., pointers, open applications, and/or associated user data which may be stored on the electronic device of FIG. 1.

It should be appreciated that the device state 62 may include more or fewer applications than depicted in FIG. 7. Particularly, the handheld device 36 may include a map application or an online video application. For example, the map application may display online maps and the online video application may play online video, rather than employ the web browser 84 for such tasks.

Each of the open applications 84, 86, 88, 90, 92, and 94 may have open files or other user data associated with each. For example, the web browser 84 may display a web page 96 or an online map 98. The spreadsheet application 86 may run a spreadsheet 100. The presentation application 88 may run a presentation 102. The media management application 90 may play a music file 104, such as a song, which may be a part of a playlist 106. Additionally or alternatively, the media management application may play a video file 108, such as a movie. The gaming platform 92 may run a game 110. The backup application 94 may maintain a number of recent files 112.

A user of the electronic device 10 may have any number of applications open at a given time, and each application may have user data, such as one or more open files, associated therewith. The user may desire to transfer some or all of the user data of the device state 62 from the electronic device 10 that the user is working on to another electronic device 10 in the user's possession. Rather than manually saving user data associated with each application individually, then manually transferring the user data from the working electronic device 10 to the personal electronic device 10, the user may transfer the user data 96, 98, 100, 102, 104, 106, 108, 110, and/or 112 of the device state 62 in a simplified manner according to techniques described below.

FIGS. 8A-E illustrate various configurations for carrying out a simplified data transfer 114 between two electronic devices 10. It should be appreciated that the configurations illustrated by FIGS. 8A-E are representative only and are not exclusive, as the simplified data transfer 114 may take place between any two electronic devices 10.

Turning first to FIG. 8A, the simplified data transfer 114 may take place between the computer 58 and the handheld device 36. By way of example, a user may be sitting at their desk at work with an important spreadsheet open on their computer 58 when the user is called into an unexpected meeting. With no time to print the spreadsheet, the user may use the simplified data transfer system 114 to easily transfer a PDF of the spreadsheet onto their handheld device 36. Despite the short notice, the user may have the spreadsheet at their fingertips in the meeting using the simplified data transfer system 114.

Turning next to FIG. 8B, the simplified data transfer 114 may also take place between two handheld devices 36A and 36B. For example, a user may want to transfer an online map open on their handheld device 36A to the handheld device 36B belonging to a friend. Using the simplified data transfer 114, the user may easily transfer the online map by touching the devices together.

FIG. 8C similarly illustrates that the simplified data transfer 114 may take place between two computers 58A and 58B. By way of example, a user may be at work in front of their work computer 58A. The user may suddenly realize that they needed a document open on their home computer 58B. From the comfort of the office, the user may quickly and easily retrieve the open document using the simplified data transfer 114.

As illustrated in FIG. 8D, the simplified data transfer 114 may also occur between the standalone media player 64 and the handheld device 36. For example, kids may be watching a movie on the standalone media player 64 at home. It's time for a car trip, but the movie is not over. Using the simplified data transfer 114, parents may transfer the movie from the standalone media player 64 to the handheld device 36. The movie may begin playing on the handheld device 36 where the standalone media player 64 left off, and the kids can finish the movie in the car.

Turning to FIG. 8E, the simplified data transfer 114 may also occur between the computer 58 and the standalone media player 64. By way of example, a user may be listening to a playlist of music on the computer 58 in headphones while a roommate sleeps. When the roommate wakes up, the user may use the simplified data transfer 114 to transfer the playlist to the standalone media player 64, picking up out loud where the headphones and computer 58 left off.

In many instances, users may desire to transfer data between two remote electronic devices 10. To further simplify the transfer, a third electronic device 10 may serve as an intermediary. For example, FIGS. 9A-F illustrate various configurations for carrying out a "dual" simplified data transfer 116 from a first electronic device 10 to a third electronic device 10, by way of a second electronic device 10. It should be appreciated that the configurations illustrated in FIGS. 9A-F are representative only and are not exclusive. As indicated by FIGS. 9A-F, the dual simplified data transfer 116 may involve two simplified data transfers 114.

Figure 9A:
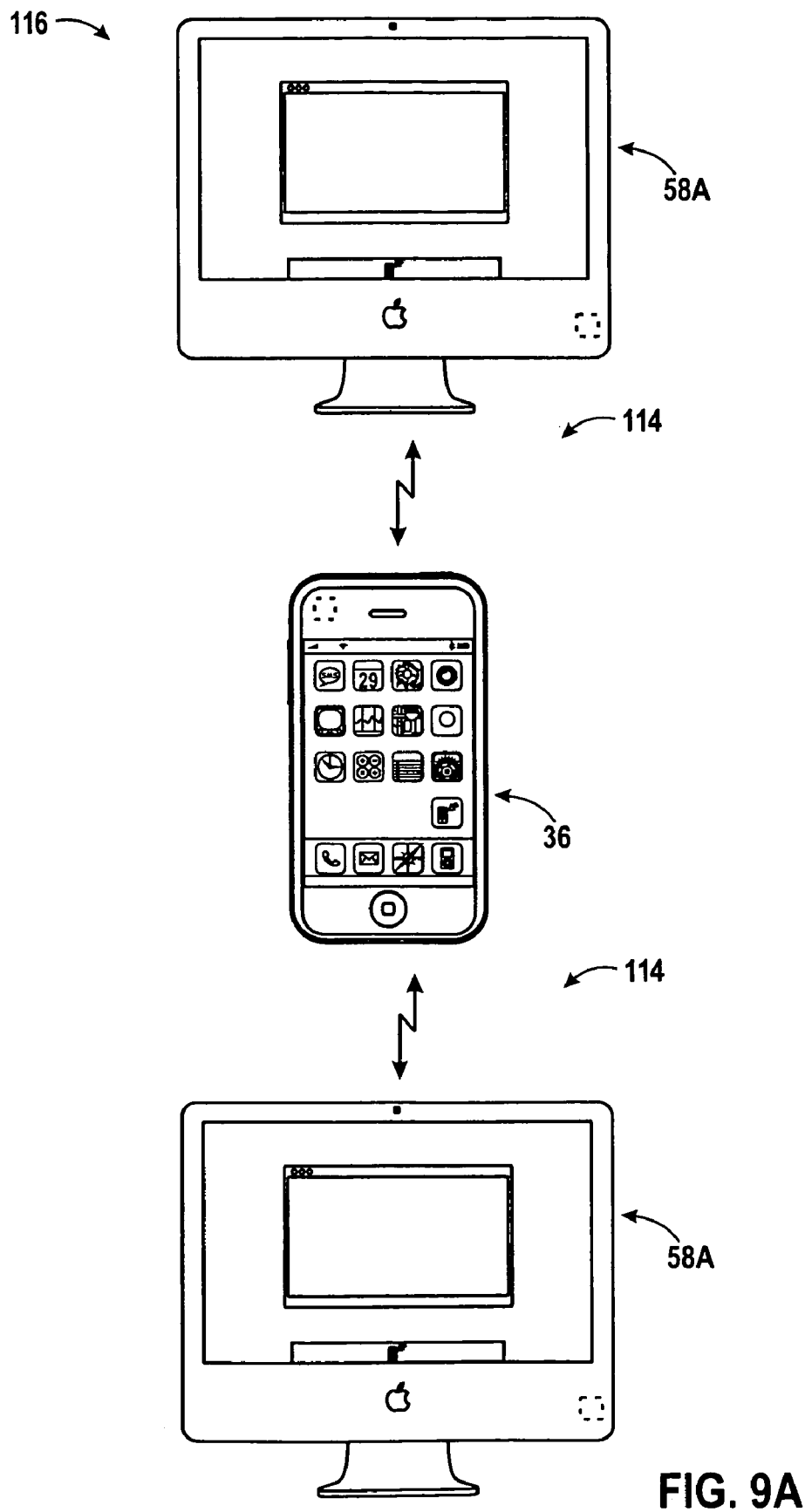
FIGS. 9A-F are schematics illustrating various configurations for carrying out a "dual" simplified data transfer among three embodiments of the electronic device of FIG. 1.

Turning first to FIG. 9A, the dual simplified data transfer 116 may take place between two computers 58A and 58B via the handheld device 36. By way of example, a user may want to bring home all the work documents open on a work computer 58A to a home computer 58B. The user may transfer all the open work documents to the handheld device 36 by simply tapping it to the work computer 58A in the first simplified data transfer 114. When the user arrives home, the user may tap the handheld device 36 to the home computer 58B in the second simplified data transfer 114, transferring all the work documents from the work computer 58A to the home computer 58B.

Figure 9B:
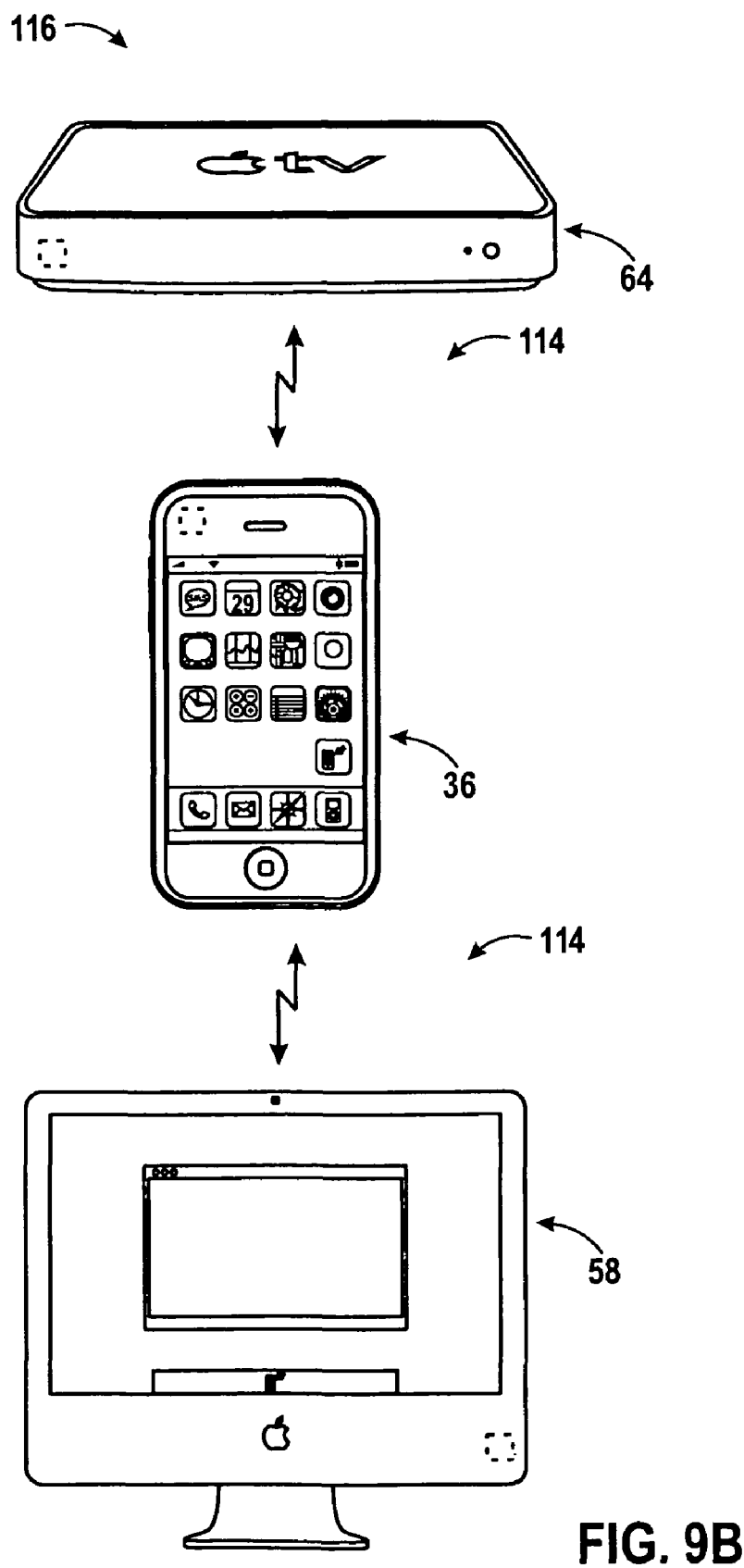

Turning next to FIG. 9B, the dual simplified data transfer 116 may also take place between the standalone media player 64 and the computer 58 via the handheld device 36. For example, a user may be playing a movie on the standalone media player 64. If a roommate of the user wants to go to sleep, the user should finish the movie on the computer 58. The user may first transfer the movie or a part of the movie onto the handheld device 36 using the first simplified data transfer 114. In the second simplified data transfer 114, the user may transfer the movie or part of the movie to the computer 58. As a result, the user may continue to enjoy the movie after the roommate has gone to bed.

Figure 9C:
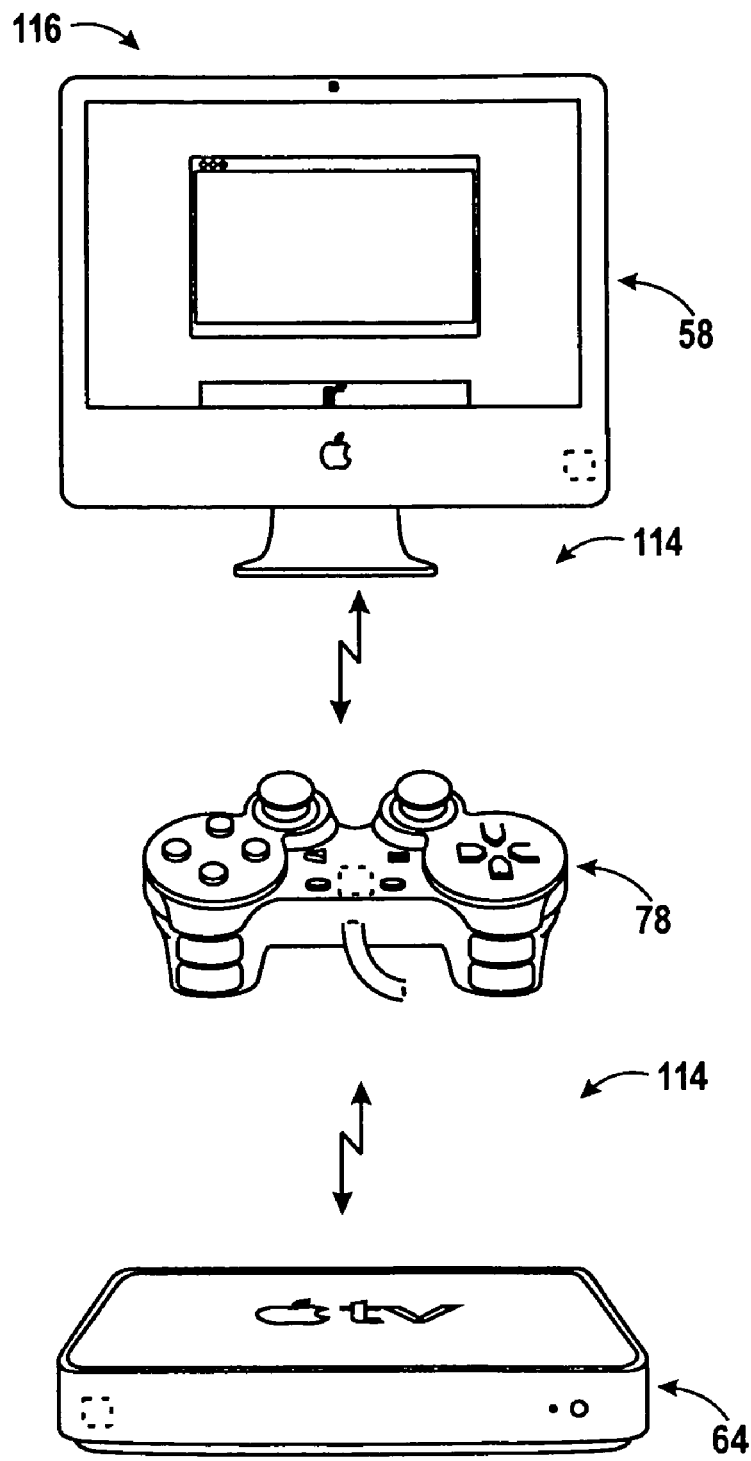

FIG. 9C illustrates that the dual simplified data transfer 116 may also take place between the computer 58 and the standalone media player 64 via the game controller 78. By way of example, a kid may be playing a video game on the computer 58 using the game controller 78. If a parent needs to use the computer 58, the kid may use the first simplified data transfer 114 to save the game and store it on the game controller 78. Next, the kid may bring the game controller to the standalone media player 64. Using the second simplified data transfer, the kid may transfer the game save data to the standalone media player 64, where the game can be continued where the computer 58 left off.

Figure 9D:
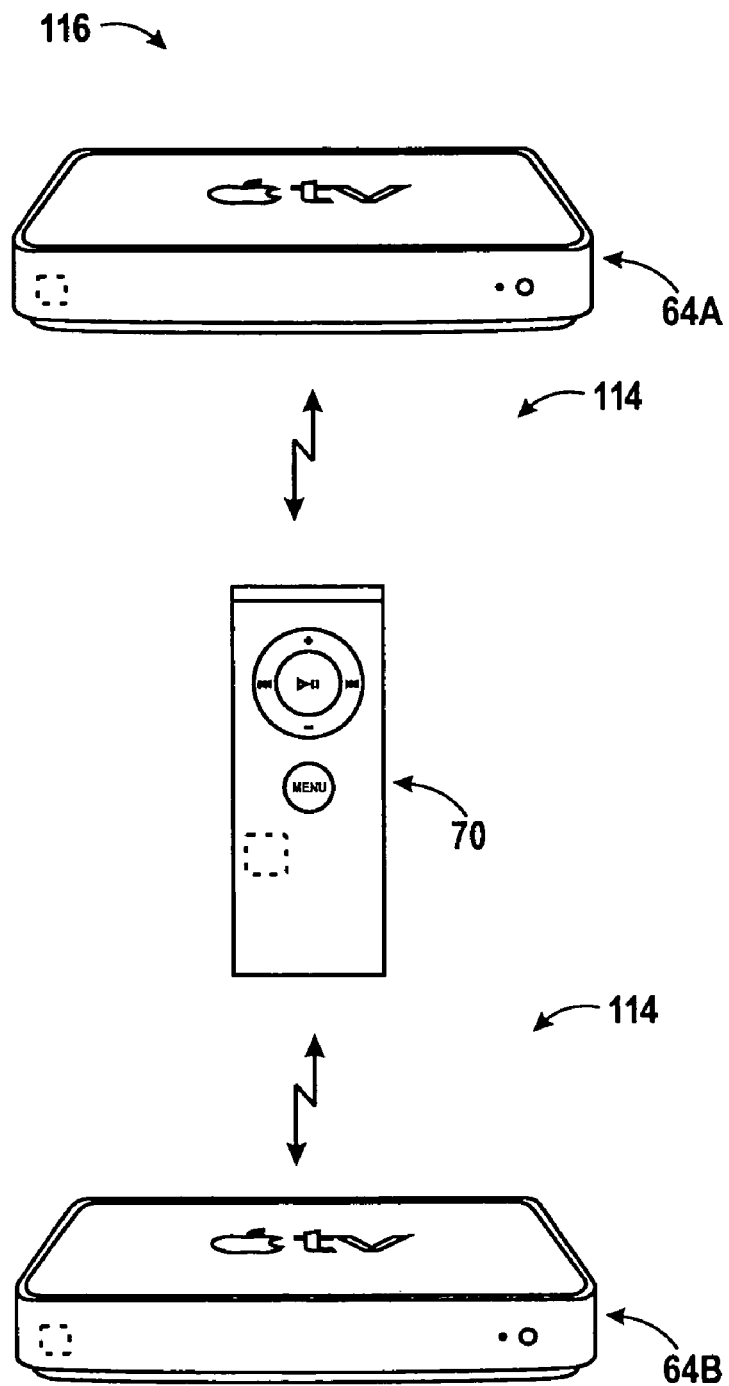

Turning to FIG. 9D, the dual simplified data transfer 116 may also take place between two standalone media players 64A and 64B via the remote control 70. For example, one family member may be watching a movie on the standalone media player 64A on a small TV in a side room, while the main TV and the standalone media player 64B are occupied by others watching a TV show. When the others finish the TV show, the movie-watching family member may use the first simplified data transfer 114 to transfer the movie or a pointer associated with the movie to the remote control 70. The movie-watcher may next go to the main TV with the standalone media player 64B. Using the second simplified data transfer 114, the movie-watching family member may transfer the movie or pointer associated with the movie from the remote control 70 to the standalone media player 64B, and pick up the movie where it left off.

Figure 9E:
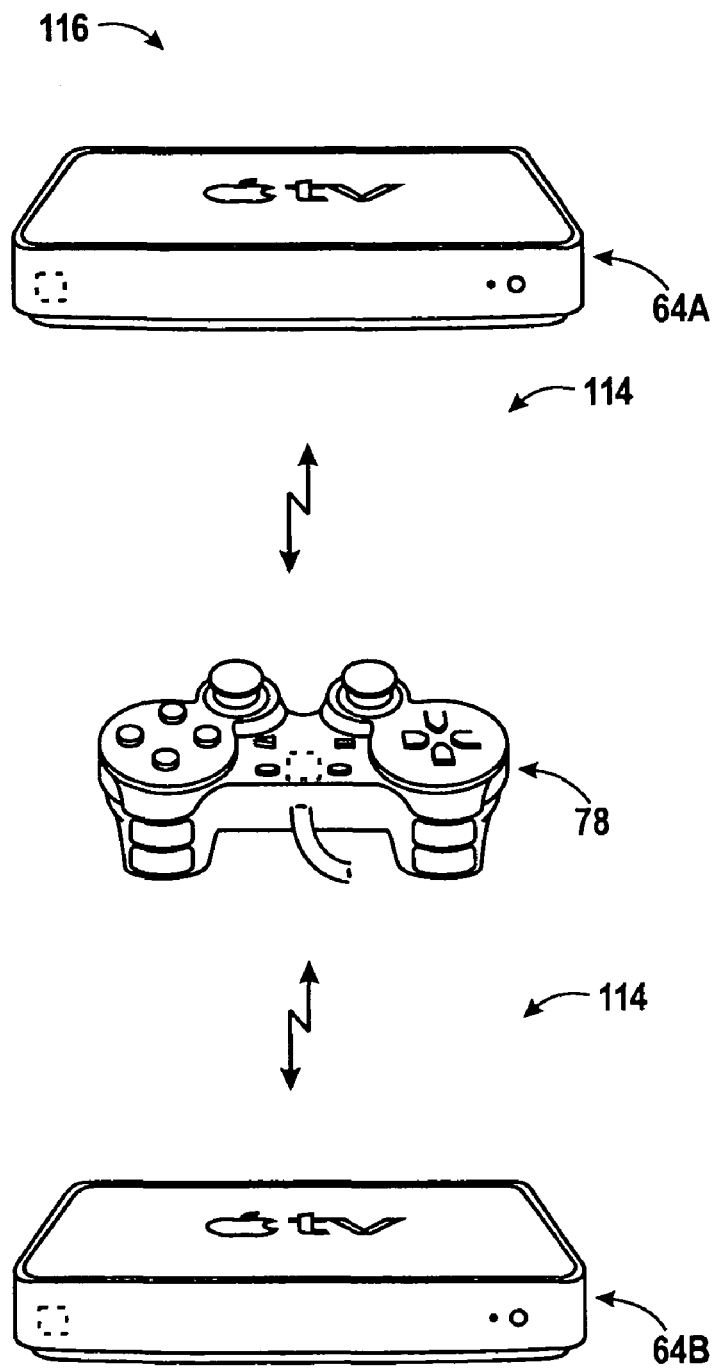

FIG. 9E illustrates that the dual simplified data transfer 116 may also take place between two standalone media players 64A and 64B via the game controller 78. By way of example, a user may be playing a video game at a friend's house on the standalone media player 64A with the game controller 78. When it is time to go home, the user may pick up the game where it left off, using the dual simplified data transfer 116. First, the user may, for example, tap the game controller 78 to the standalone media player 64A to cause the first data transfer 114 and receiving game save data onto the game controller 78 from the standalone media player 64A. When the user gets home, the user may, for example, tap the game controller 78 to the standalone media player 64B to cause the second data transfer 114. With the game save data sent to the standalone media player 64B, the user may continue to play the game at home.

Figure 9F:
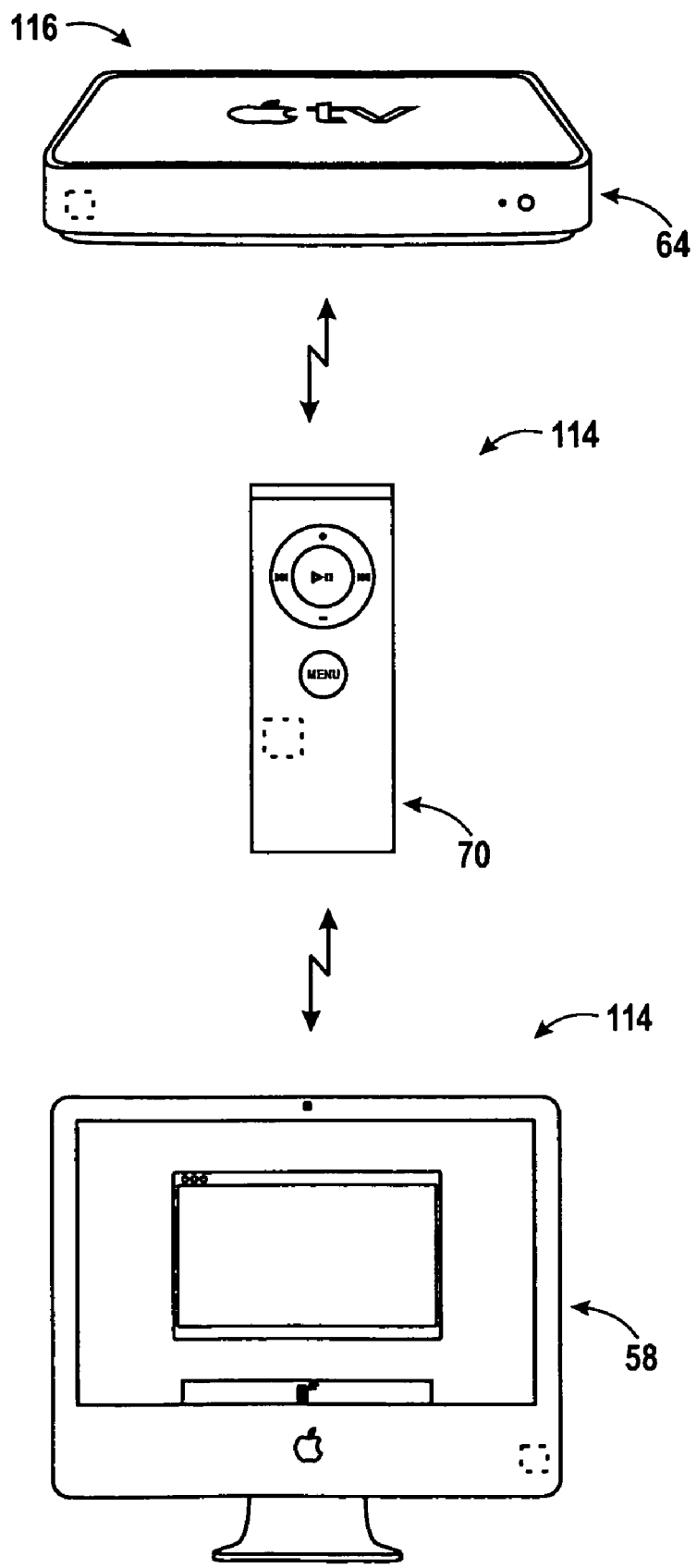

Turning to FIG. 9F, the dual simplified data transfer 116 may also take place between the standalone media player 64 and the computer 58 via the remote control 70. For example, a passenger in a car fitted with the standalone media player 64 may be watching a TV show using the remote control 70. When the car arrives home, the passenger may want to finish the TV show on their computer 58. By tapping the remote control 70 to the standalone media player 64, the user may initiate the first simplified data transfer 114, which may transfer the TV show or a pointer associated with the TV show to the remote control 70. Next, the user may tap the remote control 70 to the computer 58 at home, causing the second simplified data transfer 114 to the computer 58. The passenger, now at home, may then finish the TV show where it left off in the car.

Figure 10:
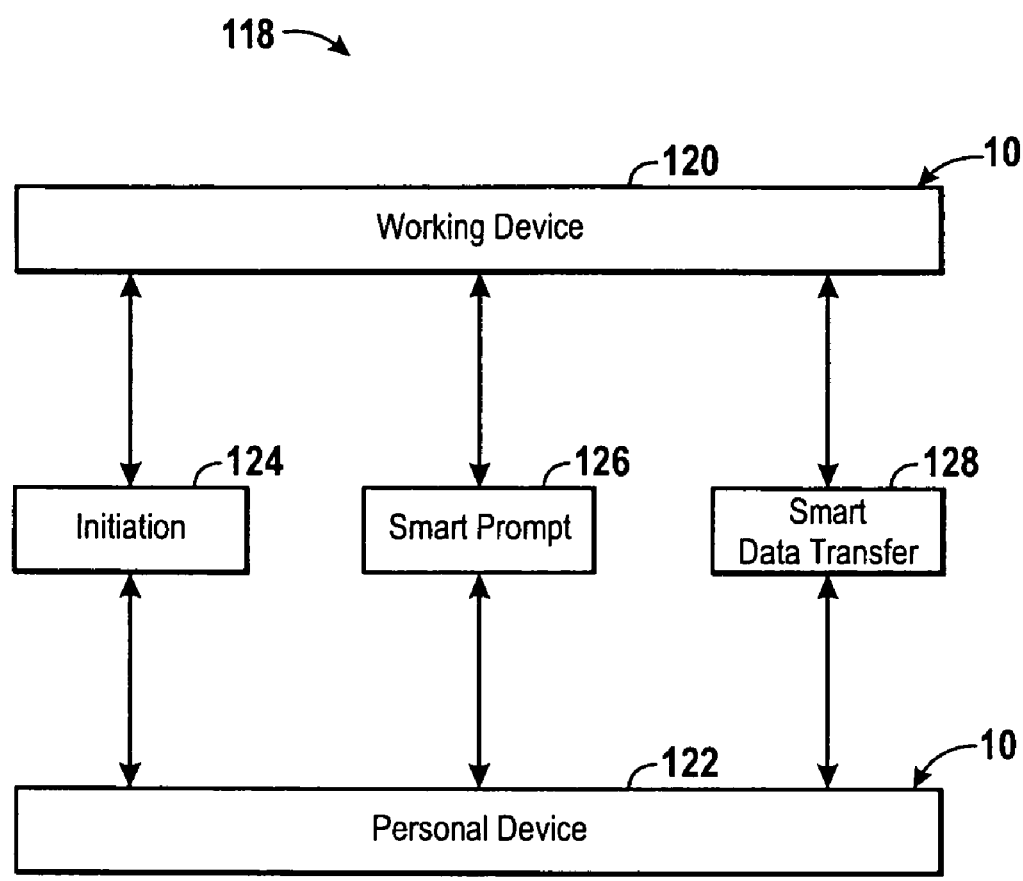
FIG. 10 is a block diagram of a simplified data transfer system for transferring data between two embodiments of the electronic device of FIG. 1.

FIG. 10 is a schematic view of a simplified data transfer system 118 for transferring user data between two electronic devices 10. In the simplified data transfer system 118, one of the electronic devices 10 is termed a working device 120, while the other is termed a personal device 122. The working device 120 represents the one of the electronic devices 10 which will be transferring its device state 62. The personal device 122 represents the one of the electronic devices 10 which will be receiving the device state 62 from the working device 120. The working device 120 and the personal device 122 may be any variation of the electronic device 10, as indicated by FIGS. 8A-E and 9A-F.

As illustrated in FIG. 10, the simplified data transfer system 118 principally operates in three phases, an initiation 124, a smart prompt 126, and a smart data transfer 128. Each phase may involve a number of possible steps which, as discussed below, may vary based on preset preferences, available network communication channels between the working device 120 and the personal device 122, or other factors describing the context of the transaction. A general overview of the operation of the simplified data transfer system 118 is described with reference to FIG. 11, preferences are described with reference to FIGS. 12A-D, and available network communication channels are described with reference to FIG. 13.

With continued reference to FIG. 10, the simplified data transfer system 118 may begin when either the working device 120 or the personal device 122 causes the initiation 124, during which the working device 120 and the personal device 122 may begin a simplified data transfer according to the techniques described herein. The initiation 124 may begin when the NFC interfaces 34 of the working device 120 and the personal device 122 are placed in close proximity. Alternatively, the initiation 124 may begin via a simplified data transfer application running on either the personal device 122 or the working device 120. The initiation 124 is described in greater detail below with reference to FIGS. 14-20.

Following the initiation 124, the working device 120 or the personal device 122 may or may not display the smart prompt 126, depending on various factors describing the context of the data transfer transaction. For example, if factors indicate that both the working device 120 and the personal device 122 are owned by different individuals or that there is a large amount of data to be transferred, the smart prompt 126 may appear on either the working device 120 or the personal device 122 to allow the selection of user data for transfer. Alternatively, if factors indicate that both devices are owned by the same individual and only one application is open on the working device 120, the smart prompt 126 may not appear on either device and the smart data transfer 128 may begin automatically. The smart prompt 126 is described in greater detail below with reference to FIGS. 21-24.

During the smart data transfer 128, the working device 120 may transfer its device state 62 to the personal device 122. The working device 120 and the personal device 122 may first determine a most appropriate communication channel based on the context of the transaction. For example, a preferred communication channel may be chosen based on factors including shared communication capabilities, available network permissions, and physical proximity. The smart data transfer 128 is described in greater detail below with reference to FIG. 25.

The working device 120 may subsequently transfer all or part of the device state 62 to the personal device 122 using the preferred communication channel. Upon receipt of the data, the personal device 122 may prompt the user to open the data or may open certain data automatically. The receipt of user data following the smart data transfer 128 is described in greater detail below with reference to FIGS. 26-28.

As should be appreciated, the simplified data transfer system 118 may be used for transferring data in a number of specific situations. For example, the working device 120 may be the computer 58 and the personal device 122 may be the handheld device 36. The above situation is described in greater detail from the point of view of the working device 120 and the personal device 122 with reference to FIG. 29, and from the point of view of a user with reference to FIG. 30.

The smart data transfer 128 of the simplified data transfer system 118 may additionally or alternatively take place in two stages. A first transfer may transfer the user data of the device state 62 to remote storage or into the main memory 14 or the nonvolatile storage 16 of the working device 120. In a second transfer at a later time, the user data of the device state 62 may be transferred from storage to the personal device 122. The situation when the smart data transfer 128 involves two stages is described in greater detail below with reference to FIGS. 31-32.

Finally, the smart data transfer 128 of the simplified data transfer system 118 may additionally or alternatively be used twice among three electronic devices 10, as depicted in FIGS. 9A-F. As such, the simplified data transfer system 118 may be used to transfer user data or pointers associated with the user data from the first device to the second device. The simplified data transfer system 118 may next be used to transfer the user data from the second device to the third device. Employment of the simplified data transfer system 118 for transferring data among three devices is described in greater detail below with reference to FIGS. 33-35.

As should further be appreciated, the use of the simplified data transfer system 118 for transferring data among three devices may occur in a variety of specific situations. For example, the working device 120 may be the computer 58 having the presentation 102 open and the personal device 122 may be the handheld device 36. A user may employ the simplified data transfer system 118 to transfer the presentation 102 from the working device 120 to another computer 58 by way of the personal device 122. The above situation is described in greater detail from the point of view of the working device 120 and the personal device 122 with reference to FIG. 36, and from the point of view of a user with reference to FIG. 37.

Figure 11:
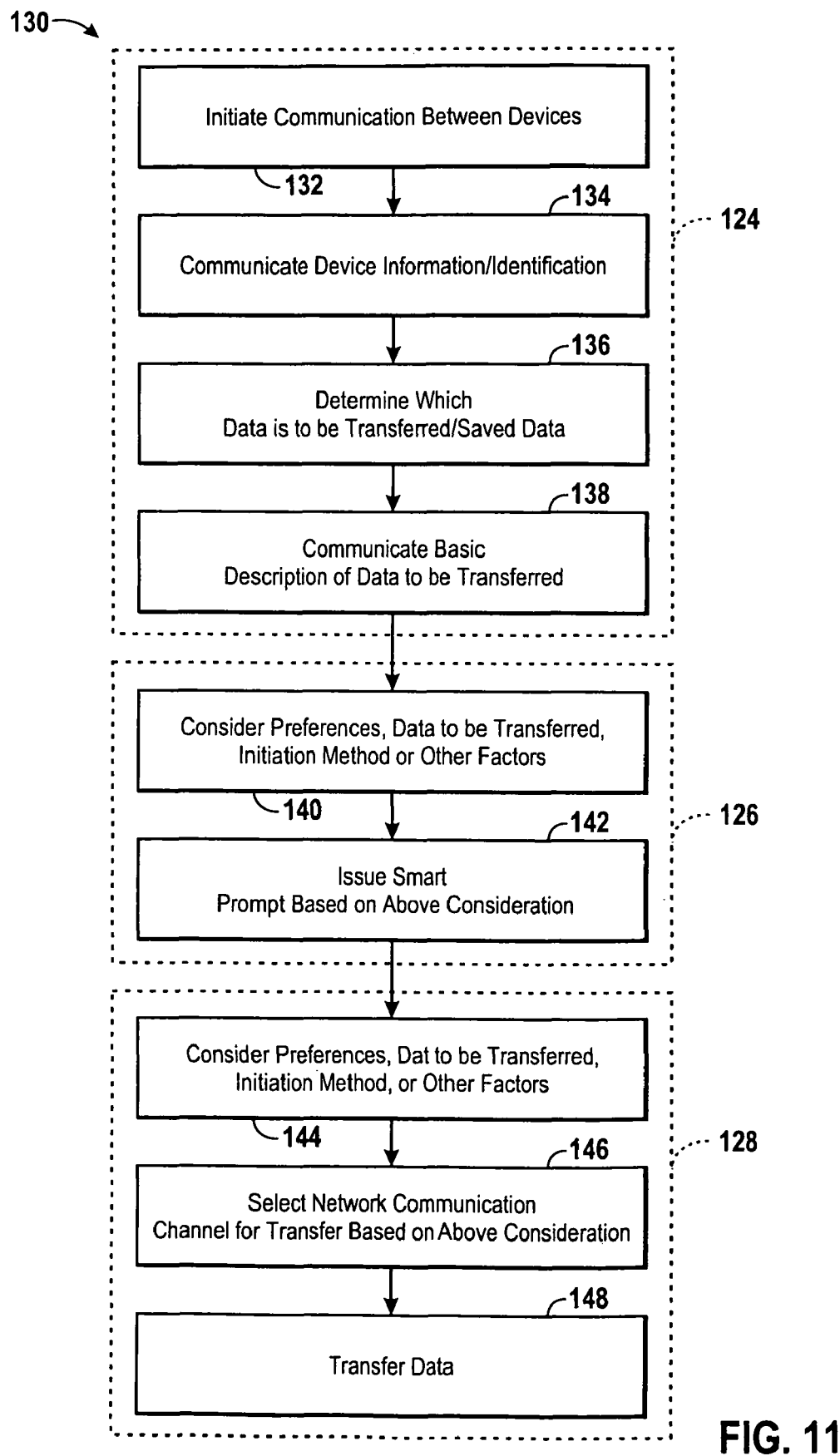
FIG. 11 is a flowchart describing generally the operation of the simplified data transfer system of FIG. 10.

Turning to FIG. 11, a flowchart 130 illustrates generally the operation of the simplified data transfer system 118. The flow chart 130 describes the general steps associated with each phase of the simplified data transfer system 118. Particularly, steps 132 through 138 represent steps for the initiation 124, steps 140 and 142 represent steps associated with the smart prompt 126, and steps 144 through 148 represent steps associated with the smart data transfer 128.

Step 132 represents a first step to the initiation 124 of the simplified data transfer system 118. In step 132, communication between the working device 120 and the personal device 122 may first be initiated in a variety of ways. As discussed below with reference to FIGS. 14, 17, and 18, communication between the working device 120 and the personal device 122 may begin when the NFC interfaces 34 of the working device 120 and the personal device 122 are placed in close proximity or, alternatively, when a simplified data transfer application running on either the personal device 122 or the working device 120 initiates communication with the other.

In step 134, the working device 120 and the personal device 122 may communicate information describing the capabilities of each device to the other. The information communicated in step 134 may be used in later steps to determine, for example, which prompt to issue for the smart prompt 126 or which network connection to establish for the smart data transfer 128. In the next step 136, the working device 120 may determine which user data of the device state 62 may be prepared for transfer. During step 136, the user data associated with various open applications of the device state 62 may be saved and stored in a separate location in the main memory 14 or the nonvolatile storage 16 of the working device 120. In step 138, the working device 120 may communicate a basic description of the user data of the device state 62 which is to be transferred to the personal device 122.

Steps 140 and 142 represent steps associated with the smart prompt 126. In step 140, the working device 120 or the personal device 122 may consider a variety of factors to determine whether and which kind of smart prompt to issue. For example, the working device 120 or the personal device 122 may consider stored preferences, the data expected to be transferred, the method used to begin the initiation 124, or other factors, such as physical proximity of the personal device 122 to the working device 120 (i.e., the location determined by the location sensing circuitry 22). In step 142, the working device 120 or the personal device 122 may or may not issue a prompt based on the considerations undertaken in step 140.

Steps 144 through 148 represent steps associated with the smart data transfer 128. In step 144, the working device 120 or the personal device 122 may consider a variety of factors in preparation for determining which communication channels may be used for the smart data transfer 128. For example, the working device 120 or the personal device 122 may consider stored preferences, the data expected to be transferred, the method used to begin the initiation 124, or other factors, such as physical proximity of the personal device 122 to the working device 120 (i.e., the location determined by the location sensing circuitry 22).

Based on the considerations taken in step 144, the working device 120 or the personal device 122 may select a network communication channel for the transfer to take place. Having chosen the network communication channel over which to transfer the user data from the device state 62 of the working device 120 to the personal device 122, in step 148, the data may be transferred. It should be noted that, based on the device information exchanged by the working device 120 and the personal device 122 in step 136, the working device 120 may convert certain user data prior to transfer. For example, if the personal device 122 lacks the capability to process a particular type of document, the working device 120 may first convert the document to an image or PDF which the personal device 122 may display prior to transfer.

FIGS. 12A-D illustrate various preferences which may be set in simplified data transfer software which may run on electronic devices 10. The preferences may serve as factors for determining, for example, which data is to be saved for transfer during the initiation 124, whether and of which type of prompt to issue for the smart prompt 126, and which network to select for performing the smart data transfer 128.

Figure 12B:
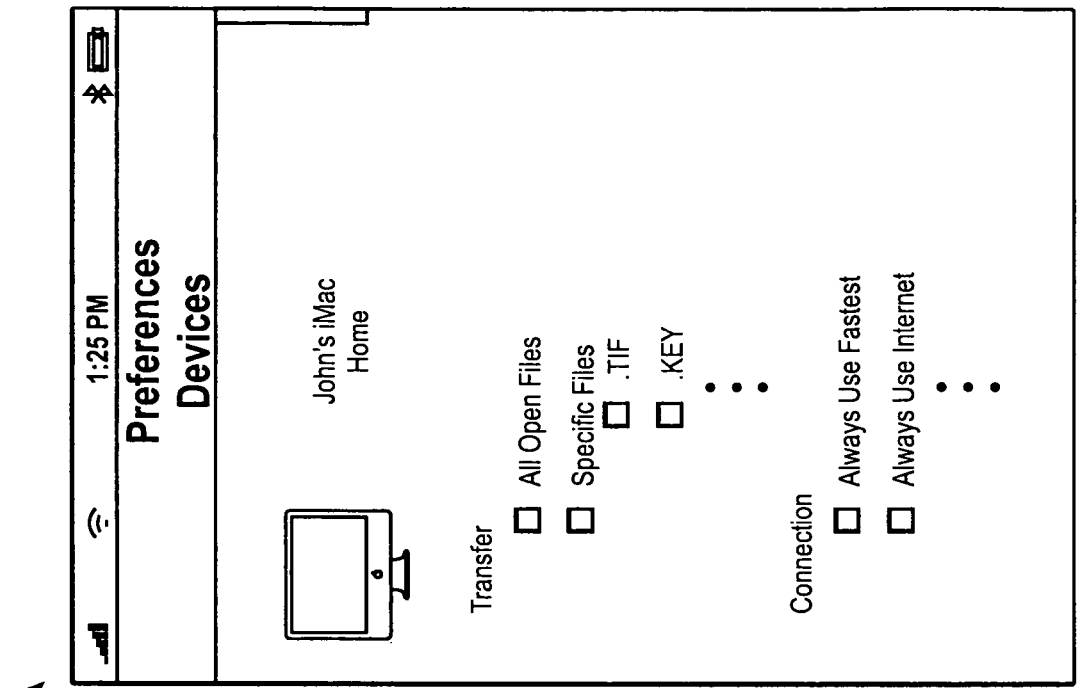
Figure 12A:
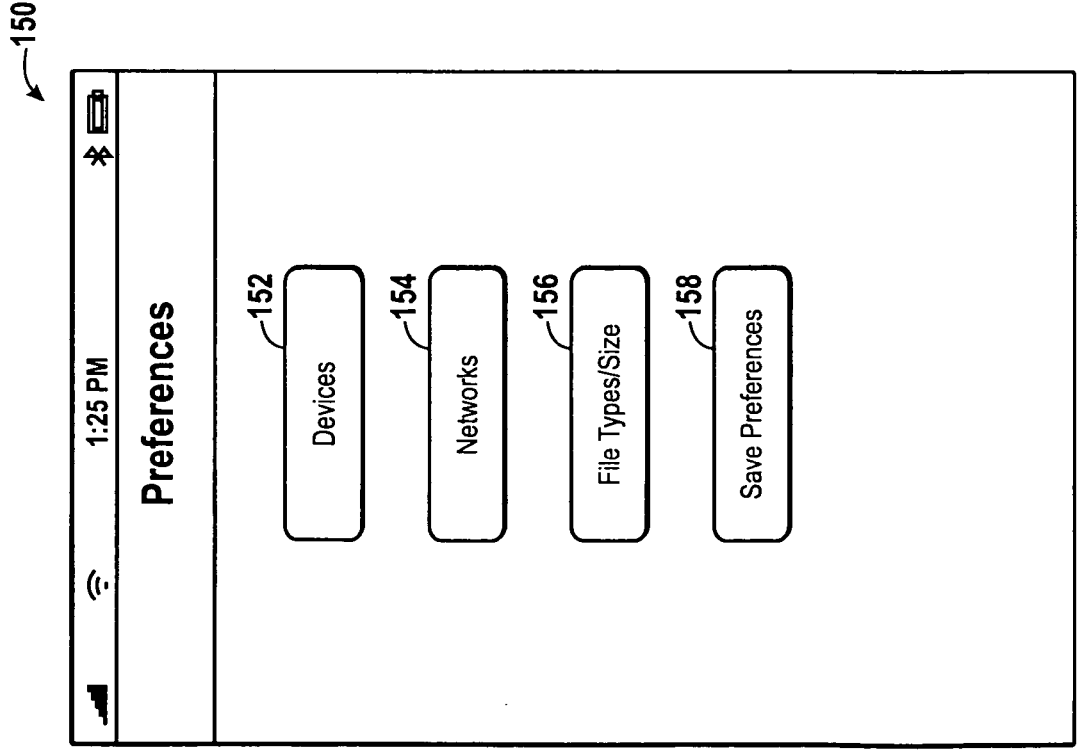

Turning first to FIG. 12A, a preference overview page 150 may include a variety of preference category buttons 152 through 156 and a save button 158. The preference category button 152 may allow configuration of preferences associated with particular devices that a user may possess; the preference category button 154 may allow configuration of preferences associated with particular networks, such as those illustrated in FIG. 13; and the preference category button 156 may allow configuration of preferences associated with certain file types or file sizes. The save button 158 may allow preference configurations to be saved in the main memory 14 or the nonvolatile storage 16 of the electronic device 10.

FIG. 12B illustrates device preferences 152 which may appear upon selection of the preference category button 152. The device preferences 152 may include any number of preferences associated with particular devices. For example, the device preferences 152 may include which type or size of user data associated with the device state 62 of each particular device to transfer; which preferred network connection to make to each particular device; whether to trust by default certain other unknown electronic devices 10; or which versions of files to request from each particular device when multiple versions exist on the same device, etc.

With continued reference to FIG. 12B, device preferences 152 regarding the type or size of user data associated with the device state 62 of each particular device may allow unique selections based on the working device 120. The unique preferences for selections for each working device 120 that a given personal device 122 may establish a simplified data transfer 114 or 116 may include, for example, whether to transfer all open files; whether to transfer certain specific file types; whether to transfer files above or beneath a certain size; whether to transfer user data associated only with the topmost open application or user data associated with certain applications or types of applications (e.g., only productivity or business applications, entertainment applications, family applications, gaming applications, media applications, educational applications, accounting applications, etc.); whether to prioritize the transfer of user data associated with the topmost open application or user data associated with certain applications or types of applications; whether to transfer files having certain ratings, such as MPAA ratings, above or below a predetermined threshold; whether to transfer user data having certain keywords; whether to transfer user data which may be capable of being processed by the receiving personal device 122; or whether to transfer user data generated by a different user or only to transfer user data generated by the same user. It should be appreciated that the preferences described above may not only specify which types of user data may be transferred, but also which user data is displayed as transferable to the personal device 122.

To use the example introduced with reference to FIG. 8A above, a user may be sitting at their desk at work with an important spreadsheet open on their computer 58 when the user is called into an unexpected meeting. The user may have a number of other personal applications running. The preferences described above may allow the user to "grab" only files related to work from the user's work computer, such as only user data associated with productivity applications. In this way, the user may transfer only the important spreadsheet in the simplified data transfer 114, showing up to the meeting with only those files pertinent to work.

Similarly, a user may be working on their personal finances while listening to music using their computer at home. As it's time for the user to go in to work, the user may want to continue listening to the music on the train on the way. The preferences described above may allow the user to avoid "grabbing" files related to personal finance or certain keywords from the user's home computer. When the user transfers the media in the simplified data transfer 114, the user's personal finances may remain privately on the computer at home.

Preferred connections for use with each device may include, for example, whether to connect using the fastest available connection; whether to connect using only the Internet or not ever using the Internet; whether to connect using certain specified encryption schemes or to require a passcode or passkey before transfer may occur; whether to require proximity based on the physical location of the electronic devices 10 (i.e., as determined by the location sensing circuitry 22); or whether to prefer a particular, specified connection to the particular device.

Preferences regarding whether to trust by default certain other unknown electronic devices 10 may represent preferences which may be preset by, among others, developers, third party retailers, or wireless carriers. By presetting certain other unknown devices to be trustworthy among the device preferences 152, the developers, third party retailers, or wireless carriers may allow trust by default for certain devices which may be manufactured, sold, or employed by the same.

With regard to preferences associated with which versions of files to request from each particular device when multiple versions exist on the same device, the preferences may include whether to transfer all such files; whether to transfer only the most recently modified files; or whether to transfer only those files most recently modified by a certain user.

FIG. 12C illustrates network preferences 154 which may appear upon selection of the preference category button 154. The network preferences may relate specifically to each type of network connection which may be available for the smart data transfer 128 and may include, for example, preferences reflecting a generally preferred network order or generally preferred security measures.

Preferences reflecting a generally preferred network order may include, for example, whether to set a particular network connection as preferred; whether to set the network connection as not to be used; whether to set the network connection to be used only in certain instances, such as within a certain proximity based on the physical location of the electronic devices 10 (i.e., as determined by the location sensing circuitry 22), when both electronic devices 10 share the same user, or when the initiation 124 of the simplified data transfer system 118 is begun in a certain manner (e.g., by NFC or in response to a prompt in simplified data transfer software); whether to avoid a particular network if the use of the network may require additional cost; or whether to order various network connections by setting a level of priority.

Generally preferred security measures may include, for example, whether to restrict connecting via a particular network to certain trusted connections; whether to use certain types of encryption, such as WPA encryption; whether to require passcodes or passkeys; or whether to require the use of QR encryption.

FIG. 12D illustrates file type/size preferences 156, which may appear upon selection of the preference category button 156. The file type/size preferences 156 may include, for example, which file types may receive priority in transfer; which file types to transfer or not to transfer; or which file sizes to transfer or not to transfer.

Preferences regarding which files may receive priority in transfer may include, for example, establishing priority based on whether a file is associated with a productivity or office-related software product; whether a file represents user data created or modified by a particular user, such as the owner of the receiving device; whether a file is within or in excess of a particular size; which network communication channels may be available for the smart data transfer 128; whether a file is capable of being processed natively by the receiving device; whether a file is of a particular type; or whether a file is to be transferred from a particular device or a particular class of devices.

Preferences associated with which file types to transfer or not to transfer may include, for example, preferences limiting transfer only to certain specified files; limiting transfer to only files capable of being processed by the receiving device; not limiting files at all; or requiring a conversion of files not capable of being natively processed to an appropriate form (e.g., requiring conversion of a document into an image file or PDF).

With regard to preferences associated with which file sizes to transfer or not to transfer, such preferences may include, for example, whether to transfer files above a particular size; which network to prioritize based on file size; or whether to transfer only a portion of a file above a particular size.

Reviewing FIGS. 12A-D, it should be understood that a user may adjust the various preferences manually, or the preferences may be adjusted automatically based on user behavior. By way of example, a user may use one electronic device 10, such as the handheld device 36, to obtain via the simplified data transfer system 118 user data associated with the device state 62 of another electronic device 10, such as the computer 58. If the user cancels the transfer of all of a particular type of user data while the data is being transferred, the preferences may be altered to reflect the user behavior. For example, the preferences may be set to lower the priority of transfer of the particular type of file, may be set to prevent the file type from being transferred, or may set the file type to be one which is not transferred over certain premium networks which may levy additional charges.

It should also be appreciated that the preferences of FIGS. 12A-D may permit developers, third party retailers, or wireless carriers to preinstall preferences in addition to or in lieu of those customizable preferences chosen by users. For example, a developer or third party retailer may preinstall preferences regarding certain other electronic devices 10, such as those produced by the developer or sold by the third party retailer. A wireless carrier may preinstall a preference regarding certain wireless data networks which may be accessed by the WAN interface 132, such as the EDGE network or other 3G networks.

Figure 13:
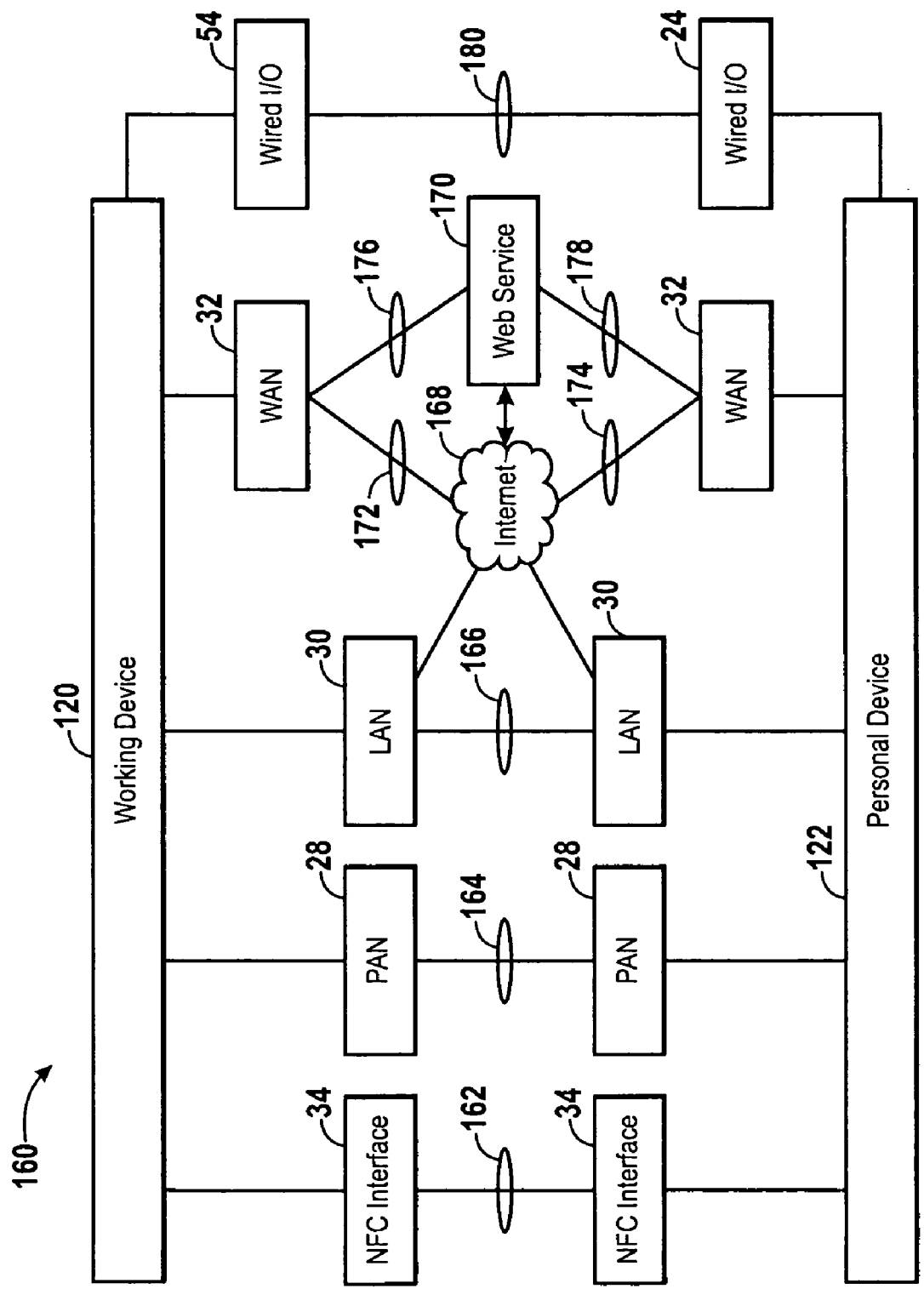
FIG. 13 is a schematic view of potential communication channels which may be employed by the simplified data transfer system of FIG. 10.

FIG. 13 is a schematic view of potential communication channels 160 between the working device 120 and the personal device 122, which represent the electronic devices 10 configured for transfer in the simplified data transfer system 118. Each communication channel 160 shared between the working device 120 and the personal device 122 may be used for the initiation 124 or the smart data transfer 128. Which communication channel is used for the initiation 124 or the smart data transfer 128 may depend on a variety of factors, including, for example, the preferences discussed with reference to FIGS. 12A-D above or the context of the initiation 124 discussed with reference to FIGS. 14-20.

Reviewing each of the communication channels 160 in turn, if each of the working device 120 and the personal device 122 include NFC interfaces 34, a near field communication (NFC) communication channel 162 may communicably link the two devices. When the NFC interfaces 34 of the working device 120 and the personal device 122 are placed in close proximity, the working device 120 and the personal device 122 may establish the NFC communication channel 162.

It should be appreciated that the NFC communication channel 162 may generally remain open for a relatively short period of time and may operate at a lower bandwidth. As such, the NFC communication channel 162 may generally accommodate the initiation 124, while the subsequent smart data transfer 128 may generally take place via another of the communication channels 160 described below.

As noted above, the working device 120 and the personal device 122 may potentially be connected through many of the communication channels 160 other than the NFC channel 162. Particularly, if either device lacks the NFC interface 34, the initiation 124 instead may take place over the other of the communication channels 160. If the initiation 124 takes place over the other of the communication channels 160, the initiation 124 may begin when a user initiates a transfer using a smart data transfer application on either the working device 120 or the personal device 122, as described with reference to FIGS. 17-18. In some embodiments, although the working device 120 and the personal device 122 may both include the NFC interface 34, a user may elect to have the initiation 124 take place over another one of the communication channels 160.

Among the possible communication channels 160 other than the NFC channel 162 is a personal area network (PAN) communication channel 164, connected through the PAN interfaces 28 of each device. By way of example, the PAN communication channel 164 may represent a peer-to-peer Bluetooth® connection, an IEEE 802.15.4 (e.g., ZigBee) network, or an ultra wideband network (UWB) between the working device 120 and the personal device 122.

The working device 120 and the personal device 122 may additionally or alternatively be connected via a local area network (LAN) communication channel 166. The respective LAN interfaces 30 of the working device 120 and the personal device 122 may share a peer-to-peer connection directly to one another via the LAN communication channel 166, or may connect to one another via a router or a network controller along the LAN communication channel 166. The LAN communication channel 166 may represent a wired connection, such as an Ethernet connection, but may also represent a wireless connection, such as an IEEE standard 802.11.x wireless network, or Wi-Fi.

It should be appreciated that the working device 120 and the personal device 122 may establish the PAN communication channel 164 or the LAN communication channel 166 using a device identification networking protocol. By way of example, the device identification networking protocol may be Bonjour® by Apple Inc. Each of the working device 120 and the personal device 122 may broadcast using internet protocol (IP) their identifications and services, programs, and/or communication capabilities that each device may have. The working device 120 or the personal device 122 may receive information via the device identification networking protocol so as to open peer-to-peer connections via the PAN communication channel 164 or the LAN communication channel 166. As should be appreciated, more than one electronic device 10 may be broadcasting information using the device identification networking protocol. As such, the personal device 122 may select based on preferences with which electronic device 10 to initiate the simplified data transfer 114.

While the working device 120 or the personal device 122 may be connected via the PAN communication channel 164 or the LAN communication channel 166, the devices may also be connected by way of the Internet 168. By connecting to one another via the Internet 168, the working device 120 and the personal device 122 may remain physically remote from one another while the simplified data transfer 114 occurs. Connecting via the Internet 168 may also allow the working device 120 and the personal device 122 to retain communicative capabilities if a local peer-to-peer connection, such as communication channels 164 or 166, is disrupted or lost.

To locate one another over the Internet 168, the working device 120 or the personal device 122 may first query a web service 170 to obtain an internet protocol (IP) address of the other. The web service 170 may represent a dynamic domain name system (DNS) service, which may maintain the current IP address of each device by communicating with a plugin associated with the simplified data transfer application residing on each device. By way of example, the web service 170 may be a function of the Back to My Mac® service from Apple, Inc.

The web service 170 may also provide remote storage capability to facilitate the smart data transfer 128. As discussed further below with reference to FIGS. 31-34, the smart data transfer 128 may involve a temporary transfer of user data of the device state 162 of the working device to remote storage associated with the web service 170. From the remote storage associated with the web service 170, the user data may thereafter be transferred to the personal device via the Internet 168 or via a direct connection to the web service 170.

With further reference to FIG. 13, the working device 120 may reach the Internet 168 via its LAN interface 30 or via a wide-area network (WAN) communication channel 172, which may represent, for example, a cellular data network such as EDGE or a 3G network. Similarly, the personal device 122 may connect to the Internet 168 via its LAN interface 30 or its WAN interface 32. If the personal device 122 connects to the Internet via the WAN interface 32, it may do so via a wide area network (WAN) communication channel 174, which may also represent, for example, a cellular data network such as EDGE or a 3G network.

It should be appreciated that the working device 120 and the personal device 122 may also establish a connection directly to the web service 168 directly via the respective WAN interfaces 32 of the devices. The working device 120 may connect to the web service 170 via a wide area network (WAN) communication channel 176, which may represent, for example, a cellular data network such as EDGE or a 3G network. Similarly, the personal device 122 may connect to the web service 170 via a wide area network (WAN) communication channel 178, which may also represent, for example, a cellular data network such as EDGE or a 3G network.

The working device 120 and the personal device 122 may also be connected to one another via a wired input/output (I/O) communication channel 180. The wired I/O communication channel 180 may generally permit an exceptionally rapid transfer of data between the working device 120 and the personal device 122. As discussed below, any of the potential communication channels 160 may provide a manner of communicating during the initiation 124 or during the smart data transfer 128, and one of the communication channels 160 employed for the initiation 124 may vary from that employed by the smart data transfer 128.

Figure 14:
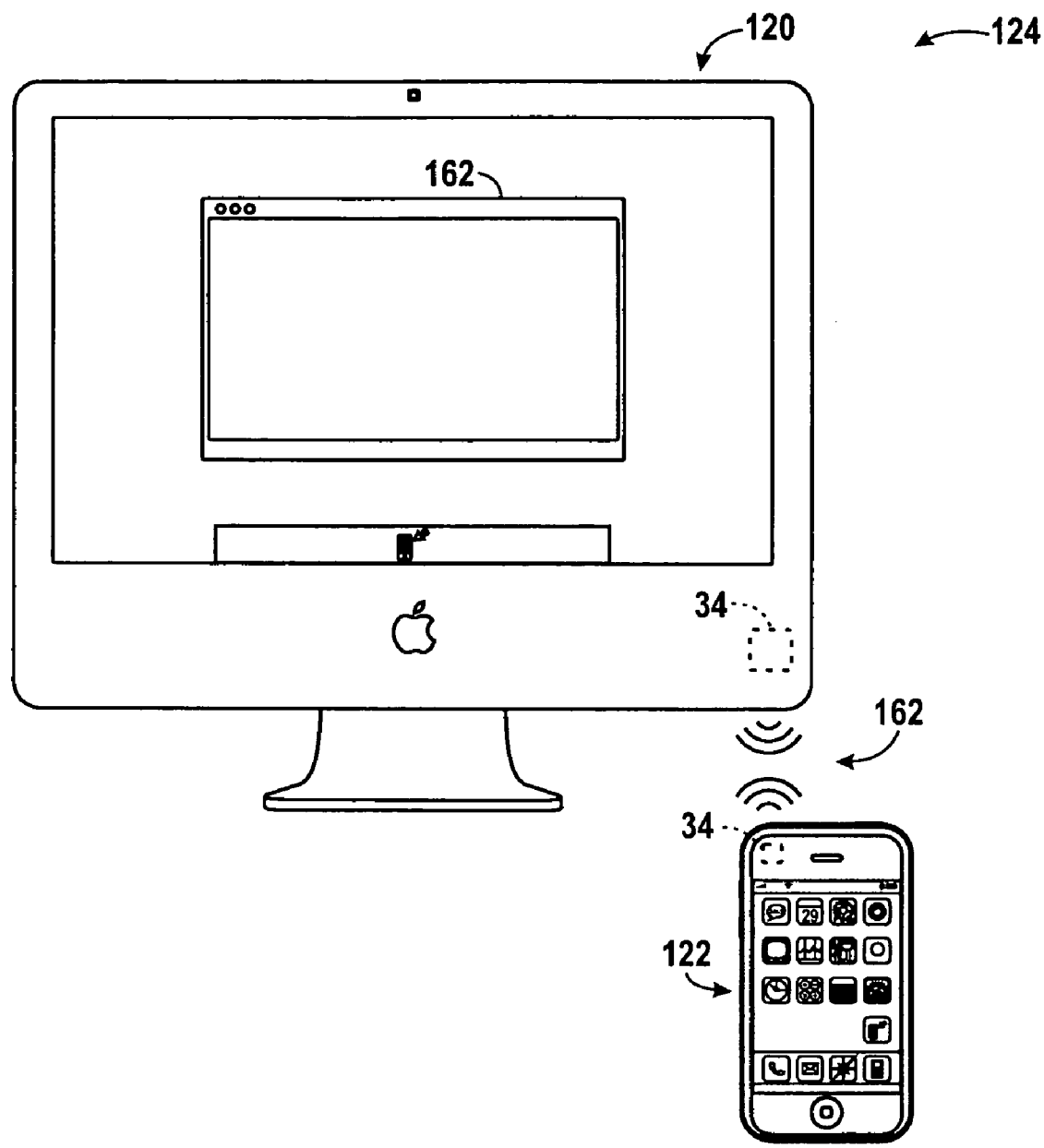
FIG. 14 is a schematic view of an embodiment in which initiation of the simplified data transfer system of FIG. 10 takes place over near field communication (NFC)

FIG. 14 illustrates an embodiment in which the initiation 124 of the simplified data transfer system 118 takes place over the NFC communication channel 162 between the working device 120 and the personal device 122. It should be noted that although FIG. 14 depicts the working device 120 as the computer 58 and the personal device 122 as the handheld device 36, the working device 120 and the personal device 122 may represent any embodiment of the electronic devices 10 having the NFC interface 34.

As indicated by FIG. 14, communication involved in the initiation 124 may take place over the NFC communication channel 162 between the working device 120 and the personal device 122. To open the NFC communication channel 162, a user may tap the NFC interface 34 of the personal device 122 to within a predetermined distance (e.g., approximately 2 cm) of the NFC interface 34 of the working device 122. With the NFC communication channel 162 open, the working device 120 and the personal device 122 may communicate information to one another over the NFC communication channel 162 in preparation for the smart prompt 126 and the smart data transfer 128. Such information exchanged during the initiation 124 may include, for example, capabilities associated with each device, certain user preferences, available network configuration data, or pointers or low bandwidth elements relating to user data associated with the device state 62 of the working device 120. The information communicated over the NFC communication channel 162 may generally include short messages in extensible markup language (XML) or any other form. The messages exchanged over the NFC communication channel 162 during the initiation 124 are discussed further below.

Figure 15:
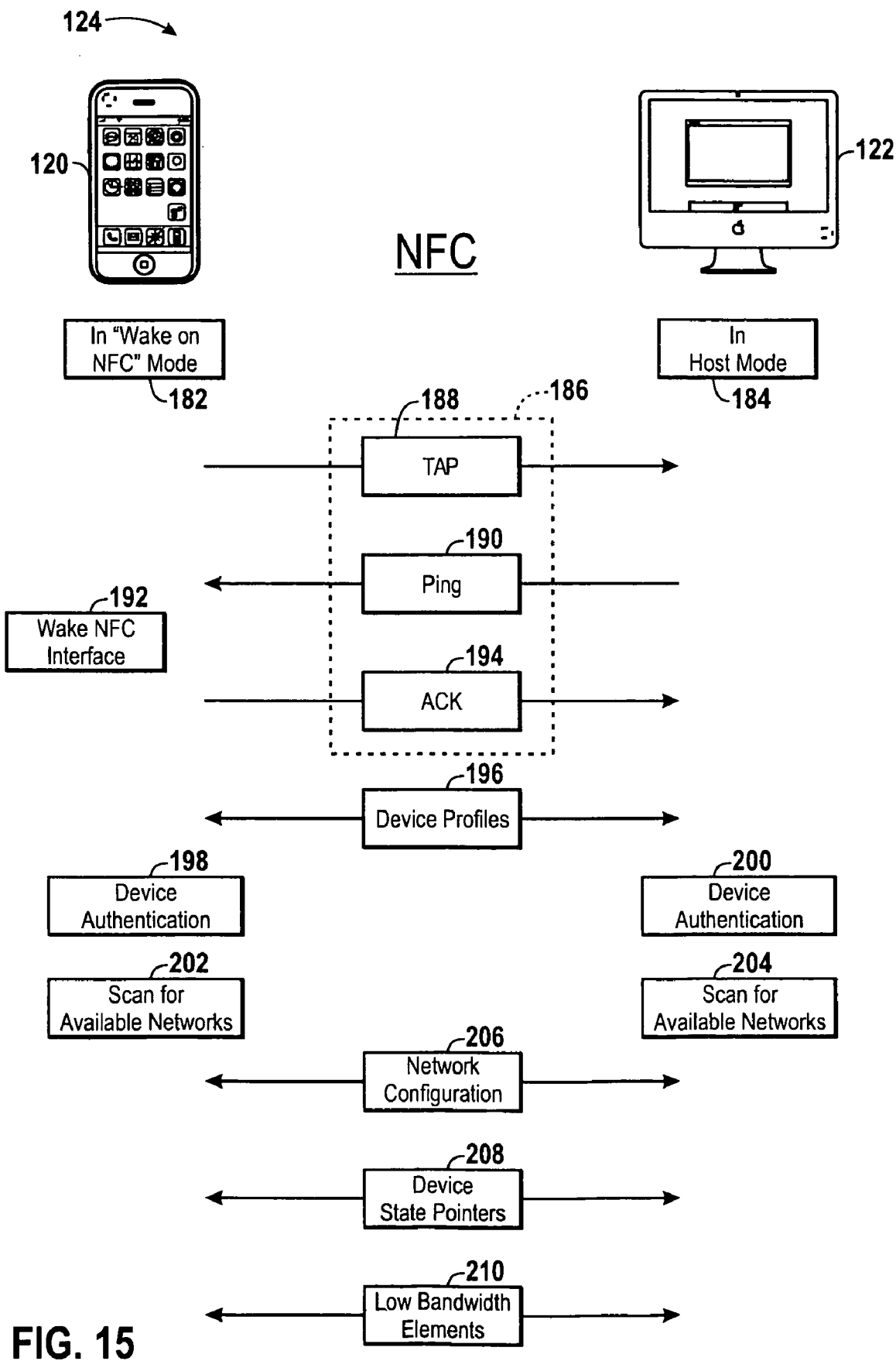
FIG. 15 is a schematic view of the communication taking place during the initiation of FIG. 14.

FIG. 15 is a schematic view of an embodiment of the initiation 124 taking place over the NFC communication channel 162. The embodiment illustrated in FIG. 15 may arise when the NFC interfaces 34 of the working device 120 and the personal device 122 are placed in close proximity, as illustrated in FIG. 14 and described above.

The NFC communication carried out the initiation 124 may take place between the working device 120 and the personal device 122. Although the working device 120 is illustrated as the computer 58 and the personal device 122 is illustrated as the handheld device 36, the working device 120 and the personal device 122 may represent any embodiments of the electronic devices 10 having the NFC interface 34.

Prior to the start of the initiation 124, the personal device 122 may be in a "wake on NFC" mode, as indicated by block 182. In the "wake on NFC" mode, the NFC interface 34 of the personal device 122 may remain inactive until the NFC interface 34 receives an NFC signal from another NFC interface 34. At the same time, as indicated by block 184, the NFC interface 34 of the working device 120 may be in a host mode. Being in the host mode, the NFC interface 34 of the working device 120 may periodically emit NFC signals to seek out other proximate NFC interfaces 34.

The initiation 124 over may begin with an initiation handshake 186. The initiation handshake 186 may start when a user taps the NFC interface 34 of the personal device to the NFC interface 34 of the working device 120, as indicated by block 188. As the NFC interface 34 of the working device 120 may be in a host mode, the NFC interface 34 of the working device 120 may periodically emit a ping message 190. The NFC interface 34 of the personal device 122 may receive the ping message 190, causing the NFC interface 34 of the personal device 122 to awake, as indicated by block 192. Subsequently, the NFC interface 34 of the personal device 122 may reply with an acknowledgement (ACK) message 194, which may be received by the NFC interface 34 of the working device 120.

Following the initiation handshake 186, the working device 120 and the personal device 122 may exchange device profiles 196. The device profiles 196 may include a variety of information regarding the capabilities of the working device 120 and the personal device 122. For example, the device profiles 196 may include messages of any form, including extensible markup language (XML), which may denote the device name, serial number, owner name, type of device, as well as other identifying information. The other identifying information may include, for example, a service user name. The device profiles 196 may additionally denote capabilities of the personal device 122 or the working device 120 by indicating which applications, drivers, or services may be installed on each device.

As indicated by blocks 198 and 200, the personal device 122 and the working device 120 may next authenticate one another, based at least in part on the device profiles 196 previously exchanged. In the device authentication of blocks 198 and 200, the personal device 122 or the working device 120 may determine whether the other is trusted using any number of authentication schemes. The initiation 124 may be cancelled if either the personal device 122 or the working device 120 fails to authenticate the other.

For example, the personal device 122 and the working device 120 may rely on a private key known to both devices, which may have been exchanged prior to the initiation 124. Alternatively, the personal device 122 and the working device 120 may rely on a combination of a public key and a private key. Under such a scheme, the personal device 122 and the working device 120 may each exchange public keys associated with one another prior to or during the device authentication of blocks 198 and 200, or may obtain public keys from another source, such as the web service 170. The personal device 122 and the working device 120 may verify the public keys with a certificate authority over the Internet 168 or via a web of trust. In some embodiments, the web service 170 may represent the certificate authority. If there is any link broken in the chain of trust, the initiation 124 may be terminated.

Following the device authentication of blocks 198 and 200, the personal device 122 and the working device 120 may scan for available network communication channels 160, as noted by blocks 202 and 204. After scanning for the available network communication channels 160, the personal device 122 and the working device 120 may exchange network configuration information 206. The network configuration information 206 may include, for example, XML messages denoting lists of network communication channels 160 accessible via the working device 120 or the personal device 122. Among other things, the network configuration information 206 may include known authorization keys and service set identifier (SSID). By way of example, the network configuration information 206 may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information 206 may be stored for use at a later time to permit the personal device 122 and the working device 120 to ascertain a higher bandwidth connection.

The personal device 122 and the working device 120 may remain in communication via the NFC communication channel 162 to transfer additional information. As illustrated in FIG. 15, the working device 120 may transmit device state pointers 208 to the personal device 122, which may describe the user data of the working device 62 which is to be transferred. The device state pointers 208 may represent a message, such as an XML message, that includes the filename, associated application, file size, or other related information associated with each file that may be transferred. For example, the other related information may include whether or not a file has been read, a geographic location where the file was created or modified using a convention such as GeoRSS, a related uniform resource locator (URL), the hierarchy of the application with which the file is associated, the location of the application on the screen of the working device 120 with which the file is associated, the last device which modified the file, etc. The working device 120 may also transfer certain low bandwidth elements 210 associated with the user data of the device state 62 of the working device 120. Such low bandwidth elements 210 may include, for example, thumbnail images of each file to be transferred or excerpts of data from each file.

Though the device state pointers 208 and the low bandwidth elements 210 may be transferred via the NFC communication channel 162, as indicated, other communication channels 160 may additionally or alternatively be employed to do so. For example, the device state pointers 208 or the low bandwidth elements may be transferred over the PAN communication channel 164 or the LAN communication channel 166.

Figure 16:
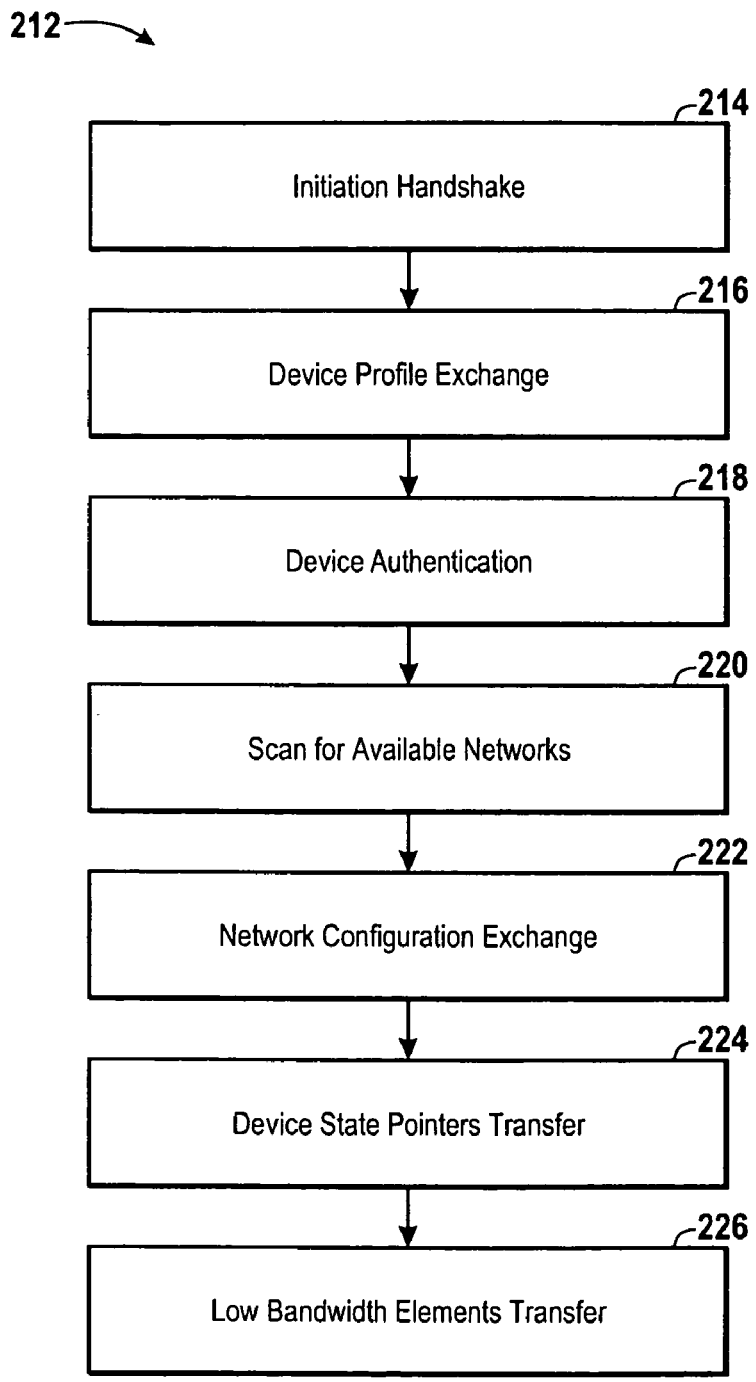
FIG. 16 is a flowchart describing an embodiment of a method for performing the initiation of FIG. 14.

FIG. 16 is a flowchart 212 describing an embodiment of a method for performing the initiation 124 via the NFC communication channel 162, as illustrated by FIGS. 14-15. In a first step 214, the personal device 122 and the working device 120 may begin the initiation 124 by way of the initiation handshake 186. As illustrated in FIG. 15 and described above, the initiation handshake 186 may occur when the NFC interfaces 34 of the personal device 122 and the working device 120 are placed in close proximity to one another. The working device 120 may subsequently emit a ping 190 to wake the NFC interface 34 of the personal device 122, and the personal device 122 may reply with an ACK 194 to the working device 120.

In step 216, the personal device 122 and the working device 120 may exchange device profiles 196. As noted above with reference to FIG. 15, the device profiles 196 may include a variety of data describing the capabilities of the personal device 122 and working device 120. For example, the device profiles 196 may include messages of any form, including extensible markup language (XML), which may denote the device name, serial number, owner name, type of device, as well as other identifying information. The other identifying information may include, for example, a service user name. The device profiles 196 may additionally denote capabilities of the personal device 122 or the working device 120 by indicating which applications, drivers, or services may be installed on each device.

In step 218, the personal device 122 and the working device 120 may each perform a device authentication process based at least in part on the device profiles 196 previously exchanged. During the device authentication, the personal device 122 or the working device 120 may determine whether the other is trusted. As described above, the personal device 122 and the working device 120 may rely on a private key known to both devices, or a combination of a public and a private key. The initiation 124 may be cancelled if either the personal device 122 or the working device 120 fails to authenticate the other.

In a next step 220, the personal device 122 and the working device 120 may scan for available network communication channels 160, over which data may be transferred at a later time. In step 222, after scanning for the available network communication channels 160, the personal device 122 and the working device 120 may exchange network configuration information 206. As discussed above with reference to FIG. 15, the network configuration information 206 may include, for example, XML messages denoting lists of network communication channels 160 accessible via the working device 120 or the personal device 122. Among other things, the network configuration information 206 may include known authorization keys and service set identifier (SSID). By way of example, the network configuration information 206 may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information 206 may be stored for use at a later time to permit the personal device 122 and the working device 120 to ascertain a higher bandwidth connection.

In steps 224 and 226, the personal device 122 and the working device 120 may remain in communication via the NFC communication channel 162 to transfer additional information. In step 224, the working device 120 may transmit device state pointers 208 to the personal device 122, which may describe the user data of the working device 62 which is to be transferred. The device state pointers 208 may represent a message, such as an XML message, that includes the filename, associated application, file size, or other related information associated with each file that may be transferred. For example, the other related information may include whether or not a file has been read, a geographic location where the file was created or modified using a convention such as GeoRSS, a related uniform resource locator (URL), the hierarchy of the application with which the file is associated, the location of the application on the screen of the working device 120 with which the file is associated, the last device which modified the file, etc.

In step 226, the working device 120 may transfer certain low bandwidth elements 210 associated with the user data of the device state 62 of the working device 120. Such low bandwidth elements 210 may include, for example, thumbnail images of each file to be transferred or excerpts of data from each file.

Though the device state pointers 208 and the low bandwidth elements 210 may be transferred via the NFC communication channel 162 in steps 224 and 226, other communication channels 160 may additionally or alternatively be employed to do so. For example, in steps 224 or 226, the device state pointers 208 or the low bandwidth elements may be transferred over the PAN communication channel 164 or the LAN communication channel 166.

Figure 17B:
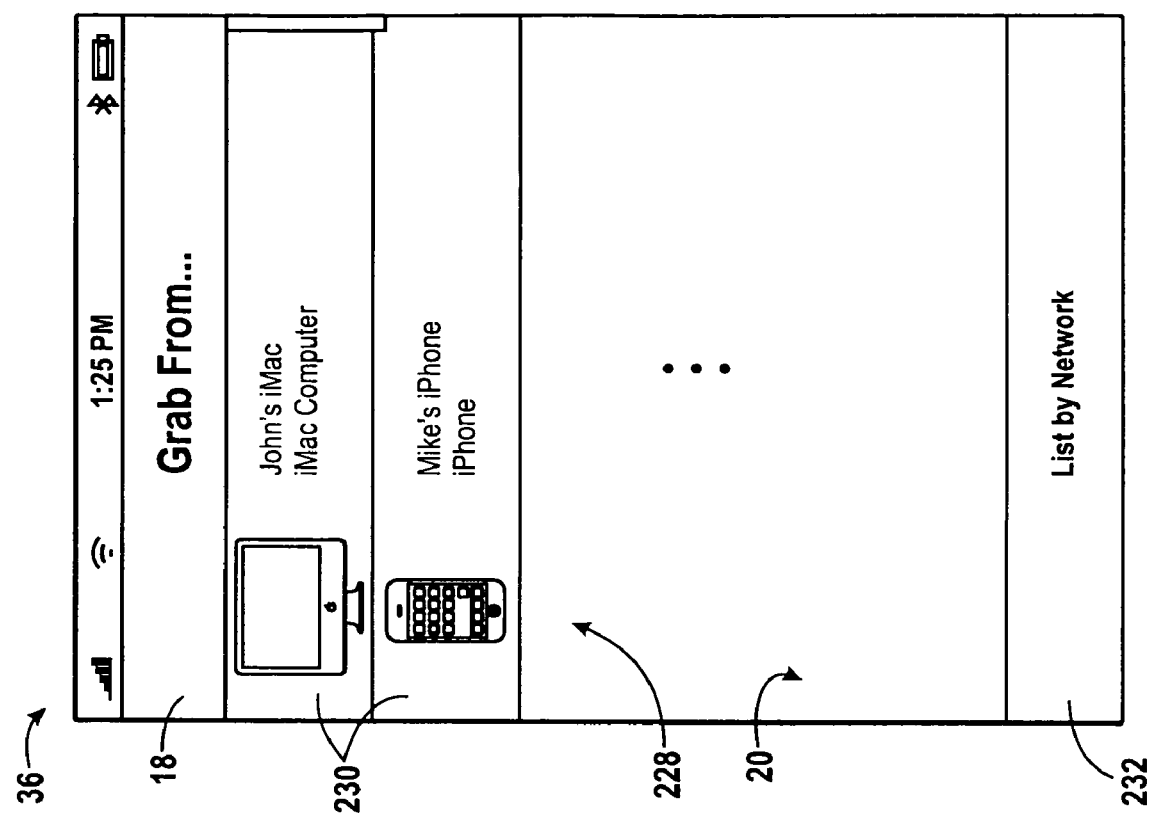
FIGS. 17A-C are schematics illustrating an alternative embodiment for performing the initiation of the simplified data transfer system of FIG. 10.
Figure 17A:
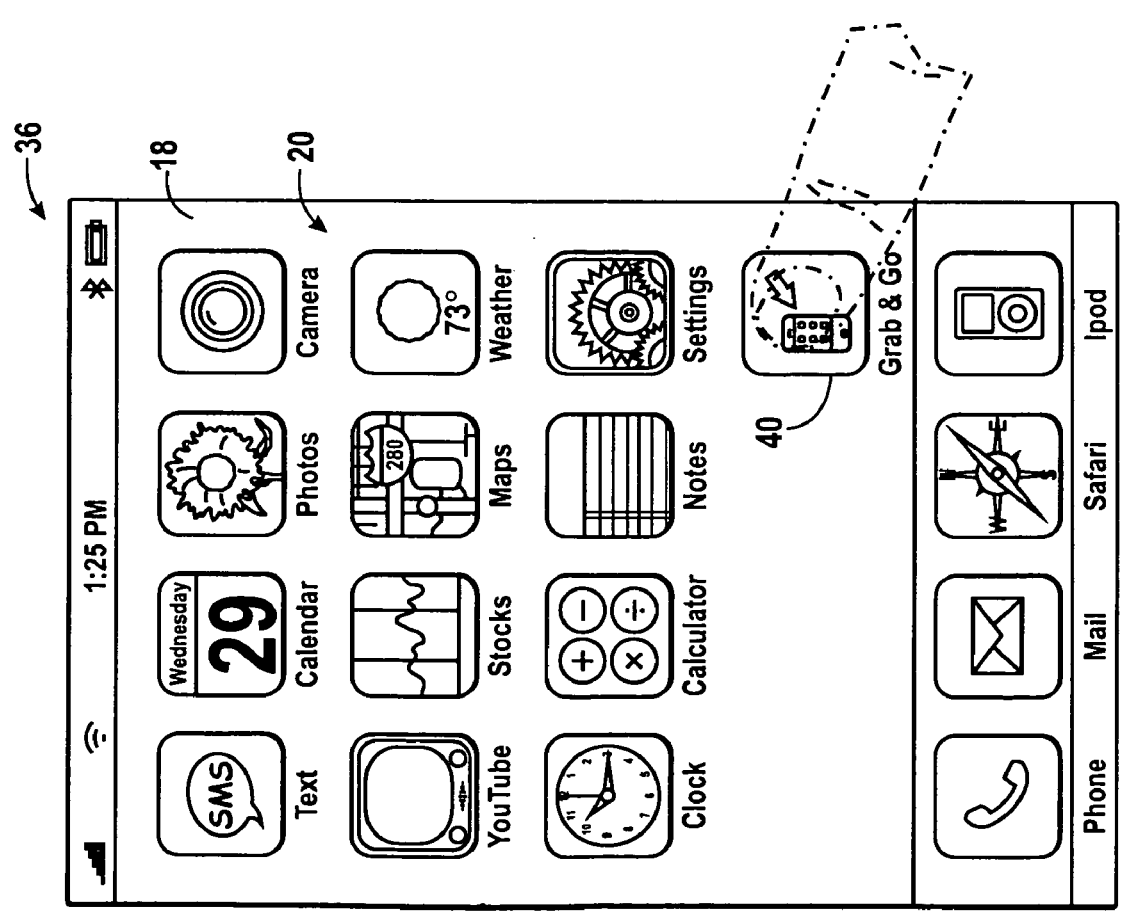
Figure 17C:
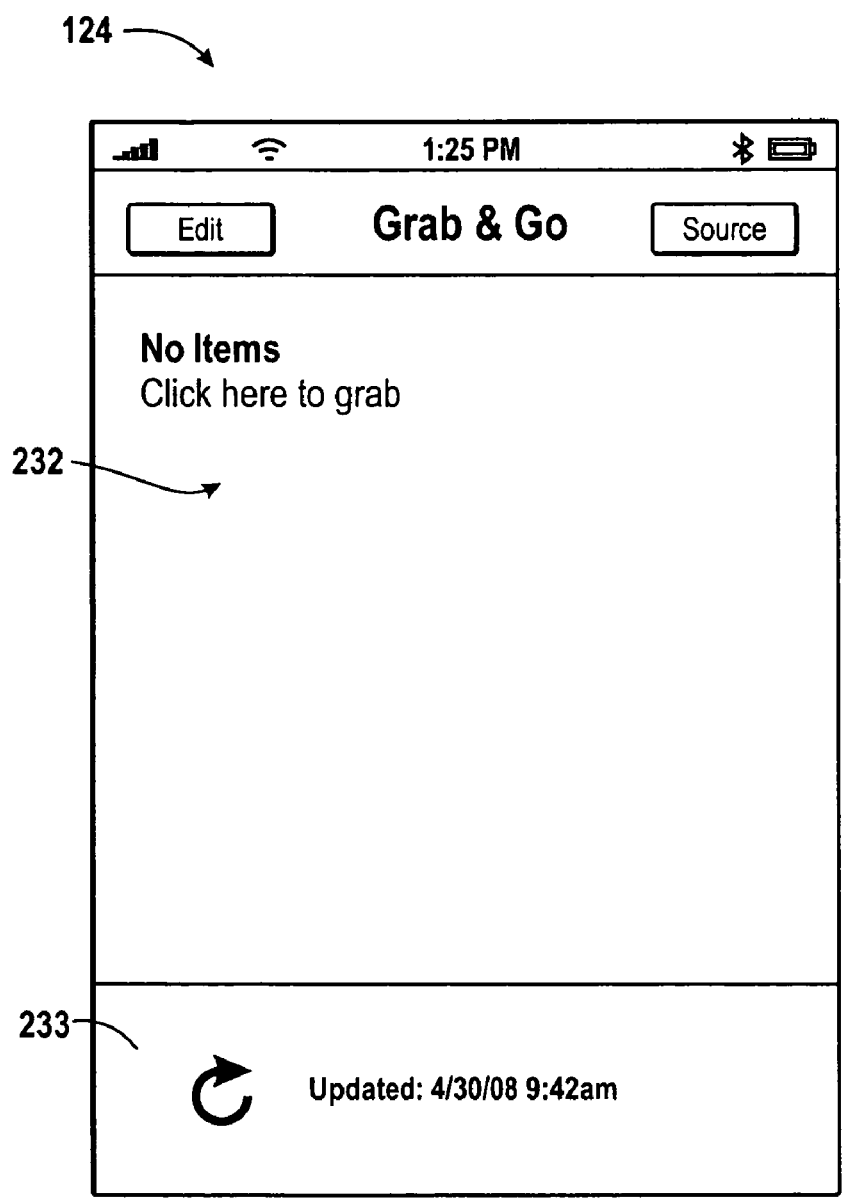

FIGS. 17A-C and 18A-B illustrate alternative manners of performing the initiation 124. With reference first to FIGS. 17A-C, one manner of performing the initiation 124 may begin when a user selects the simplified transfer application icon 50 on the personal device 122, which may be the handheld device 36. Upon selection of the icon 50, a device selection screen 228 may appear, as indicated by FIG. 17B. With the device selection screen 228, a user may select a working device 120 with which to begin a data transfer from among working device selection buttons 230. As should be appreciated, the working devices 120 appearing among the working device selection buttons 230 represent devices sharing one of the possible communication channels 160 of FIG. 13.

Turning to FIG. 17C, a data transfer screen 232 may appear after the user selects from among the working devices 120 from the working device selection buttons 230 depicted in FIG. 17B. Alternatively, the data transfer screen 232 may appear immediately upon selection of the simplified data transfer application icon 50. As indicated in FIG. 17C, prior to the initiation 124, the screen may be yet unpopulated. The screen may also provide an indication such as "No Items: press here to grab." When a user selects a refresh button 233 or presses on the blank areas of the data transfer screen 232, the personal device 122 may invoke a transfer event in the simplified data transfer application. Subsequently, the initiation 124 may begin as described below with reference to FIG. 19.

It should be appreciated that a user may decide with which working device 120 to establish the simplified data transfer 114 from the data transfer screen 232. A button such as the button labeled "Source" may allow a user to select the working device 120 from the data transfer screen 232. As noted above with reference to FIG. 13, the possible working devices 120 may be visible to the personal device 122 over one of the network communication channels 160, which may be identified and established using a protocol such as Bonjour® from Apple Inc.

Figure 18A:
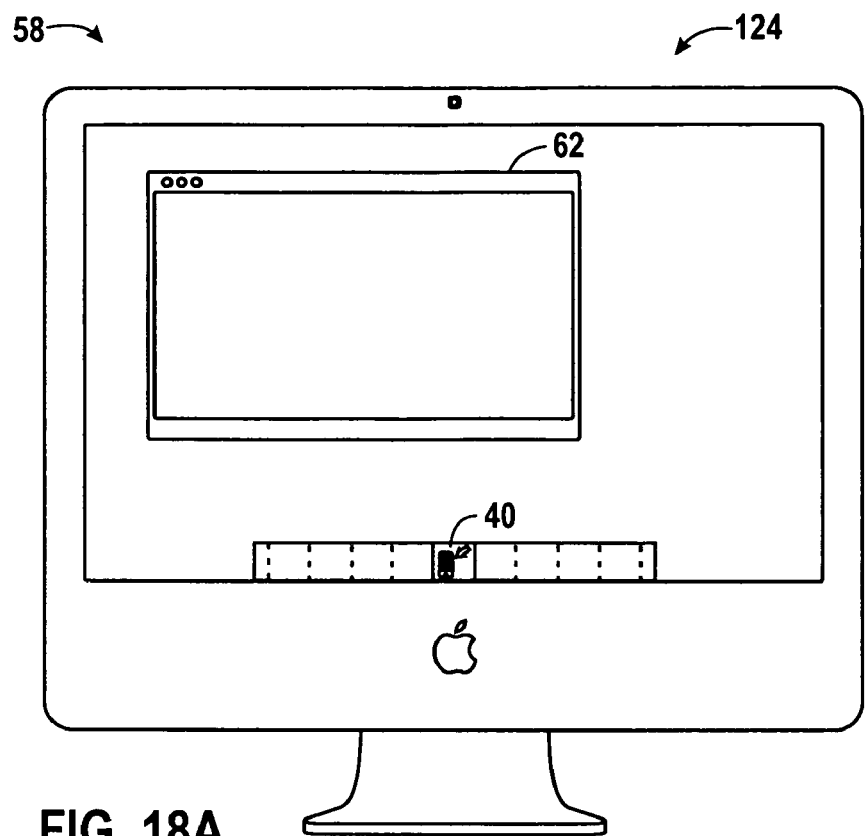
FIGS. 18A-B are schematics illustrating an alternative embodiment for performing the initiation of the simplified data transfer system of FIG. 10.
Figure 18B:
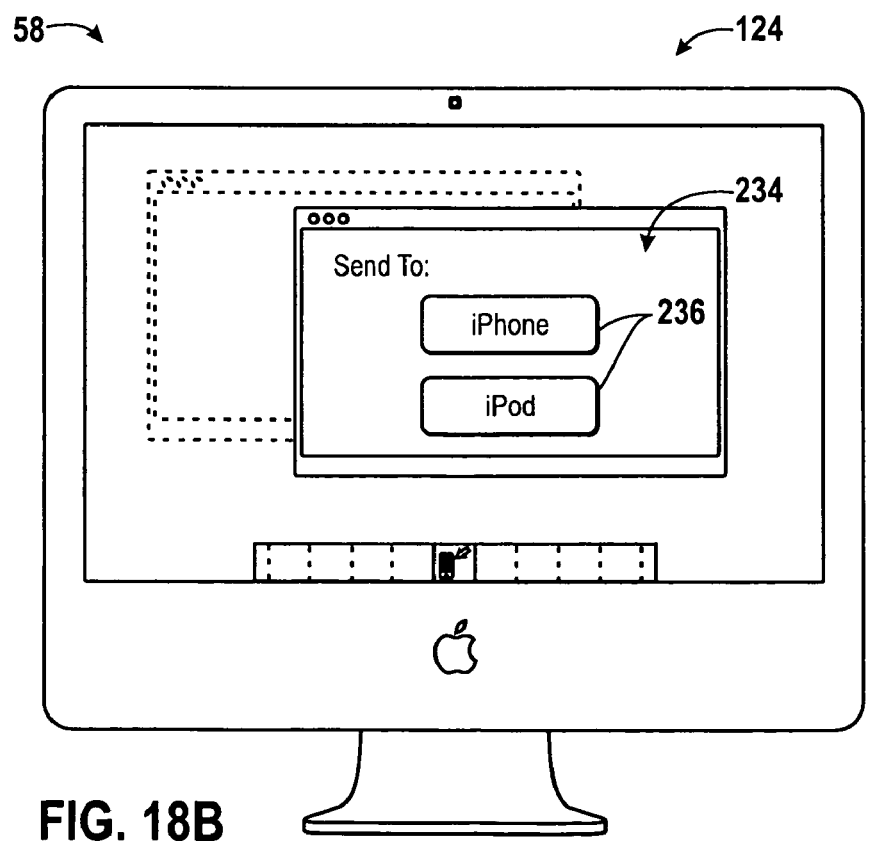

FIGS. 18A-B illustrate a similar manner of performing the initiation 124, which may begin when a user selects the simplified data transfer application icon 50 on the working device 120, which may be the computer 58. Upon selection of the icon 50, a device selection screen 234 may appear, as indicated by FIG. 18B. With the device selection screen 234, a user may select a personal device 122 with which to begin a data transfer from among personal device selection buttons 236. As should be appreciated, the personal devices 120 appearing on the personal device selection buttons 236 represent devices sharing one of the possible communication channels 160 of FIG. 13. Moreover, as noted above, the device selection screen 234 may be a function of a dedicated simplified data transfer application, of the operating system, or of another application, such as the media management application 90.

Figure 19:
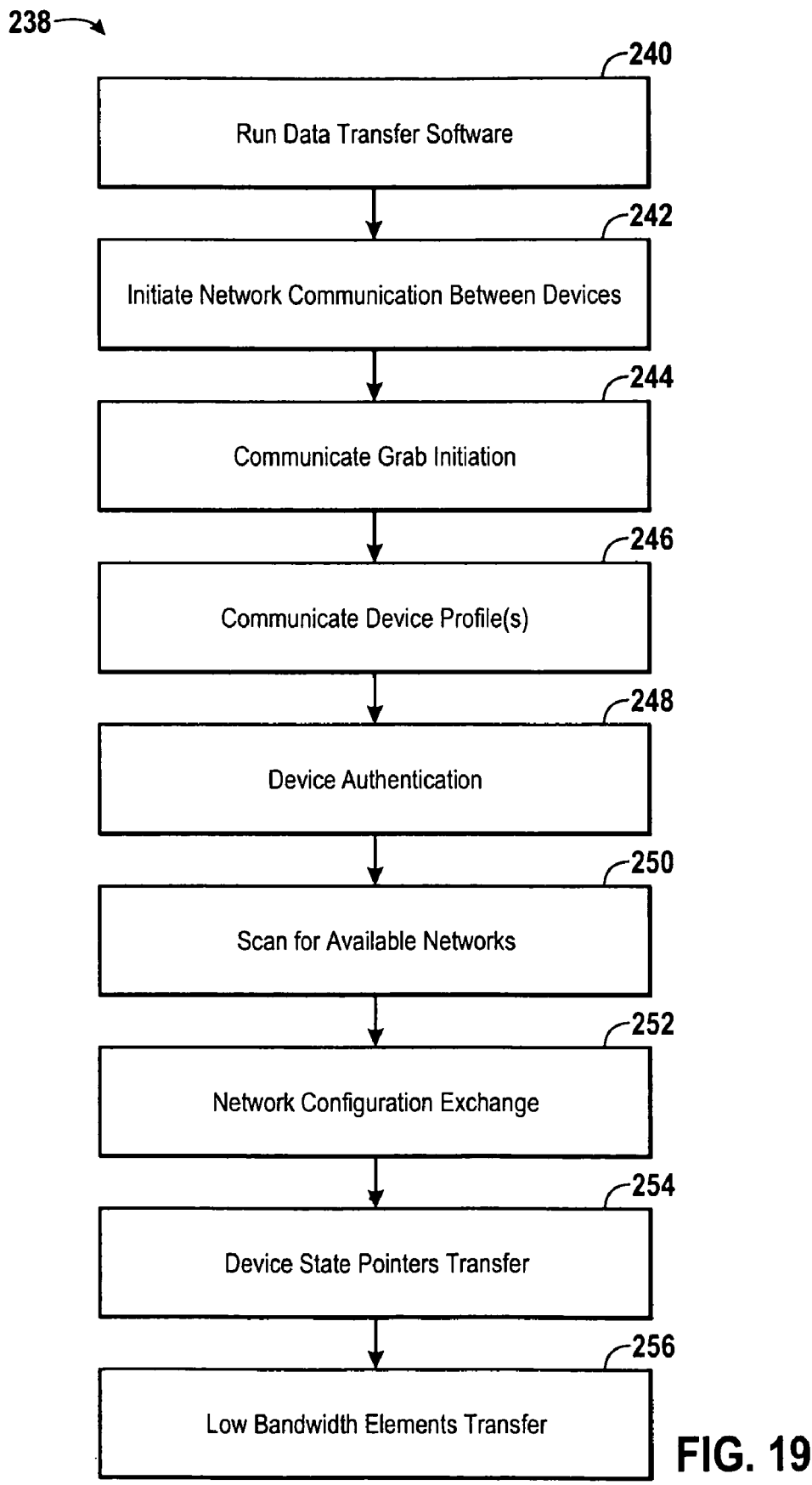
FIG. 19 is a flowchart describing an embodiment of a method for performing the initiation of FIGS. 17-18.

Turning to FIG. 19, a flowchart 238 describes an embodiment of a method for performing the initiation 124 in the manner indicated by FIGS. 17-18. In a first step 240, the working device 120 or the personal device 122 may run smart data transfer software. As discussed above, the smart data transfer software may represent, for example, a standalone application or a function of the operating system. Either automatically or in response to a user selection, in step 242, the smart data transfer software on either the working device 120 or the personal device 122 may initiate network communication between the devices. The working device 120 and the personal device 122 may communicate with one another by way of any of the communication channels 160 illustrated in FIG. 13 above. As noted above with reference to FIG. 13, the communication channel 160 which may be identified and established between the working device 120 and the personal device 122 using a protocol such as Bonjour® by Apple Inc. An additional or alternative embodiment for carrying out step 242 is described in greater detail below with reference to FIG. 20.

In step 244, with communication between the working device 120 and the personal device 122 established, the communication-initiating device may communicate information to the other device to request a start of the simplified data transfer 114. Step 244 may also include saving the user data associated with the device state 62 of the working device 120 in preparation for the forthcoming smart data transfer 128.

In a next step 246, the working device 120 and the personal device 122 may communicate device profiles indicating the capabilities of each device to one another. The device profiles exchanged in step 246 may include a variety of data describing the capabilities of the personal device 122 and working device 120. For example, the device profiles may include messages of any form, including extensible markup language (XML), which may denote the device name, serial number, owner name, type of device, as well as other identifying information. The other identifying information may include, for example, a service user name. The device profiles may additionally denote capabilities of the personal device 122 or the working device 120 by indicating which applications, drivers, or services may be installed on each device.

Because the personal device 122 may already have stored a device profile associated with the working device 120, and vice versa, the device profiles may not be transferred. However, because the capabilities of either the working device 120 or the personal device 122 may change from time to time, the device profiles may be updated and transmitted to each device on at least some occasions.

In step 248, the personal device 122 and the working device 120 may each perform a device authentication process, which may be based at least in part on the device profiles exchanged during step 246. During the device authentication, the personal device 122 or the working device 120 may determine whether the other is trusted. The initiation 124 may be cancelled if either the personal device 122 or the working device 120 fails to authenticate the other in step 248.

In a next step 250, the personal device 122 and the working device 120 may scan for available network communication channels 160, other than the network communication channel 160 currently used for communication. In so doing, the personal device 122 and the working device 120 may determine that a higher bandwidth network may be available for transferring data during the forthcoming smart data transfer 128.

In step 252, after scanning for the available network communication channels 160, the personal device 122 and the working device 120 may exchange new network configuration information. As discussed above with reference to FIGS. 15 and 16, the network configuration information may include, for example, XML messages denoting lists of network communication channels 160 accessible via the working device 120 or the personal device 122. Among other things, the network configuration information may include known authorization keys and service set identifier (SSID). By way of example, the network configuration information may include PAN interface 28 configuration information, such as a Bluetooth serial number, MAC address, and an associated password, as well as LAN interface 30 configuration information, such as a WiFi IP address, a WiFi MAC address, and a WiFi SSID. The network configuration information may be stored for use at a later time to permit the personal device 122 and the working device 120 to ascertain a higher bandwidth connection.

In steps 254 and 256, the personal device 122 and the working device 120 may remain in communication to transfer additional information for the initiation 124. In step 254, the working device 120 may transmit device state pointers to the personal device 122, which may describe the user data of the working device 62 which may be transferred. The device state pointers may represent a message, such as an XML message, that includes the filename, associated application, file size, or other related information associated with each file that may be transferred. For example, the other related information may include whether or not a file has been read, a geographic location where the file was created or modified using a convention such as GeoRSS, a related uniform resource locator (URL), the hierarchy of the application with which the file is associated, the location of the application on the screen of the working device 120 with which the file is associated, the last device which modified the file, etc. In step 256, the working device 120 may transfer certain low bandwidth elements associated with the user data of the device state 62 of the working device 120. Such low bandwidth elements may include, for example, thumbnail images of each file to be transferred or excerpts of data from each file.

Figure 20:
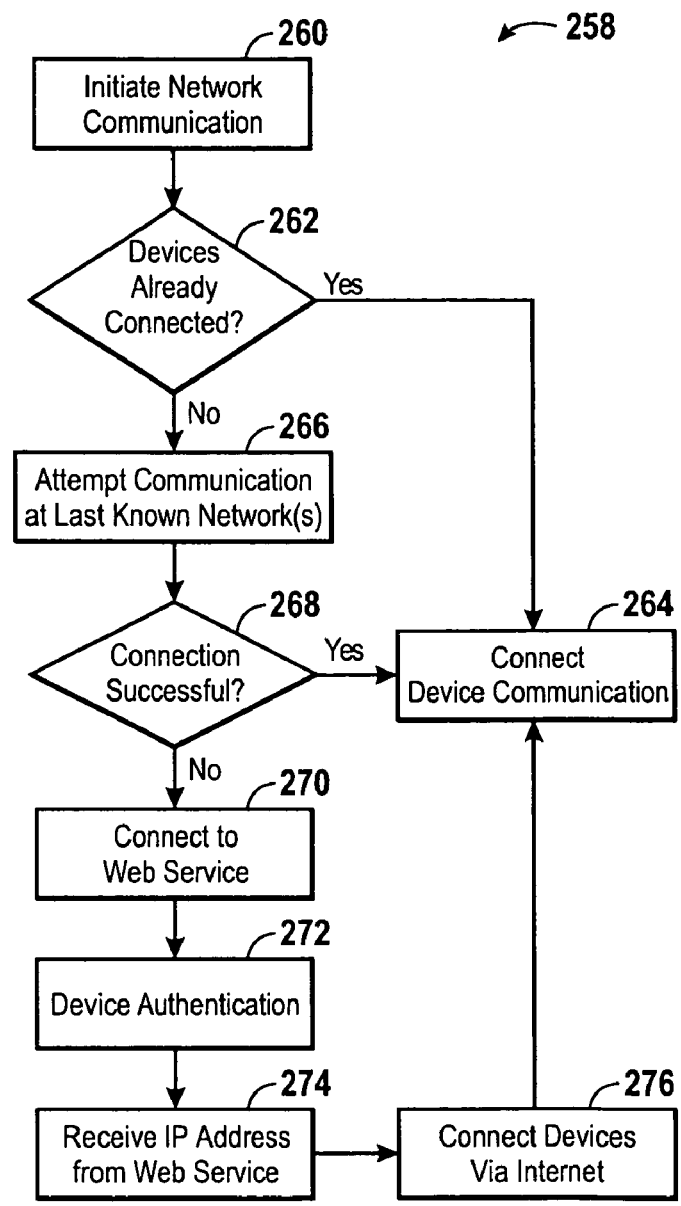
FIG. 20 is a flowchart illustrating an embodiment of a method for initiating network communication in the flowchart of FIG. 19.

Turning next to FIG. 20, a flow chart 258 illustrates an embodiment of a method for initiating network communication for performing the initiation 124 in the manner illustrated by FIGS. 17-18. As noted above, the flowchart 258 represents a more detailed description of step 242 of the flowchart 238 of FIG. 19.

In a first step 260, the working device 120 or the personal device 122 may begin network communication using one of the network interfaces 26. As indicated by decision block 262, if the working device 120 and the personal device 122 are already connected, then the process flows to step 264. In step 264, peer-to-peer communication between the working device 120 and the personal device 124 begins.

Returning to decision block 262, if the devices are not already connected by way of one of the network communication channels 160, the personal device 122 or the working device 120 may attempt to communicate using the most recently available network communication channel 160 at which the other device was available. As indicated by decision block 268, if the attempt to communicate in step 266 results in a successful connection, the process may flow to step 264, and device communication may begin. If the connection attempted in step 266 is not successful, however, the process may flow to step 270.

In step 270, the working device 120 or the personal device 122 may first connect to the web service 170, as illustrated in FIG. 13. The working device 120 or the personal device 122 may reach the web service 170 by way of the Internet 168 or directly via the WAN communication channels 176 or 178. In step 272, the working device 120 or the personal device 122 may perform authenticate itself with the web service 170 using any predetermined security scheme.

In step 274, the working device 120 or the personal device 122 may receive the IP address of the other device from the web service 170. As noted above with reference to FIG. 13, the web service 170 may represent a dynamic domain name system (DNS) service. Accordingly, the web service 170 may maintain the current IP address of each device by communicating with a plugin associated with the simplified data transfer software on each device.

Having obtained the IP address of the other device, the working device 120 or the personal device 122 may locate the other over the Internet in step 276. In step 264, the working device 120 or the personal device 122 may subsequently establish a peer-to-peer connection via the Internet 168 to the other.

Figure 21:
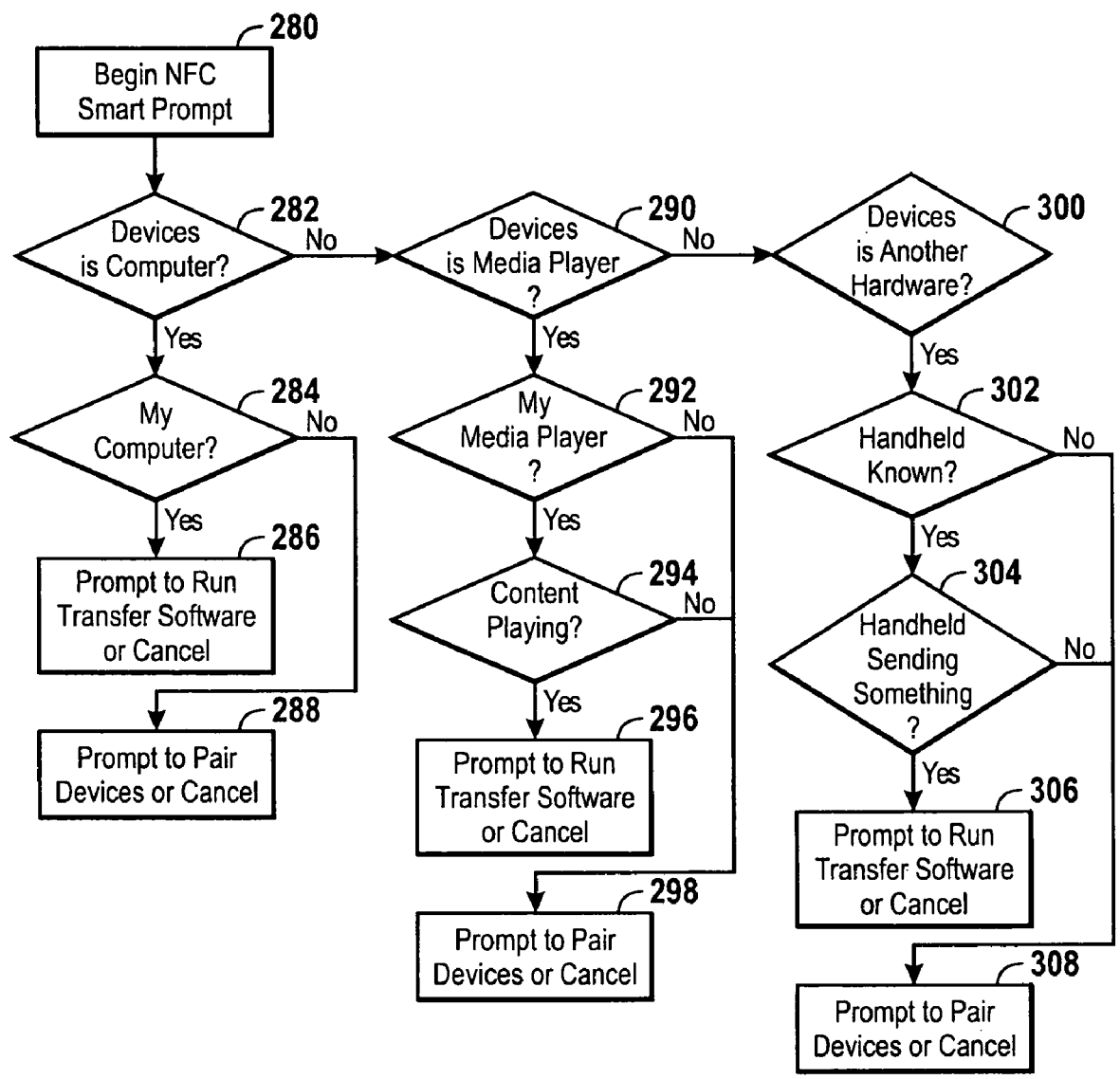
FIG. 21 is a flowchart illustrating an embodiment of a method for determining which smart prompt to display following the initiation of FIGS. 14-16.

FIGS. 21-24 illustrate various embodiments related to the smart prompt 126. Turning first to FIG. 21, a flowchart 278 illustrates an embodiment of a method for determining whether and which smart prompt to display when the initiation 124 takes place via the NFC communication channel 162. Embodiments of performing the initiation 124 via the NFC communication channel 162 are discussed above with reference to FIGS. 14-16. For exemplary purposes, the method described by the flowchart 278 represents the point of view of the handheld device 36, which may be either the working device 120 or the personal device 122 of the simplified data transfer system 118. It should be appreciated, however, that the method outlined by the flowchart 278 may be adapted to any electronic device 10 having the display 18.

Step 280 represents a response by the handheld device 36 to the initiation 124 taking place via the NFC communication channel 162, as noted above with reference to FIGS. 14-16. The operating system, hardware, or simplified data transfer software running on the handheld device 36 may initiate a determination of whether and which type of prompt to issue following the exchange of NFC communication indicated in FIG. 15.

As indicated by decision block 282, the handheld device 36 may employ the device profiles 196 exchanged during the initiation 124 to assess whether the other electronic device 10 is the computer 58. If the handheld device 36 assesses that the other device is the computer 58, the process may proceed to a decision block 284. As indicated by the decision block 284, if the handheld device 36 determines that the other electronic device 10 is owned by the same entity as the handheld device 36, the process may continue to step 286.

In step 286, the handheld device 36 may issue a prompt to permit a user to determine whether to proceed to the smart data transfer 128 phase of the simplified data transfer system 118. If the user chooses to proceed, the handheld device 36 will either prepare to send data to or receive data from the computer 58, depending on which device represents the working device 120 and which device represents the personal device 122.

Returning to the decision block 284, if the computer 58 is not determined to have the same owner as the handheld device 36, the process may instead flow to step 288. In step 288, the handheld device 36 may issue a prompt to permit the user to pair the handheld device 36 and the computer 58. If the user chooses to pair the devices, the handheld device 36 and the computer 58 may thereafter be considered to share the same ownership or may otherwise represent devices which may authenticate one another during the initiation 124.

With continued reference to FIG. 21, and returning to the decision block 282, if the handheld device 36 does not determine the other electronic device 10 to be the computer 58, the process may instead flow to a decision block 290. In the decision block 290, the handheld device 36 may assess whether the device is the standalone media player 64. If the device is the standalone media player 64, the process may flow to a decision block 292. In the decision block 292, the handheld device 36 may determine whether the handheld device 36 and the standalone media player 64 are owned by the same entity. If so, the process flows to decision block 294.

In decision block 294, the handheld device 36 may determine whether the standalone media player 64 is currently playing a media file. Such information may have been conveyed to the handheld device 36 in the device profiles 196 or device state pointers 208 exchanged during the initiation 124. If the standalone media player 64 is currently playing a media file, the process may flow to step 296.

In step 296, the handheld device 36 may issue a prompt to permit a user to determine whether to proceed to the smart data transfer 128 phase of the simplified data transfer system 118. If the user chooses to proceed, the handheld device 36 will either prepare to send data to or receive data from the standalone media player 64, depending on which device represents the working device 120 and which device represents the personal device 122.

Returning to the decision block 292, if the standalone media player 64 is not determined to have the same owner as the handheld device 36, the process may instead flow to step 298. Similarly, returning to the decision block 294, if the handheld device 36 determines that the standalone media player 64 is not playing a media file, the process may also flow to step 298.

In step 298, the handheld device 36 may issue a prompt to permit the user to pair the handheld device 36 and the standalone media player 64. If the user chooses to pair the devices, the handheld device 36 and the standalone media player 64 may thereafter be considered to share the same ownership or may otherwise represent devices which may authenticate one another during the initiation 124.

With continued reference to FIG. 21, and returning to the decision block 290, if the handheld device 36 does not determine the other electronic device 10 is the standalone media player 64, the process may flow to a decision block 300. In the decision block 300, the handheld device 36 may determine whether the other electronic device 10 is another handheld device 36. If so, the process may flow to a decision block 302.

As indicated by the decision block 302, if the first handheld device 36 determines that the second handheld device 36 is a known device and, as indicated by the decision block 304, the working device 120 is attempting to send data (e.g., by way of a data drop described below with reference to FIGS. 33-35), the process may flow to step 306.

In step 306, the first handheld device 36 may issue a prompt to permit a user to determine whether to proceed to the smart data transfer 128 phase of the simplified data transfer system 118. If the user chooses to proceed, the first handheld device 36 will either prepare to send data to or receive data from the second handheld device 36, depending on which handheld device 36 represents the working device 120 and which represents the personal device 122.

Returning to the decision block 302, if the second handheld device 36 is not determined to have the same owner as the first handheld device 36, the process may instead flow to step 308. Similarly, returning to the decision block 304, if the first handheld device 36 determines that the second handheld device 36 not sending data or is not prepared to receive data, the process may also flow to step 308.

In step 308, the first handheld device 36 may issue a prompt to permit the user to pair the first handheld device 36 and the second handheld device 36. If the user chooses to pair the devices, the first handheld device 36 and the second handheld device 36 may thereafter be considered to share the same ownership or may otherwise represent devices which may authenticate one another during the initiation 124.

Figure 22B:
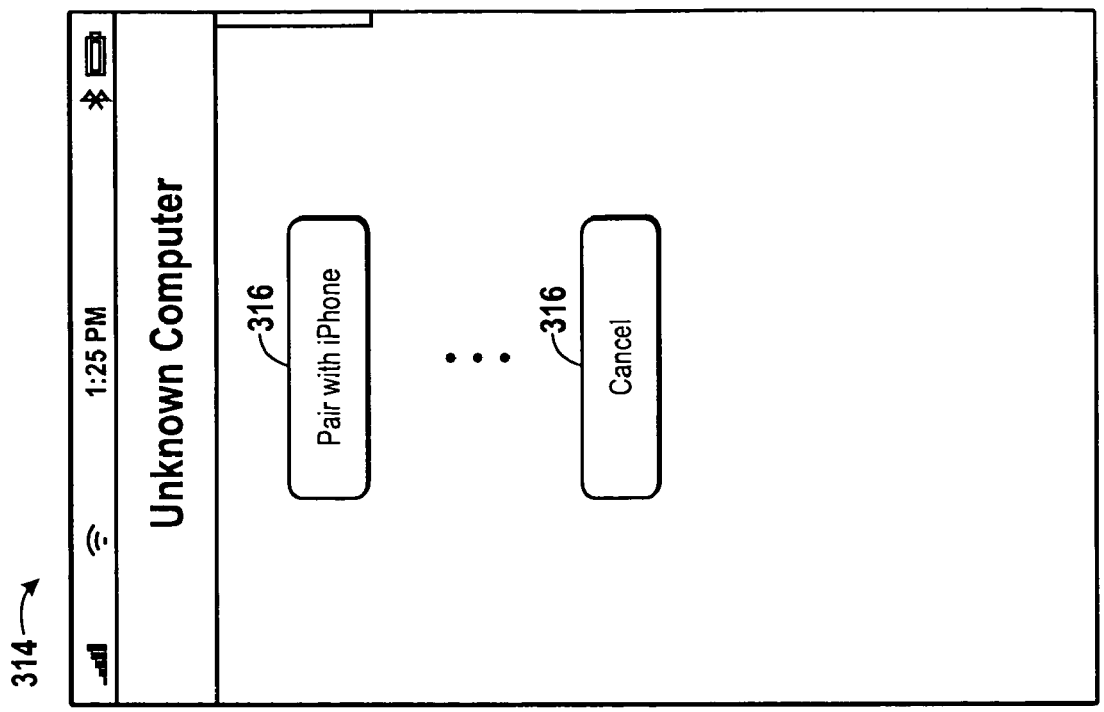
FIGS. 22A-B are schematics of prompts that may issue in the method of FIG. 21.
Figure 22A:
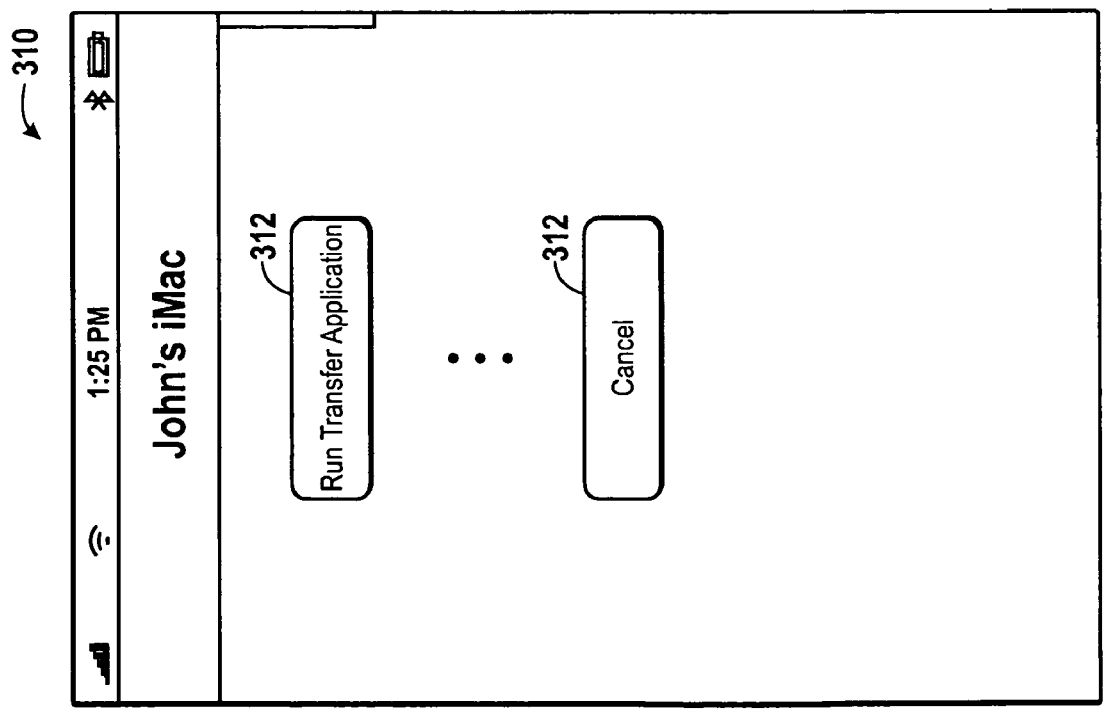

FIGS. 22A-B illustrate prompts which may issue in steps 286, 288, 296, 298, 306, and 308 of the flowchart 278 of FIG. 21. Turning first to FIG. 22A, a run simplified data transfer prompt 310 may include a series of user selectable buttons 312. At least one of the user selectable buttons 312 may represent an option to proceed to the smart data transfer 128 by running, for example, a dedicated simplified data transfer application.

Turning next to FIG. 22B, a device pairing prompt 314 may similarly include a number of user selectable buttons 316. At least one of the user selectable buttons 316 may represent an option to pair the handheld device 36 with the other electronic device 10. If the user chooses to pair the devices, the handheld device 36 and the other electronic device 10 may thereafter be considered to share the same ownership or may otherwise represent devices which may authenticate one another during the initiation 124.

Figure 23:
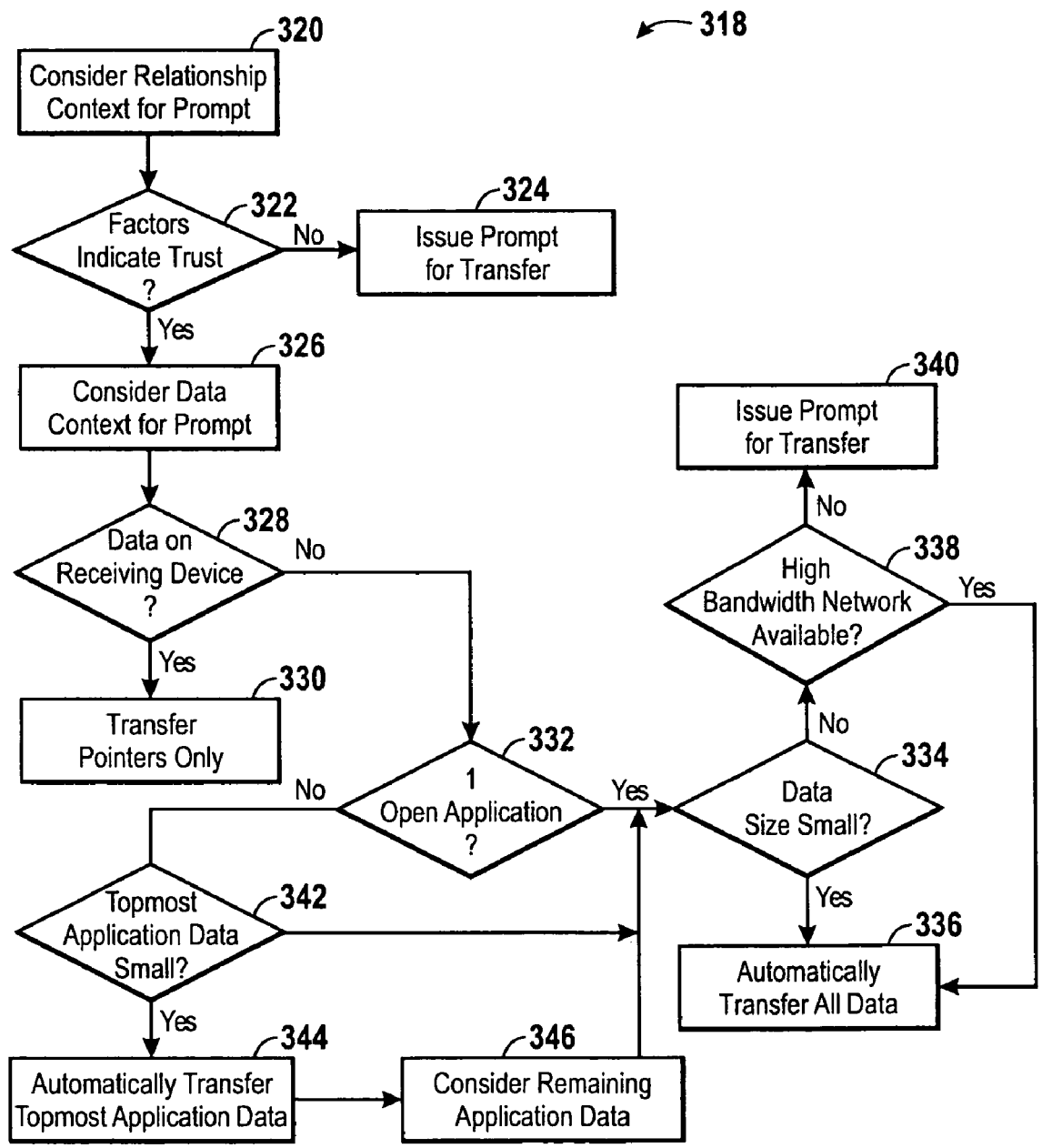
FIG. 23 is a flowchart describing another embodiment of a method for determining whether to display a smart prompt.

FIG. 23 is a flowchart 318 describing another embodiment of a method associated with the smart prompt 126. The flowchart 318 may represent an embodiment of determining whether to issue the smart prompt 126 following the initiation 124, whether the initiation 124 takes place via the NFC communication channel 162 or via other network communication channels 160. It should be appreciated that the method outlined by the flowchart 318 may be adapted to any electronic device 10 having the display 18.

Beginning with step 320, the working device 120 or the personal device 122 may consider a variety of factors associated with the relationship between the working device 120 and the personal device 122. Such factors may include, for example, the owner of the devices, whether the devices are located on a trusted network, whether the devices share media registration such as iTunes® registration, preferences of the owner(s) of the devices, a social network relationship between the owners of the devices, a history of transactions between the devices, and other security measures employed by the devices.

In the decision block 322, the factors are assessed to determine whether there is a trust relationship between the working device 120 and the personal device 122. If the factors do not indicate trust, the process may flow to step 324. In step 324, the working device 120 or the personal device 122 may issue a context based prompt for transfer. If the user chooses to proceed, the working device 120 may prepare to send data and the personal device 122 may prepare to receive data in the forthcoming smart data transfer 128.

Returning to the decision block 322, if the factors do indicate trust in the decision block 322, then the process may flow to step 326. In step 326, the working device 120 or the personal device 122 may consider the context of the device state 62 data. In a decision block 158 which follows, if the data indicated in the device state pointers 208 already resides on the personal device 122, the process may flow to step 330. By way of example, if the device state pointers 208 indicate a particular media file, such as the song 104, is to be transferred, and the personal device 122 already has the media file, the process may flow to step 330.

In step 330, the smart prompt 182 may not issue, but the working device may instead transfer additional pointers related to the data which already resides on the personal device 120. For example, the working device 120 may transfer only a cache file indicating a point in the media where the media file was being played. Because no smart prompt 126 is issued, the transfer of step 330 may take place over the NFC communication channel 162 immediately following the initiation 124. However, it should be appreciated that step 330 may additionally or alternatively take place over another communication channel 160, such as the PAN communication channel 164 or the LAN communication channel 166. In this way, the personal device 122 may receive the cache file and begin to play the media file at the point where the working device 120 left off.

If the user data of the device state 62 does not already reside on the personal device 122, the process flow may continue to a decision block 332. In the decision block 332, the personal device 122 may determine whether there is only one application currently open on the working device 120, as may be indicated by the device profiles exchanged during the initiation 124. If only one application is open on the working device 120, then the process may flow to a decision block 334.

In the decision block 334, the personal device 122 may determine whether the size of the user data of the device state 62 is relatively small, which may be a preset threshold determined by user preferences (e.g., less than 1 MB) or may vary depending on the bandwidth of available network communication channels 160. Moreover, whether the data is small may be determined based on design constraints, storage capabilities of the personal device 122; or other factors. If the user data of the device state 62 is small, the process may flow to step 336. In step 336, all of the user data associated with the device state 62 may be automatically transferred in the forthcoming smart data transfer 128.

If, as indicated by the decision block 334, the data is not small, then the process flows to a decision block 338. According to the decision block 338, if one of the network communication channels 160 of relatively high bandwidth is available, the process may flow to step 336, as described above. Whether one of the network communication channels 160 is of relatively high bandwidth which may be determined from a preset threshold determined by user preferences (e.g., greater than 2 Mbit/s) or may vary depending on the amount of user data associated with the device 62 which is to be transferred. Moreover, whether the one of the network communication channels 160 is of relatively high bandwidth may be determined based on design constraints, network capabilities of the working device 120 or the personal device 122, or other factors.

Returning to the decision block 338, if one of the network communication channels 160 of relatively high bandwidth is not available, the process may instead flow to step 340. In step 340, the working device 120 or the personal device 122 may issue a prompt, such as that illustrated by FIGS. 24A-B and described below. The prompt may to allow a user to select whether and which user data of the device state 62 of the working device 120 is transferred to the personal device 122.

With continued reference to the flowchart 318 of FIG. 23, and returning to the decision block 332, if the personal device 122 determines that more than one open application is open on the working device 120 as of the initiation 124, the process may flow to a decision block 342. In the decision block 342, the personal device 122 may determine whether the user data associated with the topmost open application of the device state 62 is relatively small. As discussed above, whether the size of the user data of the device state 62 is relatively small may be a preset threshold determined by user preferences (e.g., less than 1 MB) or may vary depending on the bandwidth of available network communication channels 160. Whether the data is small may also be determined based on design constraints, storage capabilities of the personal device 122, or other factors.

As indicated by the decision block 342, if the user data associated with the topmost open application of the device state 62 is small, the process may flow to a step 344. In step 344, the user data associated with the top most application opened in the device state 62 may be automatically transferred or prepared for transfer. In a next step 346, the remaining user data of the device state 62 may be considered before the process may continue to the decision block 334. Similarly, returning to the decision block 342, if the user data associated with the topmost open application of the device state 62 is not small, the process may also flow to the decision block 334.

Figure 24B:
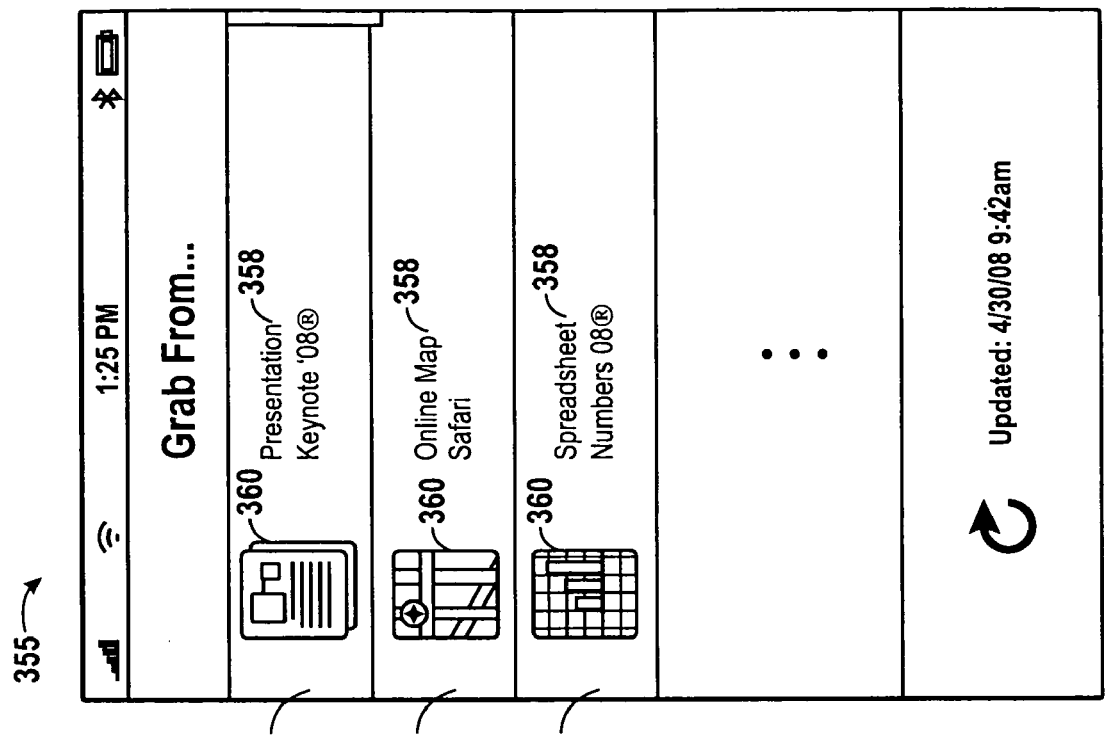
FIG. 24A-B are schematics of a context-based prompt that may be displayed based on determinations of the flowchart of FIG. 23.
Figure 24A:
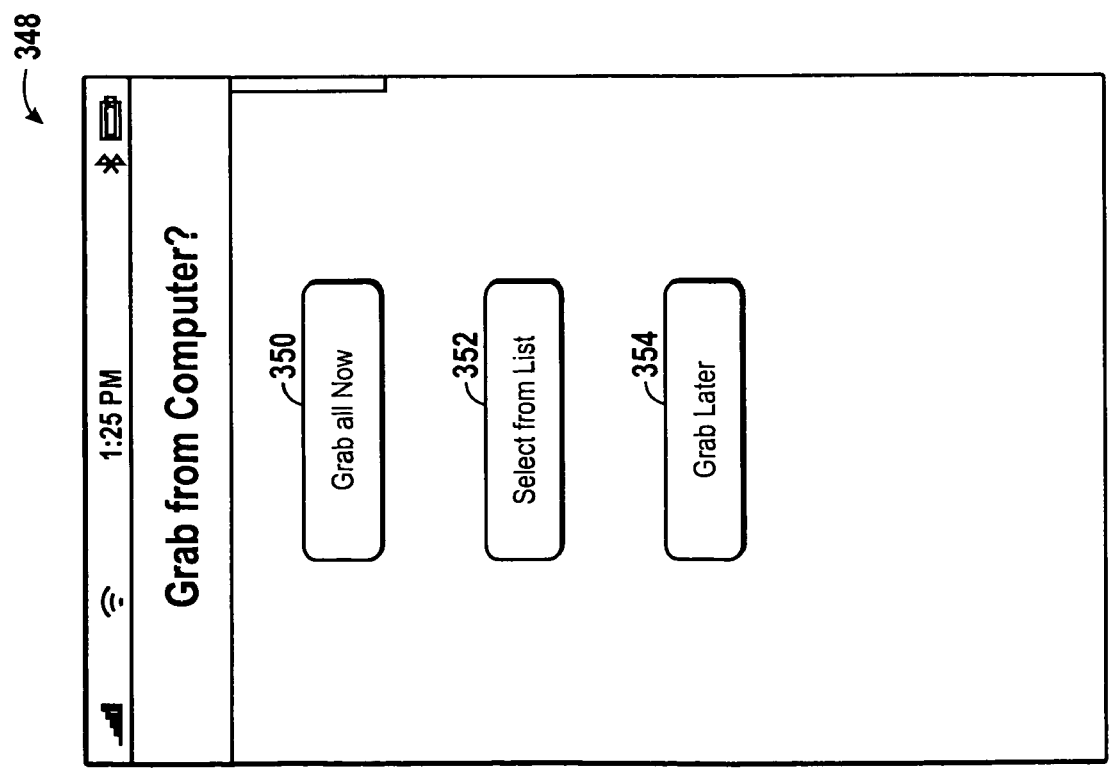

FIGS. 24A-B represent a context-based prompt 348 which may be displayed based on determinations made in the flowchart 318 of FIG. 23. Turning first to FIG. 24A, the context-based prompt 348 may include, for example, a series of transfer selection buttons 350, 352, and 354. The transfer selection button 350 may allow a user to transfer all of the user data associated with the device state 62 of the working device 120. The transfer selection button 352 may allow a user to select which user data should be transferred from among a list of user data, described further below with reference to FIG. 24B. The transfer selection button 354 may cause the working device 120 to save the user data of the device state 62 for a later transfer, as described below with reference to FIGS. 31-34.

Turning next to FIG. 24B, if a user chooses the transfer selection button 352, a corresponding prompt indicated by the numeral 355 may appear. The prompt 355 may permit a user to choose which data is to be transferred from among the user data of the device state 62. The list of user data appearing on the prompt 352 of FIG. 24B may arise from the device state pointers which may be transferred to the personal device 122 during the initiation 124.

In listing the user data, the prompt 355 may include a file name or other text descriptions 356. The text descriptions 356 may be supplemented by application descriptions 358, representing the applications for which the files are designed. Images 360, which may have been received by the personal device 122 as low bandwidth elements, may represent, for example, an image describing the type of file represented by the user data or may include excerpts from each file of user data.

Figure 25:
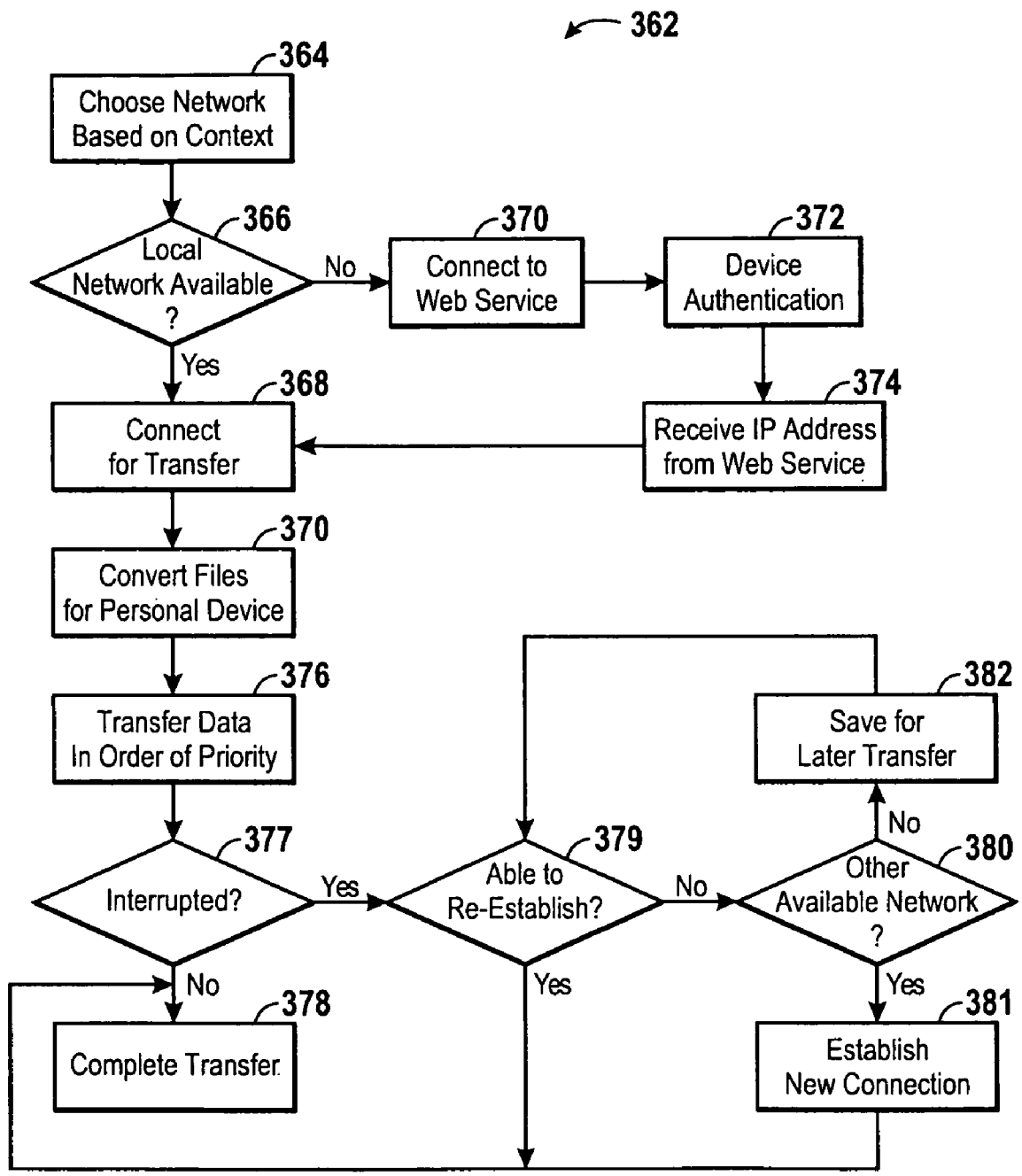
FIG. 25 is a flowchart describing an embodiment of a method for performing the data transfer of the simplified data transfer system of FIG. 10.

FIGS. 25-26 illustrate the smart data transfer 128 of the simplified data transfer system 118. Turning first to FIG. 25, a flowchart 362 describes an embodiment of a method for performing the smart data transfer 128 of the simplified data transfer system 118. In a first step 364, the working device 120 and the personal device 122 may begin the selection of a network for transfer following the initiation 124 and the smart prompt 126. The working device 120 and the personal device 122 may consider a variety of factors, which may include set by a user or by default, as discussed above with reference to FIGS. 12A-D.

By way of example, preferences for certain network communication channels 160 may be based on selections of whether to connect using the fastest available connection; whether to connect using only the Internet or not ever using the Internet; whether to connect using certain specified encryption schemes or to require a passcode or passkey before transfer may occur; whether to require proximity based on the physical location of the electronic devices 10 (i.e., as determined by the location sensing circuitry 22); or whether to prefer a particular, specified connection to the particular device. The flowchart 362 for conducting the smart data transfer 128 may represent only one possible embodiment of many, depending on preference settings such as those discussed above.

In a decision block 366, the working device 120 or the personal device 122 may assess whether a local network communication channel 160, such as the PAN communication channel 164, the LAN communication channel 166, or the wired I/O communication channel 180, is available. The assessment of the decision block 366 may be facilitated by network configuration information previously exchanged during the initiation 124 phase.

As indicated by the decision block 366, if one of the available network communication channels 160 is a local communication channel, the devices may establish a peer-to-peer or ad hoc connection using that network communication channel 160 in step 368. If not, the process may instead flow to step 370. In step 370, the working device 120 or the personal device 122 may connect to the web service 170. As discussed above with reference to FIG. 13, the working device 120 or the personal device 122 may reach the web service 170 by way of the Internet 168 or directly via the WAN communication channels 176 or 178. In step 372, the working device 120 or the personal device 122 may perform a device authentication with the web service 170 using any predetermined security scheme.

In a subsequent step 374, the working device 120 or the personal device 122 may receive the IP address of the other device from the web service 170. As noted above with reference to FIG. 13, the web service 170 may represent a dynamic domain name system (DNS) service. Accordingly, the web service 170 may maintain the current IP address of each device by communicating with a plugin associated with the simplified data transfer software on each device. Having obtained the IP address of the other device, the working device 120 or the personal device 122 may locate the other over the Internet 168 in step 368, establishing a peer-to-peer or ad hoc connection.

In step 375, the working device 120 may convert certain elements of the user data which is to be transferred. From the previous exchange of device profiles, the working device 120 may assess whether the personal device 122 is capable of processing each element of user data. By way of example, the user data associated with the embodiment of the device state 62 of FIG. 7 may be set to be transferred. If the personal device lacks a spreadsheet application 86 or presentation application 88, the working device 120 may convert the spreadsheet 100 or the presentation 102 to a form which the personal device 122 may process, such as an image file or PDF.

Additionally, the working device 120 may assess whether the personal device 122 has access to the Internet 168 based on the prior exchange of device profiles and/or network configuration information. If the personal device 122 lacks access to the Internet 168 and is to be sent a web page, the working device 120 may transfer a web archive of the web page rather than only a URL pointing to the web page. Similarly, if the personal device 122 lacks access to the Internet 168 and is to be sent an online map, the working device 120 may first download information about a greater amount of territory than only the online map of the device state 62 of the working device 120. The working device 120 may then transfer a web archive of the newly downloaded map to the personal device 122. In this way, a user of the personal device 122 may be able to view more than only what the original online map displayed if the user so desires.

Following step 375, the process may continue to step 376. In step 376, the working device 120 may begin to transfer the user data associated with its device state 62 to the personal device 122. The order of transfer of the user data may be prioritized by a number of factors from the selection of preferences, as described above with reference to FIGS. 12A-D. By way of example, the priority may be determined by preference selections of whether a file is associated with a productivity or office-related software product; whether a file represents user data created or modified by a particular user, such as the owner of the receiving device; whether a file is within or in excess of a particular size; which network communication channels may be available for the smart data transfer 128; whether a file is capable of being processed natively by the receiving device; whether a file is of a particular type; or whether a file is to be transferred from a particular device or a particular class of devices. It should also be appreciated that not all data may be transferred in step 376. Rather than transfer certain files larger than a predetermined size (e.g., 1 MB), the working device 120 may instead only transfer a pointer to the data. The working device 120 may transfer the entire file after receiving an instruction from the personal device 122.

Turning to decision block 377, if the data transfer is not interrupted, the transfer may continue until complete in step 378. However, if the data transfer is interrupted, the process may flow from the decision block 377 to a decision block 379. In the decision block 379, the working device 120 or the personal device 122 may attempt to re-establish the recently interrupted connection. If the connection is re-established, the process may return to the decision block 377, continuing to transfer data unless interrupted again.

If the recently interrupted connection is not re-established, the process may flow to a decision block 380. In the decision block 380, the working device 120 and the personal device 122 may assess whether another network communication channel 160 is available. If so, a new connection may be established in step 381. If another network communication channel 160 is not available, then the process may flow to step 382. In step 382, the working device 120 may instead save the remaining user data for transfer at a later time. Delayed transfer, as indicated by step 382, is described in greater detail below with reference to FIGS. 31-34.

Steps 376-382 may be explained by the following example. If a user initiates the simplified data transfer system 118 while the working device 120 and the personal device 122 are physically near one another, the initial transfer of data of step 376 may take place over a local network communication channel 160, such as the PAN communication channel 164 or the LAN communication channel 166. However, if the user later separates the working device 120 and the personal device 122, such that the devices become too far apart to continue the transfer, the working device 120 may instead continue to transfer the data over another channel, such as over the Internet 168 by way of the WAN communication channels 172 or 174. Alternatively, the working device 120 may save the remaining user data for transfer at a later time.

Figure 26A:
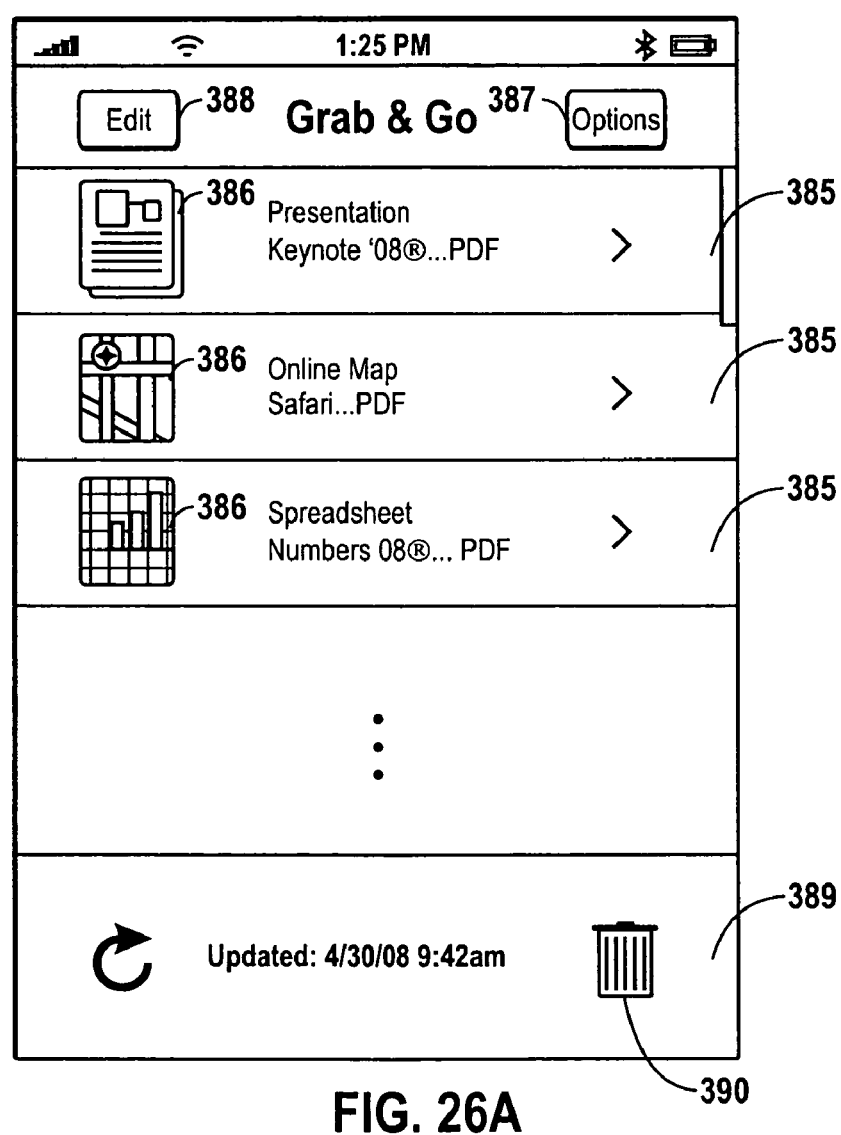
FIG. 26 is a schematic of an exemplary response by a receiving device after receiving data in the simplified data transfer system of FIG. 10.
Figure 26B:
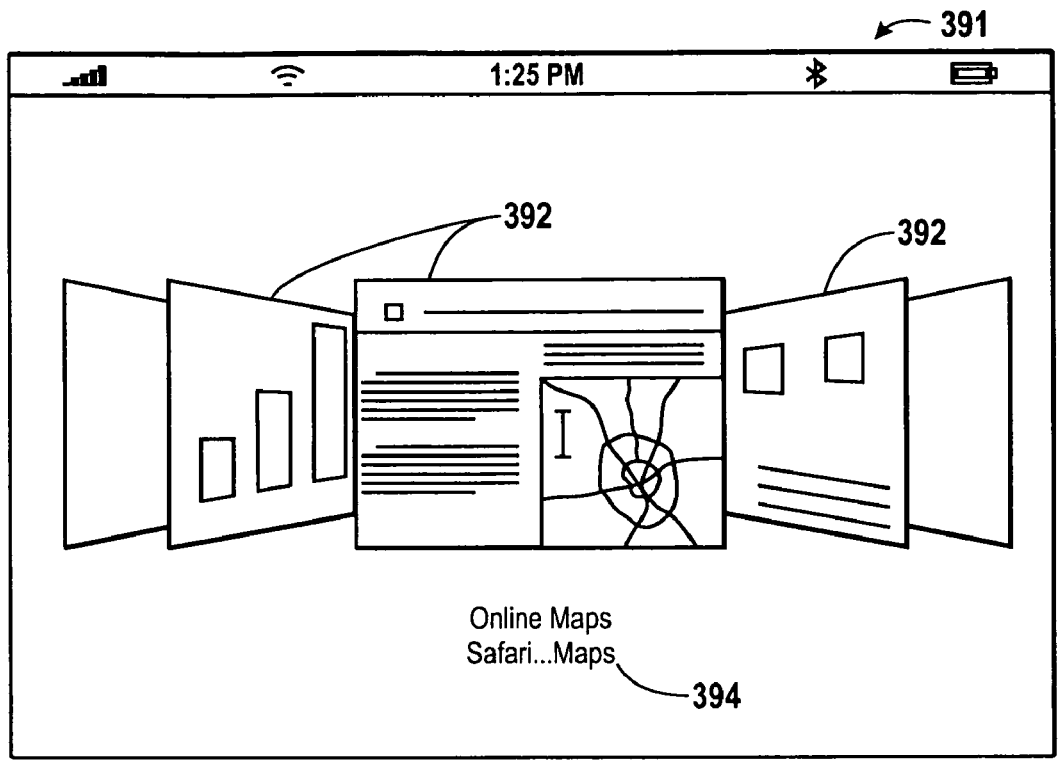
Figure 27:
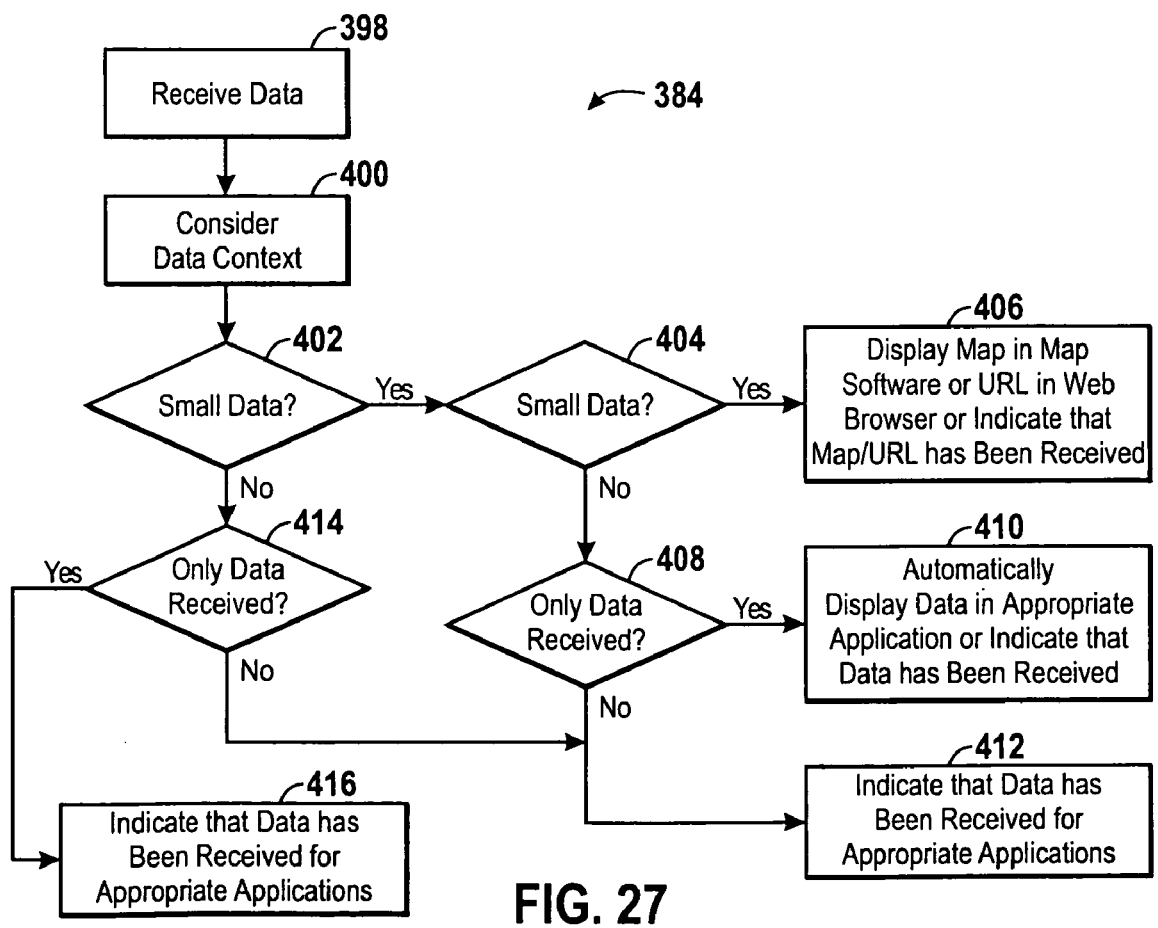
FIG. 27 is a flowchart describing an embodiment of a method for displaying user data to be transferred in the simplified data transfer system of FIG. 10.
Figure 28:
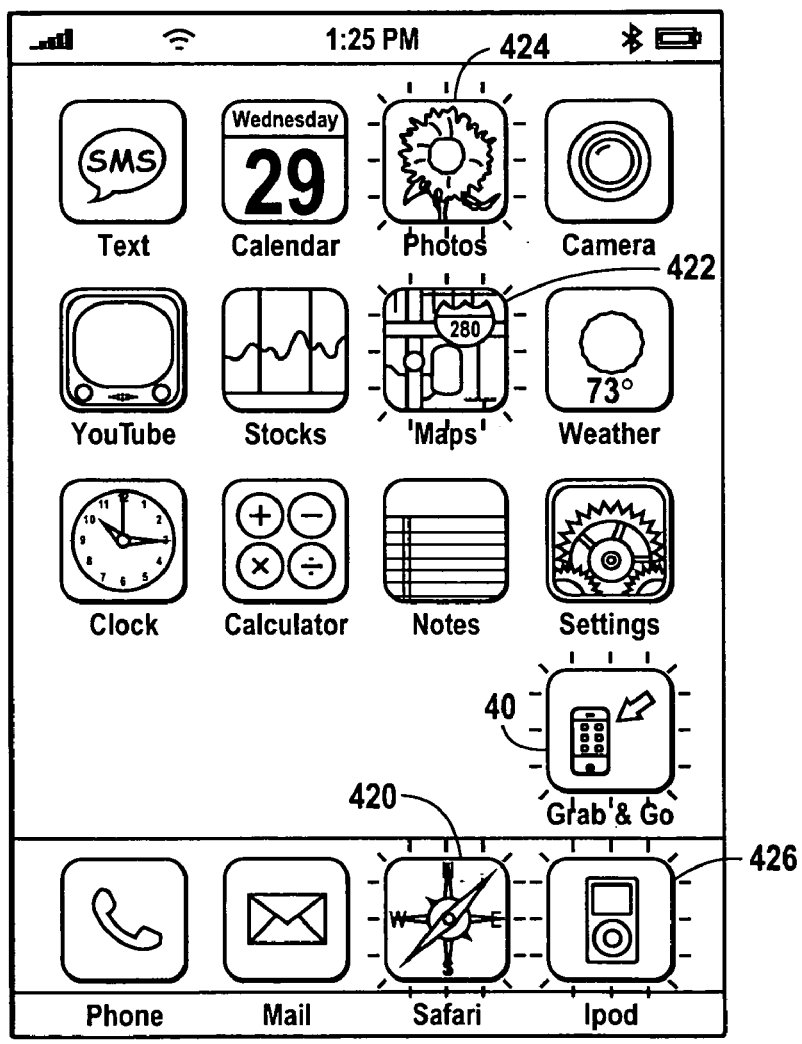
FIG. 28 is a schematic view of another exemplary response by the receiving device after receiving user data in the simplified data transfer system of FIG. 10.

FIGS. 26-28 illustrate examples of responses by the personal device 122 upon receipt of the user data following the smart data transfer 128. Turning first to FIG. 26A, a received data screen 384 may display a list of received data 385. The received data 385 represents user data of the device state 62 of the working device 120 that has been received by the personal device 122. A user may open the received data 385 by pressing on it, which may open the data in an associated mobile application.

As noted above with reference to step 375 of the flowchart 362 of FIG. 25, certain data may be converted prior to transfer. Exemplifying such a condition, the received data 385 of the received data screen 384 may include a presentation and spreadsheet which, because the personal device 122 may not be capable of processing the files in their native formats, may have been converted to and transferred as a PDF file. Thus, the received data screen 384 may indicate the files may be opened in a PDF reader on the personal device 122.

The personal device 122 may open the received data 385 using a particular application based on the type of the data. For example, the personal device 122 may open a web archive or URL for an online map in a map-specific application, a web archive or URL for an online video in a video-specific application, or a web archive or URL for a web page not a map or video in a web browser. The personal device 122 may open a pointer to a media or playlist or may open a media file in a media management application. Certain productivity data may be opened in specific applications as well, including key files (associated with Keynote '08), which may be opened in an application such as iWork Reader, and .doc, .xls, and .ppt files that may be opened in an application such as Office Reader. Moreover, data associated with other third party developers may be opened with applications developed specifically for the personal device 122.

Additionally, if the received data is particularly large, the working device 120 may have only sent a pointer to the data. In such case, a user may select an option to download the large data. A series of associated received data icons 386 may provide additional images of or excerpts from the received data 385.

An options button 387 and edit button 388 may allow a user to adjust various preferences, as discussed above with reference to FIGS. 12A-D. Using the options button 387 and the edit button 388, as well as certain predetermined interface functions, a user may modify the list of received data 385 in a variety of ways. For example, the user may delete individual list items by striking horizontally, as used in many other mobile device applications such as those used by the iPhone® by Apple Inc. The user may delete all list items by tapping a trash can icon 390 and pressing a button on a prompt to confirm. The user may refresh the list by initiating another simplified data transfer 114 by selecting a refresh button 389. The refresh button 389 may initiate communication to restart the simplified data transfer 114, as discussed above with reference to FIGS. 17-20. If the user refreshes the list, the existing list items may remain and may not be removed, even though the data associated with the device state 62 of the working device 120 may have changed. In this way, every change of the device state 62 of the working device 120 may only add to the list of received data 385 with each refresh.

It should also be appreciated that if the simplified data transfer application is closed and the received data screen 384 is no longer visible, the list of received data 385 may remain. When the user later opens the simplified data transfer application by selecting the simplified data transfer application icon 40 from the home screen of the handheld device 36, the list of received data will be the same.

Turning next to FIG. 26B, a visual received data screen 391 may display the list of received data 385 of the received data screen 384 in a visually appealing and intuitive manner. By way of example, the visual received data screen 391 may arise when a user tilts the handheld device 36 after the handheld device 36 has received data in the smart data transfer 128. The visual received data screen 391 may display a representation of the received data 385 using technology such as Cover Flow® by Apple Inc.

Using the visual received data screen 391, the user may quickly find the received data 385 the user wants to access. Visual descriptions 394 may display an image describing the received data 385, providing, for example, a screenshot or excerpt of the data of the device state 62 of the working device 120. A textual description 396 may provide, for example, text indicating the name of the data, the application of the working device 120 with which the data may have been associated, and/or the application of the personal device 122 with which the data may be accessed. With of flick of their fingers, the user may shuffle between the visual descriptions 394 and associated textual description 396 to select the received data 385 of their choice.

FIG. 27 is a flowchart 396 describing an embodiment of an alternative method for intelligently displaying user data associated with the device state 62. In a first step 398, the personal device 122 may receive the user data associated with the device state 62 following the smart data transfer 128. In step 400, the personal device 122 may consider the context associated with the user data. For example, in a decision block 402, the personal device 120 may determine whether the user data is small. Whether the size of the user data received is small may be a preset threshold determined by user preferences (e.g., less than 1 MB) or may be based on design constraints, storage capabilities of the personal device 122, or other factors. If the received data is determined to be small, the process may flow to a decision block 404.

As indicated by the decision block 404, if the user data is a map or a URL, the process may flow to step 406. In step 406, the map may be displayed in map software or the URL may be displayed in a web browser on the personal device 122. Alternatively, the personal device 122 may provide an indication that a map or a URL has been received. Returning to the decision block 404, if the user data of the device state 62 is not a map or a URL, the process may flow to a decision block 408. In the decision block 408, the personal device 122 may determine whether the map or the URL or the small user data is the only data received. If so, in a step 410, an appropriate application may open and display the user data automatically. Alternatively, the personal device 122 may provide an indication that user data for a particular application has been received.

Returning to the decision block 408, if the small amount of user data is not the only data received, the process may flow to step 412. In step 412, the personal device 122 may provide an indication that the user data has been received and may indicate which applications pertain to the received user data.

With further reference to the flowchart 396 of FIG. 27, and returning to the decision block 402, if the data received is not small, the process may flow to a decision block 414. According to the decision block 414, the personal device 122 may determine whether only one file constitutes all of the received data. If so, in a step 416, the personal device 122 may issue a prompt before opening the data in the appropriate application or may provide an indication that user data associated with a particular application has been received.

As indicated by the decision block 414, if the data is not the only data received, the process may flow to step 412. In step 412, the personal device 122 may provide an indication that the user data has been received and may indicate which applications pertain to the received user data.

FIG. 28 illustrates an embodiment of an indication screen 418 on the personal device 122 after the personal device 122 has received user data from the working device 120. As illustrated in FIG. 28, the indication screen 418 indicates that the personal device 122 has received user data. By way of example, the indication screen 418 may indicate that the user data received represents elements of the user data of the embodiment of the device state 62 of FIG. 7. The user data associated with the device state 62 may include, for example, the web page 96, the online map 98, the spreadsheet 100, the presentation 102, the music file 104, the playlist 106, and the video file 108. When such user data is received, the indication screen 418 may reflect that each of the elements of the device state 62 has been received by the personal device 122.

As indicated by numeral 420, an icon for a web browser application may be illuminated to indicate that the web page 96 has been received. Similarly, a map specific application icon 258 may be illuminated to indicate that the online map 98 has been received. Because, as described above, the personal device 122 may lack the capability to process natively certain user data, such as the spreadsheet 100 or the presentation 102, the user data may have been converted prior to transfer. Accordingly, the spreadsheet 100 and the presentation 102 may have been received by the personal device 122 as an image file or as a PDF. Thus, a photo application icon 424 may be illuminated to indicate that the spreadsheet 100 and the presentation 102 have been received.

Finally, a media management application icon 426 may be illuminated to indicate that the music file 104, the playlist 106, and/or the video file 108 have been received. Additionally, the simplified data transfer icon 44 may be illuminated to indicate when any device state 62 user data has been received. By selecting any of the illuminated icons, a user may view the user data received by the personal device 122.

Figure 29:
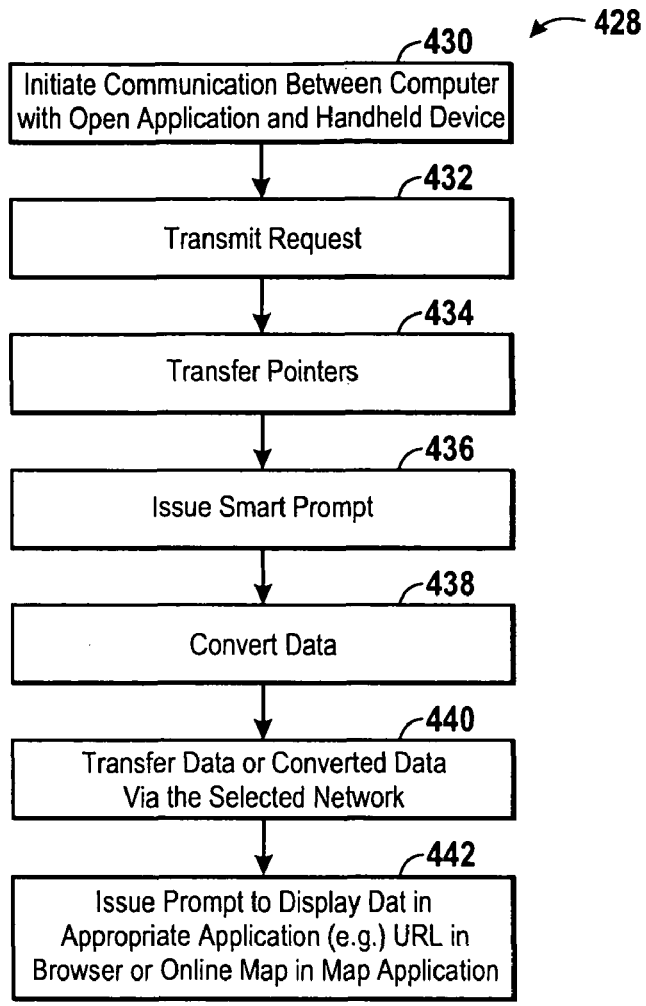
FIG. 29 is a flowchart describing an embodiment of an exemplary method for performing a simplified data transfer of FIG. 10.

Turning to FIG. 29, a flowchart 428 describes an exemplary embodiment of a method for performing the simplified data transfer 114. By way of example, a user may be working on the computer 58 having a desktop interface with a device state 62. The device state 62 of the computer 58 may include a variety of open applications with associated data. For example, a web browser may display several web pages, such as a page of the New York Times, a page open to Google Maps, and a video playing on YouTube. A media management application such as iTunes® may be playing a song in a playlist, while a productivity application such as Keynote '08® may display a presentation and a digital content creation application such as Photoshop by Adobe may display a content creation file such as a Photoshop file. If the user desires to leave their computer 58, they may use their handheld device 36 to "grab" all or a selection of the data currently open on the computer 58 using the simplified data transfer 114.

In a first step 430, communication may be initiated between the handheld device 36 and the computer 58. As the computer 58 has data open in the device state 62 for the user to transfer, the computer 58 may represent the working device 120 and the handheld device 36 may represent the personal device 122. To begin, for example, the user may select the simplified data transfer application icon 40, which may launch application and cause the prompt illustrated by FIG. 17C to be displayed on the handheld device 36. As shown in FIG. 17C, the prompt may include an option to begin to "grab" items on the computer 58.

Step 432 may begin when the user selects the option to begin to "grab" the items on the computer 58 and the handheld device 36 may send a request to the computer 58 over the LAN communication channel 166. The request may be routed to the computer 58, rather than other electronic device 10, based on a preference set in the simplified data transfer application. As noted above with reference to FIG. 17, the user may select the button labeled "Sources" to select a preference for the computer 58 to serve as the working device 120. It should also be appreciated, as noted above with reference to FIG. 13, that the list of electronic devices 10 visible to the handheld device 36 may be obtained using a device identification networking protocol such as Bonjour® by Apple Inc. Alternatively, the request may be routed to the computer 58 based on a preestablished secure pairing relationship between the handheld device 36 and the computer 58.

With continued reference to step 432, the request sent from the handheld device 36 to the computer 58 may be received by at least one "listener" on the computer 58. The "listener" may be, for example, a standalone application, a function of an operating system, or a function or plugin associated with one or more of the applications of the device state 62 of the computer 58. After receiving the request, the "listener" may gather information about the data open in the applications of the device state 62. If media is playing in a media management application, the media may be paused.

In step 434, the "listener" on the computer 58 may transfer the device state pointers 208 to the handheld device 36. As noted above, the device state pointers 208 may provide various information about the data associated with the device state 62 of the working device 120. The device state pointers 208 may be received all at once or in a staggered fashion, as the "listener" application or applications transfers the information.

Step 436 may take place following or concurrently with step 434. As the device state pointers 208 are received, the handheld device 36 may display each item in the smart prompt 126. In this case, the smart prompt 126 may resemble the prompt of FIGS. 26A-B and each item may appear as it is received in the device state pointers 208.

With reference to the example introduced above, the smart prompt of step 436 may display list the items of data associated with the device state 62 of the computer 58 as follows. The New York Times web page may be described with a page title, the URL of the web page, and an indication that selecting the item will open the web page in a mobile web browser, such as Safari® by Apple Inc. The YouTube video web page may be described with a movie name, the URL of the movie, and an indication that selecting the item will open the video in a mobile online video application, such as the YouTube application for the iPhone®) by Apple Inc. The Google Maps web page may be described with a location or direction title, the URL of the map web page, an indication that selecting the item will open the map in a mobile online map application, such as the Maps application for the iPhone® by Apple Inc.

As should be noted, the above-described data may be obtained from the Internet 168 from the URL provided by the device state pointers 208. The device state pointers 208 may transfer such limited data to the handheld device 36 if the computer 58 determines that the handheld device 36 has the capability to access the Internet 168. It should be appreciated that if the computer 58 does not determine that the handheld device 36 has access to the Internet 168, the computer 58 may instead send web archives of the above items in a subsequent transfer step described below.

The song playing in the media management application may be described with a song name, a playhead pointer (indicating where in the song the computer 58 left off) and/or a playlist pointer, and an indication that selecting the item will open the song in a mobile media management application, such as the iPod application for the iPhone® by Apple Inc. If the user selects the item, the mobile media management application may begin playing the song where the computer 58 left off and the next song may be the next song of the same playlist. It should be appreciated that the device state pointers 208 may send such limited information if the song and/or playlist already resides on the handheld device 36. If the song is not available on the handheld device 36, the computer 58 may alternatively send the entire song in the subsequent transfer step described below.

The presentation may be described with a file name and an indication that selecting the item will download the file. Similarly, the content creation file may also be described with a file name and an indication that selecting the item will download the file. Selecting either item may cause the handheld 36 to send a request to the computer 58 to download the selected item.

With continued reference to the flowchart 428 of FIG. 29, step 438 may take place if certain items are selected. For example, if the user selects the content creation file for download, the computer 58 may first convert the file to PDF.

In a subsequent step 440, the computer 58 may transfer any data that has been selected for download by a user or, alternatively, web archives, songs, or other data that may not be accessible to the handheld device 36. In step 442, after the data has been transferred in step 440, the prompt may indicate that the data has been received by changing certain status indications. For example, after the presentation file is received, the prompt may indicate that selecting the item will open the presentation in a mobile reader application such as iWork Reader by Apple Inc. Similarly, after the content creation file (in PDF form) has been received, the prompt may indicate that selecting the item will open the file in a mobile PDF reader application.

Figure 30:
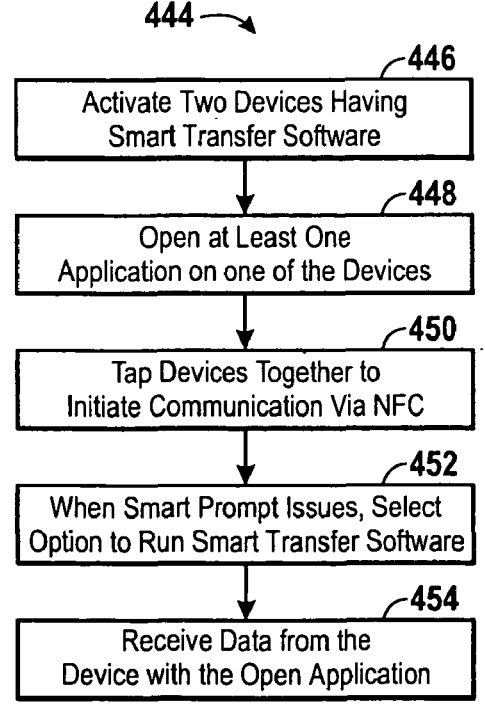
FIG. 30 is a flowchart describing an embodiment of a method of using the simplified data transfer system of FIG. 10.

Turning to FIG. 30, a flowchart 44 describes an embodiment of a method for a user to perform the simplified data transfer 114 using the simplified data transfer system 118. In a first step 446, a user may activate two electronic devices 10 configured to perform the simplified data transfer techniques disclosed herein. In step 448, the user may open at least one application on one of the devices. The electronic device 10 having the open application may be considered the working device 120 and the other electronic device 10 may be considered the personal device 122.

In step 450, the user may, for example, begin the simplified data transfer 114 by tapping the two devices together near their respective NFC interfaces 34. In doing so, the personal device 122 and the working device 120 may begin communication associated with the initiation 124. In step 452, once the personal device 122 or the working device 120 has issued the smart prompt 126, the user may select an option to run simplified data transfer software. Finally, in step 454, the user may receive data from the working device 120 on the personal device 122.

Figure 31A:
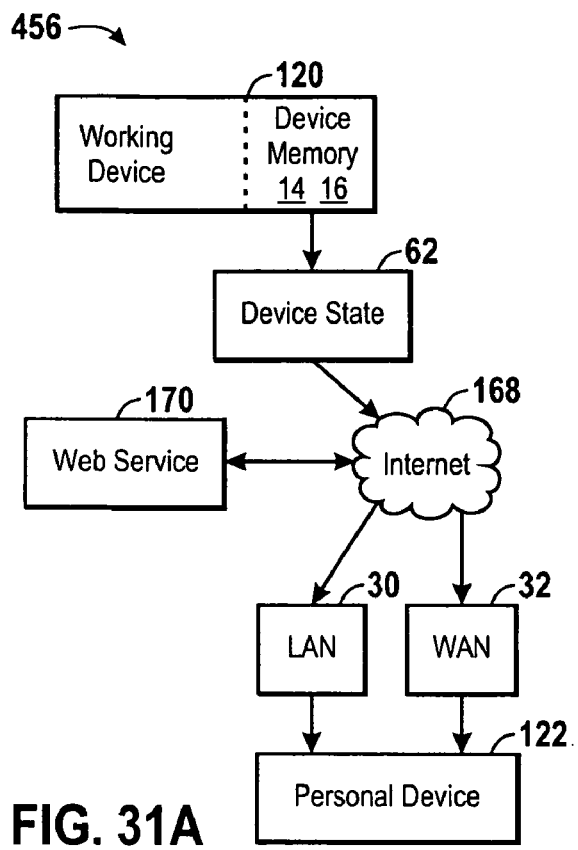
FIGS. 31A-B are block diagrams illustrating delayed transfer simplified data transfer systems.
Figure 31B:
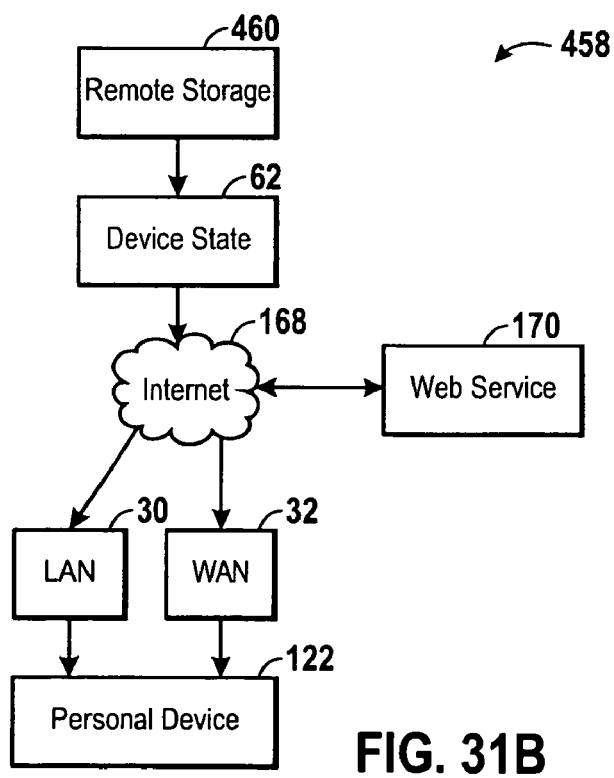

FIGS. 31A-B illustrate alternative embodiments of the simplified data transfer system 118 in which the smart data transfer 128 may be delayed from the time that the initiation 124 or smart prompt 126 may occur. Turning first to FIG. 31A, a delayed simplified data transfer system 456 may represent an alternative embodiment of the simplified data transfer system 118. In the delayed simplified data transfer system 456, following the initiation 124 and smart prompt 126 phases, the working device 120 may save, rather than immediately transfer, user data associated with the device state 62. The user data may be saved in the main memory 14 or nonvolatile storage 16 of the working device 120.

At a later time, the working device 120 may transfer the user data associated with the device state 62 from its main memory 14 or its nonvolatile storage 16 to the remote personal device 122 via a peer-to-peer connection over the Internet 168. As the personal device 122 is remote from the working device 122, the personal device 122 may be connected to the Internet 168 by way of the LAN interface 30 or the WAN interface 32. As should be appreciated, to form a peer-to-peer connection over the Internet 168, the working device 120 or the personal device 122 may first poll the web service 170. As noted above with reference to FIG. 13, the web service 170 may represent a dynamic domain name system (DNS) service, which may maintain the current IP address of each device by communicating with a plugin associated with the simplified data transfer application residing on each device. By way of example, the web service 170 may be a function of the Back to My Mac™ service from Apple, Inc.

Turning next to FIG. 31B, an alternative delayed simplified data transfer system 458 may represent another alternative embodiment of the simplified data transfer system 118. In the delayed simplified data transfer system 458, following the initiation 124 and smart prompt 126 phases, the working device 120 may transfer user data associated with the device state 62 to remote storage 460. The remote storage 460 may represent a server for storing data remotely, and may be associated with the web service 170.

At a later time, the remote storage 460 may transfer the user data to the remote personal device 122 via a peer-to-peer connection over the Internet 168. As the personal device 122 is remote from the remote storage 460, the personal device 122 may be connected to the Internet 168 by way of the LAN interface 30 or the WAN interface 32. As should be appreciated, to form a peer-to-peer connection over the Internet 168, the working device 120 or the personal device 122 may first poll the web service 170. The web service 170 may represent a dynamic domain name system (DNS) service, which may maintain the current IP address of the remote storage 460. By way of example, the web service 170 may be a function of the Back to My Mac® service from Apple, Inc.

Figure 32A:
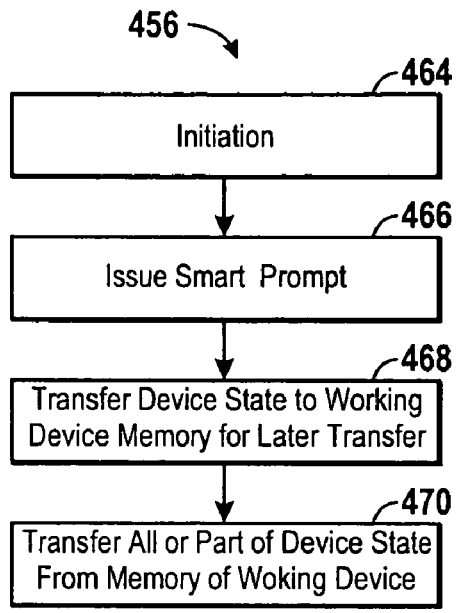
FIGS. 32A-B are flowcharts describing embodiments of methods for the delayed transfer simplified data transfer systems of FIGS. 31A-B.
Figure 32B:
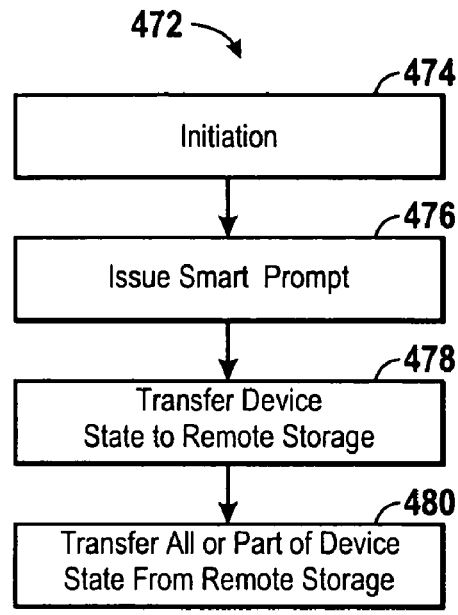

FIGS. 32A-B represent embodiments of methods of employing the delayed simplified data transfer systems 456 and 458 of FIGS. 31A-B. Turning first to FIG. 32A, a flow chart 462 may describe an embodiment of a method for the delayed simplified data transfer system 456 of FIG. 31A. In a first step 464, the initiation 124 may take place, and in a next step 466, the personal device 122 or the working device 120 may issue the smart prompt 126.

In step 468, the smart data transfer 128 may take place. However, rather than transfer the user data associated with the device state 62 of the working device 120 directly to the personal device 122, the working device 120 may instead save the user data in its main memory 14 or the nonvolatile memory 16. In step 470, at a later time, the working device 120 may transfer all or part of the user data associated with the device state 62 from its main memory 14 or nonvolatile memory 16 to the personal device 122. Because the working device 120 and the personal device 122 may be located remotely from one another, the devices may first establish a peer-to-peer connection by way of the internet 168.

As should be appreciated, to form a peer-to-peer connection over the Internet 168, the working device 120 or the personal device 122 may first poll the web service 170. As noted above with reference to FIG. 13, the web service 170 may represent a dynamic domain name system (DNS) service, which may maintain the current IP address of each device by communicating. with a plugin associated with the simplified data transfer application residing on each device. By way of example, the web service 170 may be a function of the Back to My Mac® service from Apple, Inc.

Turning next to FIG. 32B, a flow chart 472 may describe an embodiment of a method for the delayed simplified data transfer system 458 of FIG. 31B. In a first step 474, the initiation 124 may take place, and in a next step 476, the personal device 122 or the working device 120 may issue the smart prompt 126.

In step 478, the smart data transfer 128 may take place. However, rather than transfer the user data associated with the device state 62 of the working device 120 directly to the personal device 122, the working device 120 may instead transfer the user data to the remote storage 460. As noted above, the remote storage 460 may represent a server for storing data remotely, and may be associated with the web service 170. In step 480, at a later time, the remote storage 460 may transfer all or part of the user data which it received from the working device 120. Because the remote storage 460 and the personal device 122 may be located remotely from one another, the devices may first establish a peer-to-peer connection by way of the internet 168.

As should be appreciated, to form a peer-to-peer connection over the Internet 168, the personal device 122 may first poll the web service 170. The web service 170 may represent a dynamic domain name system (DNS) service, which may maintain the current IP address of the remote storage 460. By way of example, the web service 170 may be a function of the Back to My Mac® service from Apple, Inc.

Figure 33A:
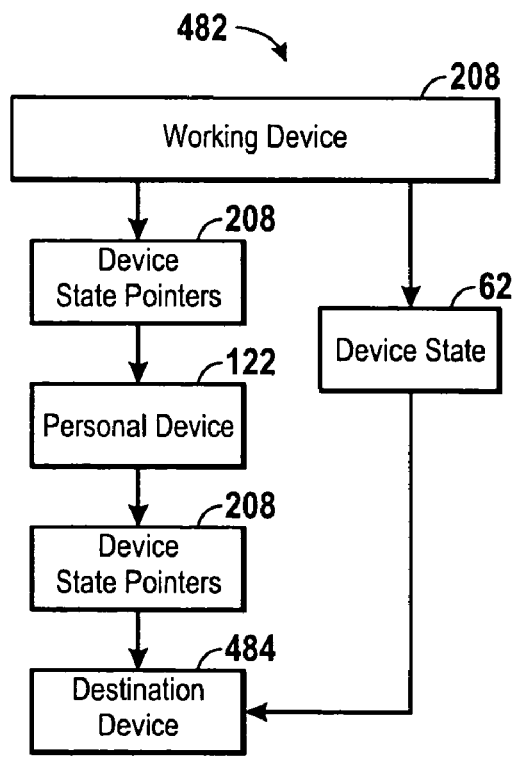
FIGS. 33A-C are block diagrams illustrating three-device simplified data transfer system.
Figure 33B:
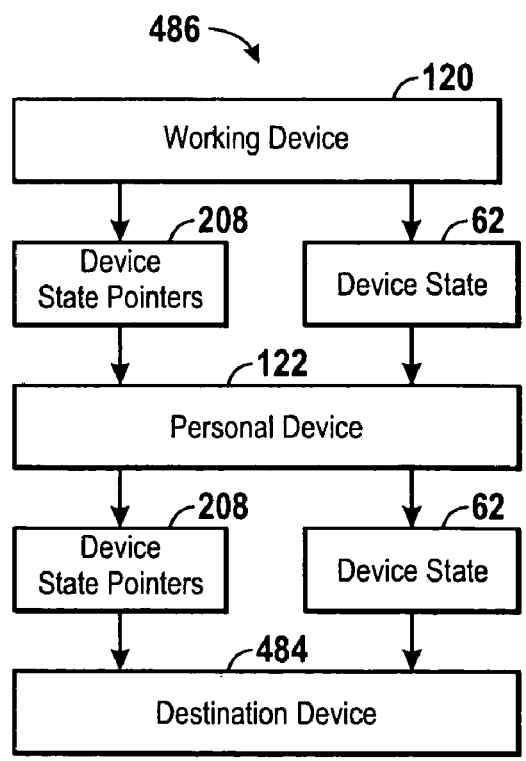
Figure 33C:
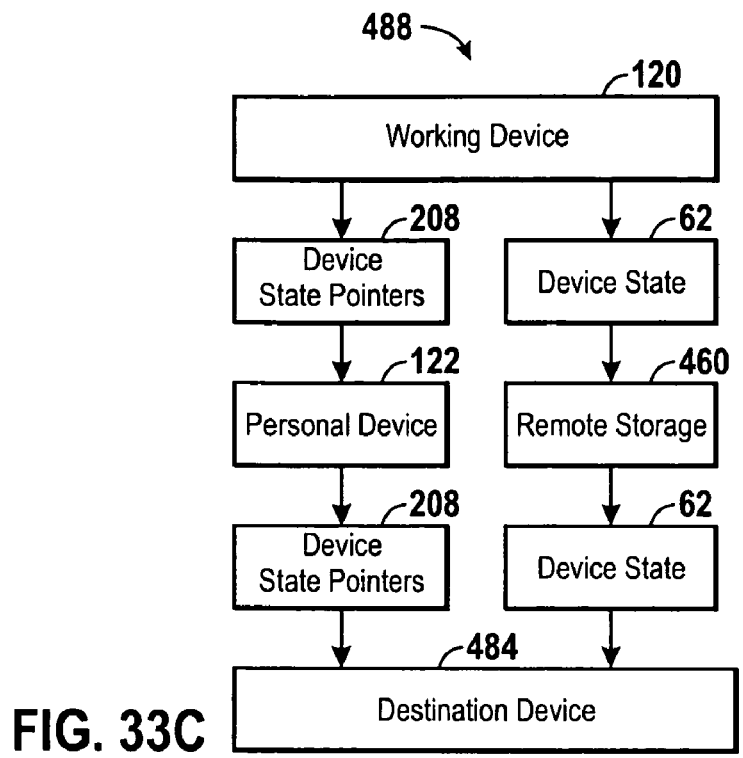

FIGS. 33A-C represent block diagrams of an alternative embodiment of the simplified data transfer system 118 in which user data associated with the device state 62 of the working device 120 may be transferred to a destination device 484 by way of the personal device 122. As should be appreciated, the embodiments illustrated by FIGS. 33A-C reflect the embodiments illustrated in FIGS. 9A-F and discussed above.

Turning first to FIG. 33A, a three device simplified data transfer system 482 may involve transferring data associated with the device state 62 of the working device 120 to the destination device 484 by way of the personal device 122. In a first simplified data transfer 114 between the working device 120 and the personal device 122, the working device 120 may transfer the device state pointers 208, the device profiles 196, and/or the network configuration information 206 to the personal device 122.

After transferring the device state pointers 208, the device profiles 196, and/or the network configuration information 206 to the personal device 122, the working device 120 may or may not transfer the user data associated with the device state 62 of the working device 120 to the personal device 122. Instead, the working device 120 may save the user data associated with the device state 62 for a later transfer in its main memory 14 or nonvolatile storage 16.

The personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, the personal device 122 may transfer the device state pointers 208 or, alternatively, the device profile 196 of the working device, to the destination device 484.

Using information received in the device state pointers 208, the device profiles 196, and/or the network configuration information 206, the destination device 484 may request the user data of the device state 62 from the working device 120. The working device 120 may subsequently transfer the user data from its main memory 14 or nonvolatile storage 16 to the destination device 484.

Turning next to FIG. 33B, a three device simplified data transfer system 486 may involve transferring data associated with the device state 62 of the working device 120 to the destination device 484 by way of the personal device 122. In a first simplified data transfer 114 between the working device 120 and the personal device 122, the working device 120 may transfer the device state pointers 208, the device profiles 196, and/or the network configuration information 206 to the personal device 122, subsequently transferring the user data of its device state 62 to the personal device 122.

The personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, the personal device 122 may transfer the device state pointers 208, the device profiles 196, and/or the network configuration information 206, as well as the user data associated with the device state 62 of the working device 120.

Turning to FIG. 33C, a three device simplified data transfer system 488 may involve transferring data associated with the device state 62 of the working device 120 to the destination device 484 by way of the personal device 122. In a first simplified data transfer 114 between the working device 120 and the personal device 122, the working device 120 may transfer the device state pointers 208, the device profiles 196, and/or the network configuration information 206 to the personal device 122.

After transferring the device state pointers 208, the device profiles 196, and/or the network configuration information 206 to the personal device 122, the working device 120 may or may not transfer the user data associated with the device state 62 of the working device 120 to the personal device 122. Instead, the working device 120 may transfer the user data associated with the device state 62 to the remote storage 460 for a later transfer.

The personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, the personal device 122 may transfer the device state pointers 208, the device profiles 196, and/or the network configuration information 206 to the destination device 484.

Using information received in the device state pointers 208, the device profiles 196, and/or the network configuration information 206, the destination device 484 may request the user data of the device state 62 from the remote storage 460. The remote storage 460 may subsequently transfer the user data to the destination device 484.

Figure 34A:
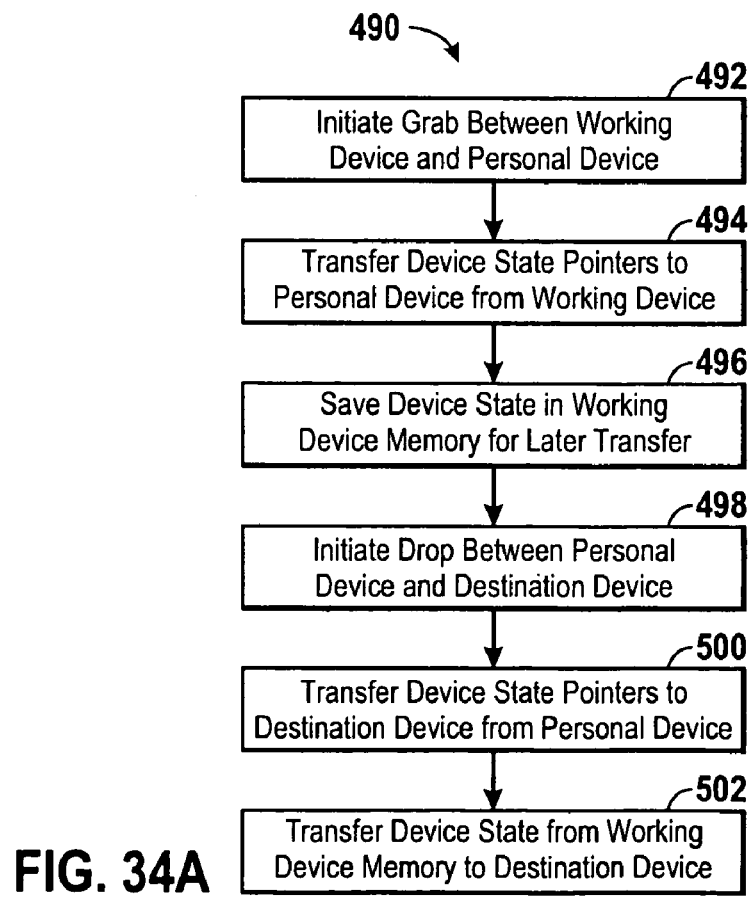
FIGS. 34A-C are flowcharts describing embodiments of methods for performing the three-device simplified data transfer system of FIGS. 33A-C.
Figure 34B:
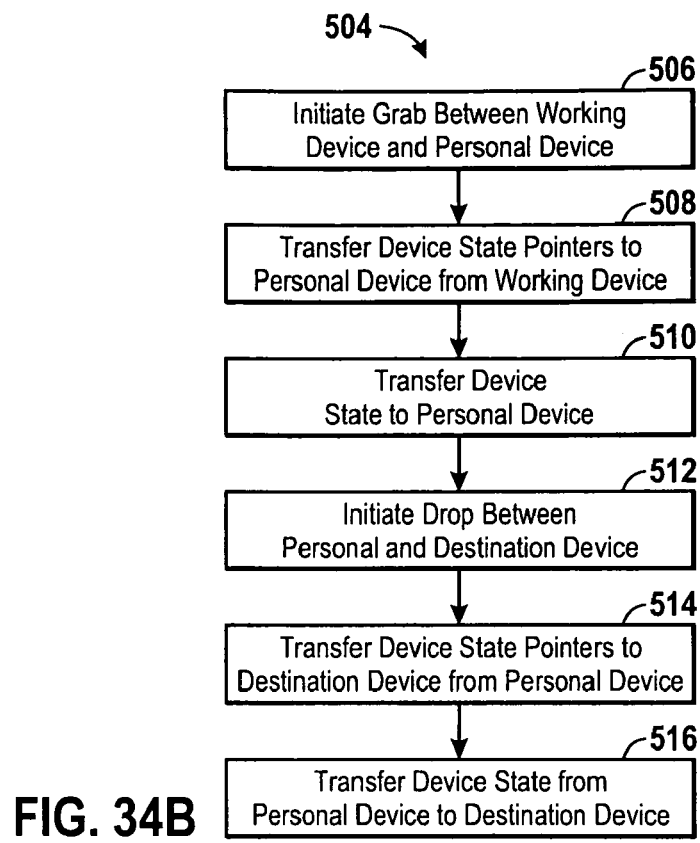
Figure 34C:
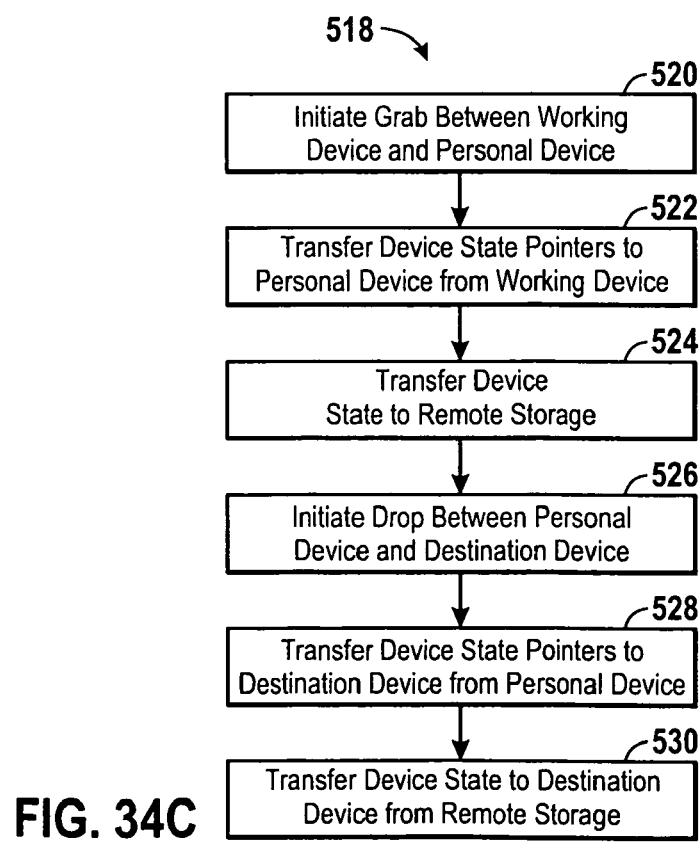

FIGS. 34A-C represent embodiments of methods for employing the three device simplified data transfer systems 482, 486, and 488 of FIGS. 33A-C. Turning first to FIG. 34A, a flow chart 490 may describe an embodiment of a method for the three device simplified data transfer systems 482 of FIG. 33A. In a first step 492, the working device 120 and the personal device 122 may begin the initiation 124 and, in a subsequent step 494, the working device 120 may transfer the device state pointers 208, the device profiles 196, and/or the network configuration information 206 to the personal device 122.

In step 496, the working device 120 may save the user data associated with the device state 62 to its main memory 14 or nonvolatile storage 16. In step 498, the personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, in step 500, the personal device 122 may transfer the device state pointers 208, the device profiles 196, and/or the network configuration information 206 to the destination device 484.

In step 502, using information received in the device state pointers 208, the device profiles 196, and/or the network configuration information 206, the destination device 484 may request the user data of the device state 62 from the working device 120. The working device 120 may subsequently transfer the user data from its main memory 14 or nonvolatile storage 16 to the destination device 484.

Turning next to FIG. 34B, a flow chart 504 may describe an embodiment of a method for the three device simplified data transfer systems 486 of FIG. 33B. In a first step 506, the working device 120 and the personal device 122 may begin the initiation 124 and, in a subsequent step 508, the working device 120 may transfer the device state pointers 208, the device profiles 196, and/or the network configuration information 206 to the personal device 122.

In step 510, the working device 120 may transfer user data associated with the device state 62 to the personal device 122. In step 512, the personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, in step 514, the personal device 122 may first transfer the device state pointers 208, the device profiles 196, and/or the network configuration information 206 to the destination device 484. In a subsequent step 516, the personal device 122 may transfer the user data associated with the device state 62 of the working device 120 to the destination device 484.

Turning to FIG. 34C, a flow chart 518 may describe an embodiment of a method for the three device simplified data transfer systems 488 of FIG. 33C. In a first step 520, the working device 120 and the personal device 122 may begin the initiation 124 and, in a subsequent step 522, the working device 120 may transfer the device state pointers 208, the device profiles 196, and/or the network configuration information 206 to the personal device 122.

In step 524, the working device 120 may transfer the user data associated with the device state 62 to the remote storage 460. In step 526, the personal device 122 may thereafter initiate another simplified data transfer 114 between the personal device 122 and the destination device 484. In so doing, the personal device may initiate a "drop" with the destination device 484. As described below with reference to FIGS. 35A-B, the drop function may be similar to the initiation 124, with the exception that the drop function may transfer data from the personal device 122, rather than to the personal device 122. In performing the drop with the destination device 484, in step 528, the personal device 122 may transfer the device state pointers 208, the device profiles 196, and/or the network configuration information 206 to the destination device 484.

In step 530, using information received in the device state pointers 208, the device profiles 196, and/or the network configuration information 206, the destination device 484 may request the user data of the device state 62 from the remote storage 460. The remote storage 460 may thereafter transfer the user data to the destination device 484.

Figure 35B:
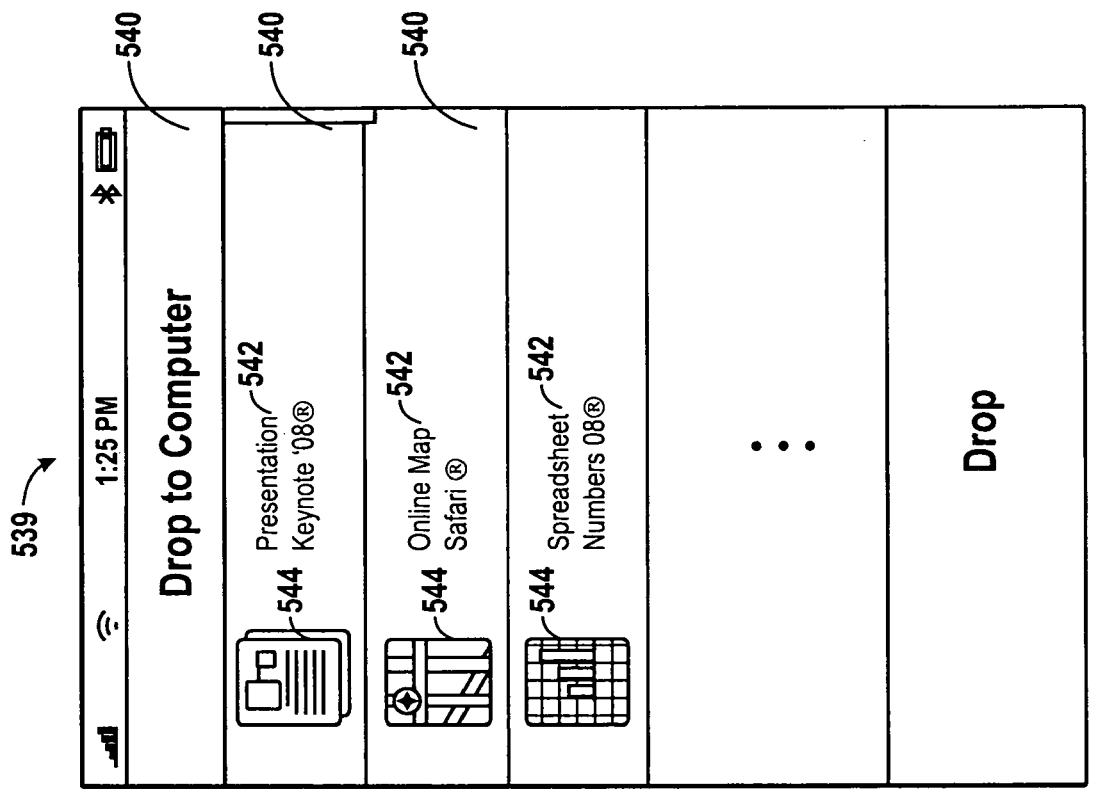
FIGS. 35A-B are schematic views of a data drop prompt for transferring data using the simplified data transfer systems of FIGS. 33A-C and 34A-C.
Figure 35A:
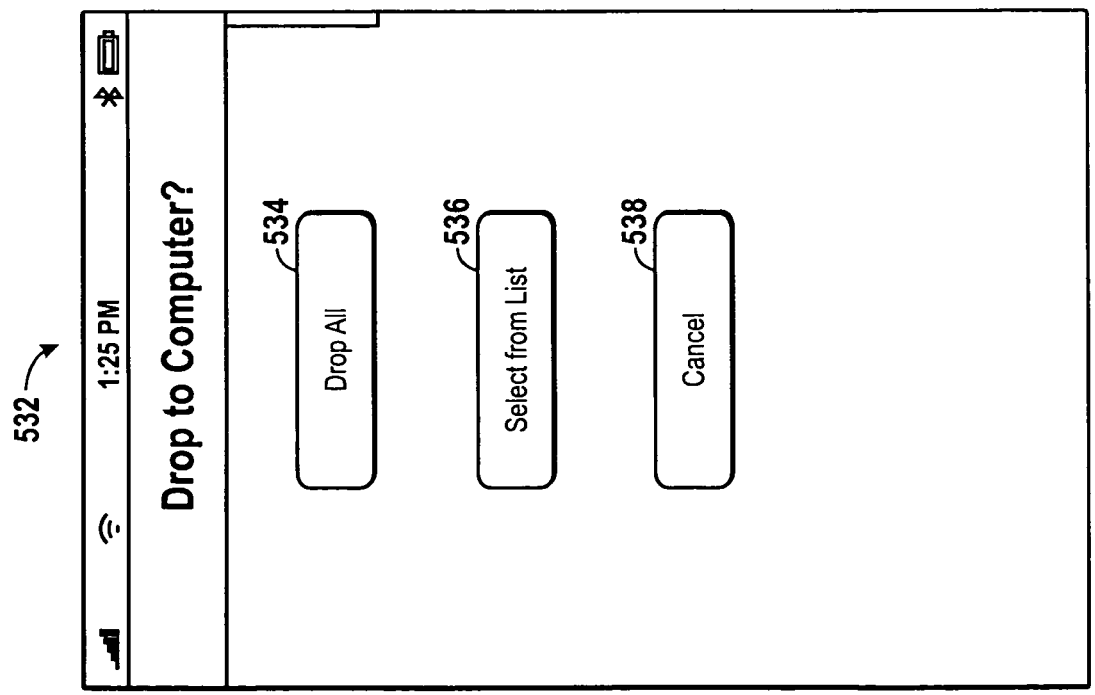

FIGS. 35A and B illustrate an embodiment of performing a "drop" from the personal device 122 to the destination device 460. Turning first to FIG. 35A, a data drop screen 532 may include a prompt for dropping user data from the personal device 122 to the destination device 484. The data drop screen 532 may include user selectable buttons 534, 536, and 538. The user selectable button 534 may allow a user to choose to transfer all user data that may have previously been transferred to the personal device 122 to the destination device 484. Similarly, the user selectable button 536 may allow a user to choose which data may be transferred to the destination device 484. To cancel the transaction, a user may choose the user selectable button 538. If the transaction is cancelled, the user data may remain on the personal device 122 and may not transferred to the destination device 484 unless the drop is initiated a second time.

Turning next to FIG. 35B, a select-from-list screen 539 may arise when the user selectable button 536 is chosen by a user. The select-from-list screen 539 may list user data 540 that may be selected to be "dropped" to the destination device 484 by a user. The user data 540 may be described based on a file name or other text descriptions 542, which may additionally list the applications for which the files are designed. Images 544 may have been delivered to the personal device 122 as low bandwidth elements 210 and may represent the type of file represented by the user data 540 or an excerpt of the user data 540.

Figure 36:
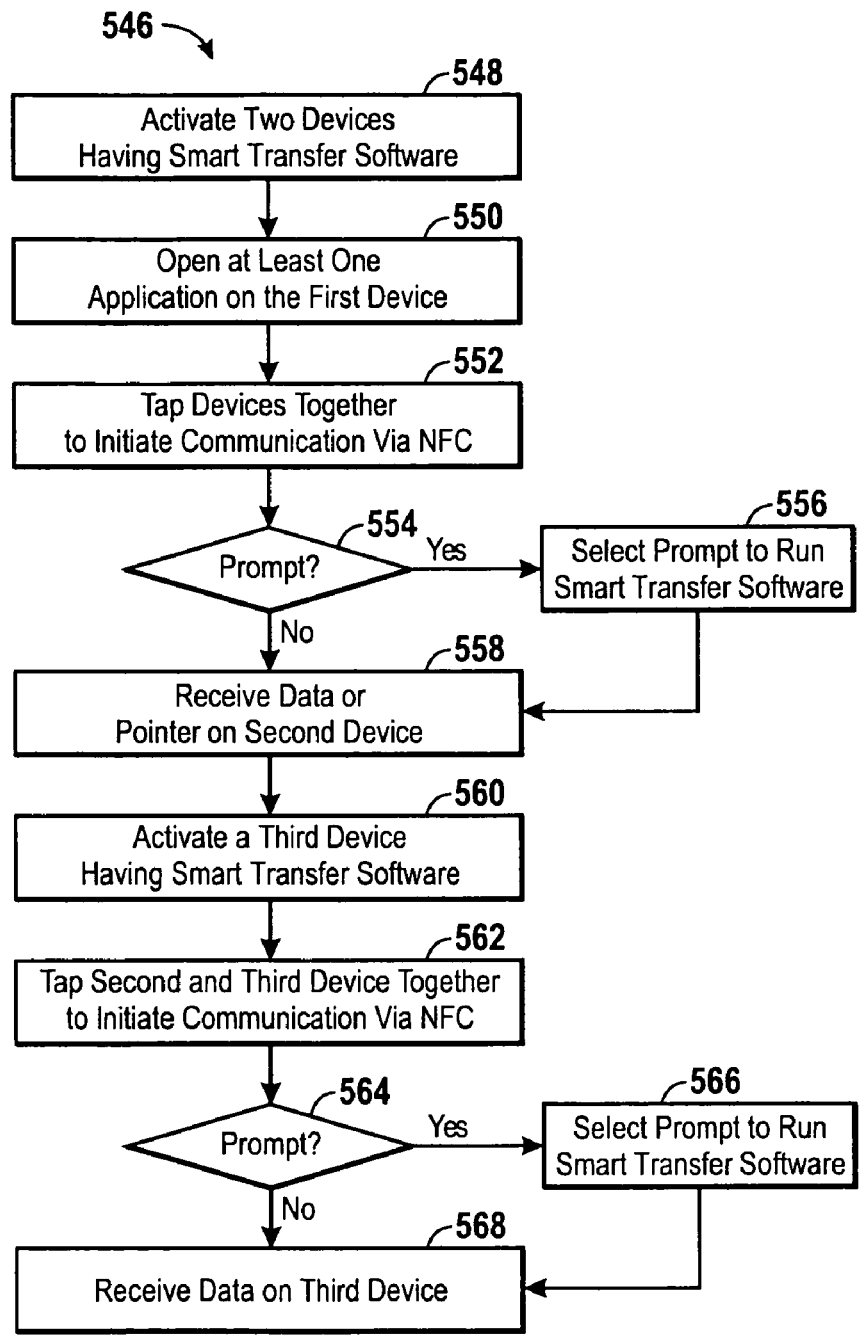
FIG. 36 is a flowchart describing an embodiment of a method for using the simplified data transfer techniques of FIGS. 33A-C and 34A-C.

Turning to FIG. 36, a flowchart 546 illustrates an embodiment of a method of using the simplified data transfer techniques described above among three electronic devices 10. In a first step 548, a user may activate two devices having smart data transfer software. In step 550, the user may open at least one application on the first electronic device 10. In step 552, the user may tap the devices together to initiate communication by way of NFC of the NFC communication channel 162. As such, the electronic device 10 having the open application may represent the working device 120 and the other electronic device 10 may represent the personal device 122.

In a decision block 554, the working device 120 or the personal device 122 may issue the smart prompt 126. As discussed above, the smart prompt 126 may or may not issue depending on a variety of factors. As indicated by the decision block 554, if the prompt does issue, the process may flow to step 556. In step 556, the user may choose to run the smart data transfer software to enter the smart data transfer 128 phase. Following step 556, or if the prompt does not issue, the process flows to step 558.

In step 558, the user may receive the user data associated with the device state 62 of the working device 120 on the personal device 122. Alternatively, the user may receive only the device state pointers 208. In step 560, the user may activate a third electronic device 10 configured for the simplified data transfer techniques described above.

In a subsequent step 562, the user may tap the personal device 122 to the third electronic device 10 to initiate communication by way of the NFC communication channel 162. In so doing, the third electronic device 10 may represent the destination device 484.

In a decision block 564, the personal device 122 or the destination device 484 may issue the smart prompt 126. As discussed above, the smart prompt 126 may or may not issue depending on a variety of factors. As indicated by the decision block 564, if the prompt does issue, the process may flow to step 566. In step 566, the user may choose to run the smart data transfer software to initiate a "drop" onto the destination device. Following step 566, or if the prompt does not issue, the process flows to step 558.

In step 568, the user may drop the user data associated with the device state 62 of the working device 120 onto the destination device 484 by way of the personal device 122. Alternatively, the user may drop only the device state pointers 208 onto the destination device 484, to allow the destination device 484 to receive the user data associated with the device state 62 of the working device 120 directly from the working device 120 or from the remote storage 160.

Figure 40:
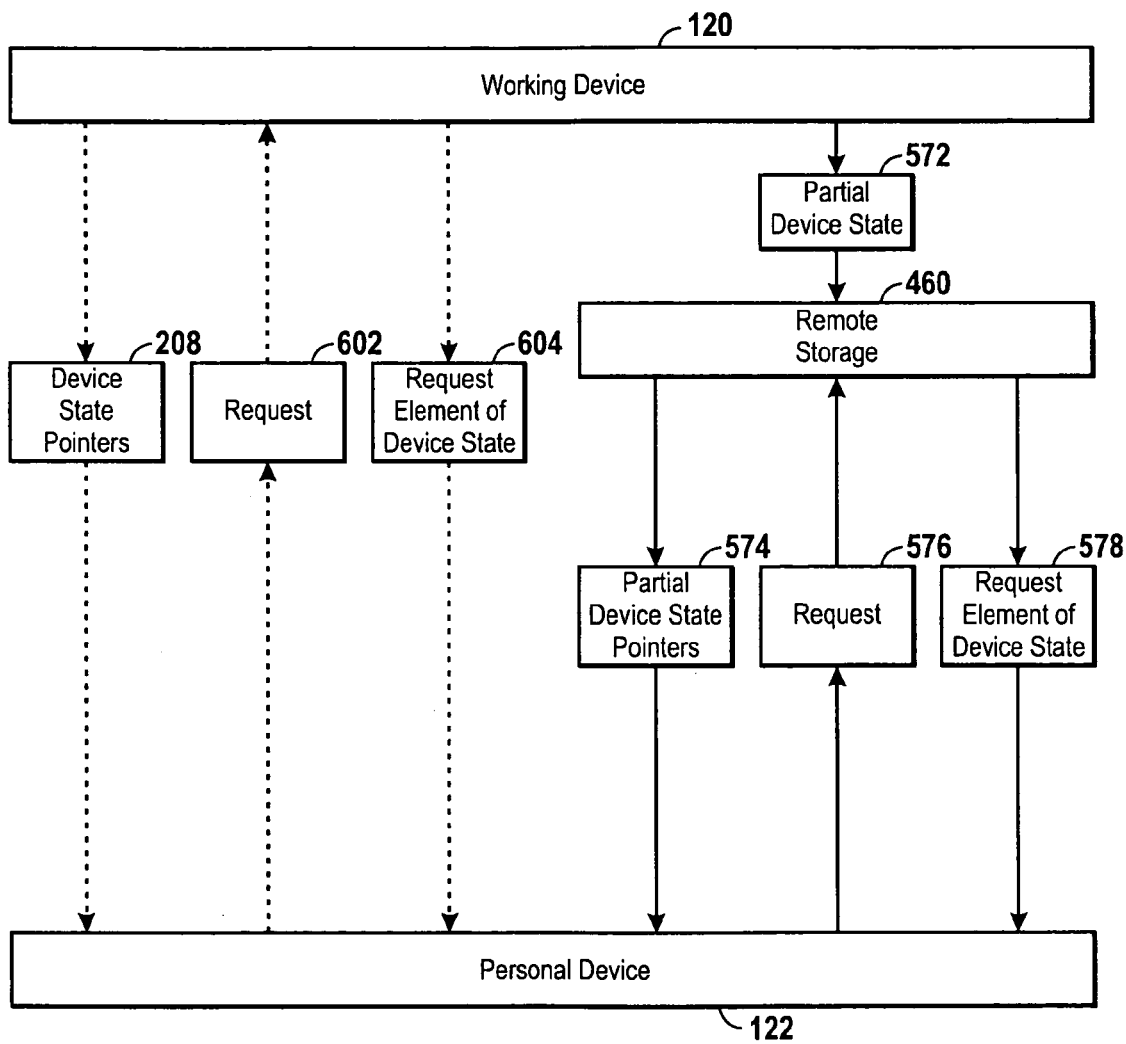
FIG. 40 is a block diagram illustrating a simplified data transfer between a working device and a personal device.
Figure 41:
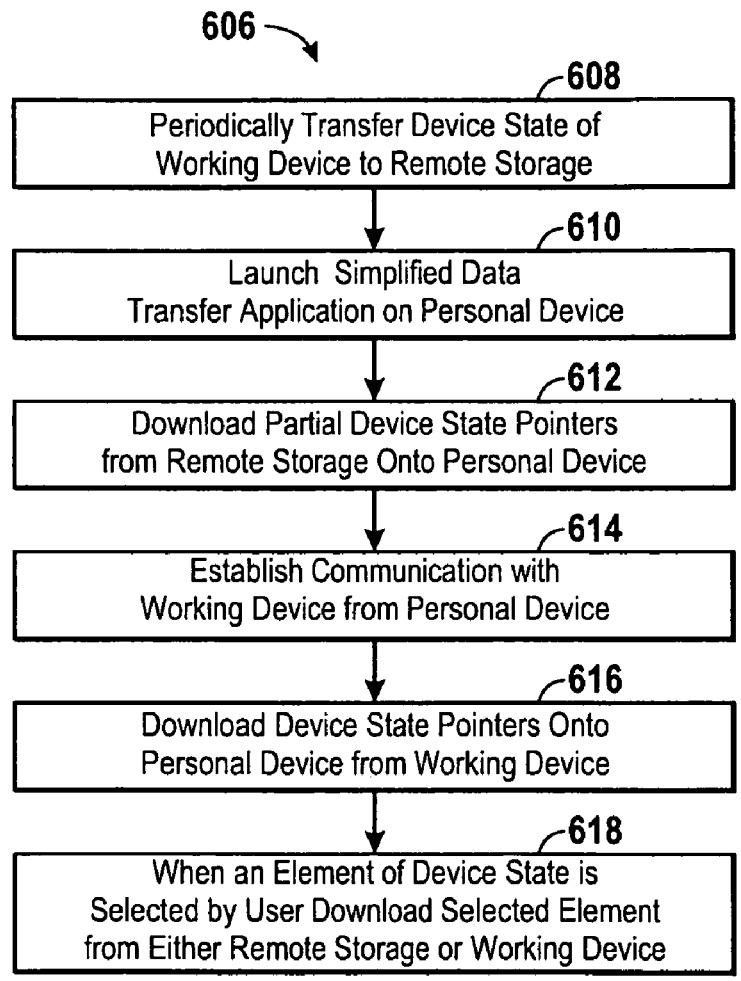
FIG. 41 is a flowchart describing an embodiment of a method for performing the simplified data transfer of FIG. 40.

Many variations on the disclosed techniques may be employed to enable a user to transfer data between devices in a simplified manner. FIGS. 37-38 represent one variation of the above-described techniques, in which the personal device 122 may obtain data from a partial device state of the working device 120 via the remote storage 460. FIGS. 39-41 represent another variation of the above-described techniques, in which the personal device 122 may obtain the data from the partial device state via the remote storage 460, as well as obtain other data from the device state via the working device 120 directly. FIGS. 43-47 represent screens that may be displayed on the working device 120 or the personal device 122 regarding the variations of the above-described techniques.

Turning first to FIG. 37, a transfer diagram 570 illustrates a manner in which the personal device 122 may obtain data from a partial device state of the working device 120 via the remote storage 460. In the transfer diagram 570, rather than transfer the entire device state 62, the working device 120 may transfer only certain selected elements of the device state 62, referred to herein as a partial device state 572. The partial device state 572 may include files that are recently opened and/or saved, web history, music, photos, etc. By way of example, the partial device state 62 may be sent to the remote storage 460 by a standalone application, a function integrated into an existing application (e.g., the media management application 90 or the backup application 94), or a function integrated into the operating system of the working device 120.

Sending only the partial device state 572 may limit the total amount of data retained by the remote storage 460 at a given time. To further limit excessive data stored on the remote storage 460, total available storage and the amount of time that the partial device state 572 is retained by the remote storage 460 may be limited. For example, the remote storage 460 may limit each user to approximately 500 MB and may retain the partial device state 572 for up to 5 days.

To retrieve an individual item of the partial device state 572 of the working device 120, the personal device 122 may download a list of partial device state pointers 574 from remote storage 460 upon the launch of the simplified data transfer application. The partial device state pointers 574 may represent an index of the partial device state 572 that may reside on the remote storage 460. The simplified data transfer application may enable the personal device 122 to select individual files from the partial device state 572. The personal device 122 may send a request 576 for a selected item based on the partial device state pointers 574, and the remote storage 460 may respond by transferring the request element 578 to the personal device 122. It should be appreciated that the working device 120 and the personal device 122 may connect to the remote storage 460 over the Internet 168 in the manner described in FIG. 13.

FIG. 38 represents a flowchart 580 describing a technique for carrying out a simplified data transfer in the manner of FIG. 38. In a first step 582, the working device 120 may periodically transfer the partial device state 572 to the remote storage 460. By way of example, the working device 120 may encrypt and transfer certain elements of the device state 62 as a user of the working device 120 views or makes changes to the files. For example, as the user opens or saves documents, opens or views web pages, listens to music, or views photos, such files may be encrypted and transferred as the partial device state 572 to the remote storage 460. The remote storage 460 may retain the partial device state 572 from the working device 120 for a limited time (e.g., five days) and with limited storage capacity (e.g., 500 MB/user).

When a user of the personal device 122 desires to remotely obtain a file recently viewed or saved on the working device 120, the user may launch the simplified data transfer application on the personal device 122 in step 584. In step 586, the personal device 122 may download the partial device state pointers 574, which may represent an index of all files uploaded to the remote storage 460 by the working device 120 during the most recent five days. The simplified data transfer application may display the partial device state pointers 574 in a manner sufficient to enable the user of the personal device 122 to select the desired file. In step 588, after the user has selected the desired file, the personal device 122 may download the file by requesting the file from the remote storage 460, which may thereafter transfer the file to the personal device 122.

As noted above, FIGS. 39-41 represent another variation of the above-described techniques, in which the personal device 122 may obtain the data from the partial device state via the remote storage 460, as well as obtain other data from the device state via the working device 120 directly. Turning first to FIG. 39, a flowchart 590 describes a technique for using the web service 170 to establish a direct connection between the working device 120 and the personal device 122 via the Internet 168. In a first step 592, an application on the working device 120 may determine the internet protocol (IP) address of the working device 120 as assigned by an Internet service provider (ISP) that may be providing Internet access to the working device 120.

In step 594, having obtained the IP address of the working device 120, the application running on the working device 120 may establish communication with the web service 170. The web service 170 may maintain a domain name system (DNS) registry of working devices 120. The application running on the working device 120 may update the DNS registry of the web service 170 to accurately reflect the IP address determined in step 592.

If a user desires to establish a direct connection between the user's personal device 122 and working device 120, the personal device 122 may contact the web service 170 in step 596. The personal device 122 may request the IP address of the working device 120 from the DNS registry of the web service 170. In step 598, after obtaining the IP address of the working device 120, the personal device 122 may connect to the working device 120 using the retrieved IP address and a predetermined port number. Thus, the method of the flowchart 590 may enable the personal device 122 to establish a direct connection to the working device 120.

Turning to FIG. 40, a simplified transfer diagram 600 illustrates a manner in which the direct connection described in the flowchart 590 may enhance the simplified data transfer techniques of FIGS. 37-38. In the simplified transfer diagram 600, the personal device 122 may retrieve files from the partial device state 572 from the remote storage 460 in the manner of FIG. 37. Using the method of the flowchart 590, however, the personal device 122 may further establish a direct connection to the working device 122. Thus, as illustrated in the simplified transfer diagram 600, the personal device 122 may additionally retrieve files from the device state 62 of the working device, which may not necessarily be present in the partial device state 572 of the remote storage 460.

To retrieve such files, the personal device 122 may initially launch the simplified data transfer application. During an initialization, the simplified data transfer application on the personal device 122 may download the device state pointers 208 directly from the working device 122. In combination with the partial device state pointers 574 downloaded from the remote storage 460, the personal device may thus be capable of retrieving a variety of files. When the user selects a given file to retrieve, the personal device 122 may contact either the working device 122 with a request 602 or the remote storage 460 with a request 576, depending on where the requested file may be located. If the file is found only on the working device 122, the working device 122 may respond by transferring the requested file in a message 604. Otherwise, the remote storage 460 may transfer the requested file in a message 578.

FIG. 41 represents a flowchart 606, which may describe a method for carrying out a simplified data transfer in the manner of FIG. 40. Steps 608, 610, and 612 of the flowchart 606 may take place in substantially the same manner as steps 582, 584, and 586 of the flowchart 580 of FIG. 38. However, in step 614, the personal device 122 may additionally establish a direct connection to the working device 120 using the method of the flowchart 590 if the working device 120 is currently on and available over the Internet. In a subsequent step 616, the personal device 122 may download from the working device 122 the list of device state pointers 208, which may include files not available in the partial device state 572 that may reside on the remote storage 460.

Upon completion of step 616, the personal device 122 may display a mixed list of files from both the partial device state pointers 574 from the remote storage 460 and the device state pointers 208 from the working device 120. A user may be able to select a desired file from among the list. In step 618, the personal device 122 may request and receive the desired file from either the working device 120 or the remote storage 460.

FIGS. 42-47 may represent screens that may be displayed on the working device 120 or the personal device 122 while performing the techniques described above. Particularly, FIGS. 42-43 may represent preferences for an application that may run on the working device 120 to periodically transfer the partial device state 572 to the remote storage 460. FIGS. 44-47 may represent screens displayed on the personal device 122 while displaying the partial device state pointers 574 from the remote storage 460 or the device state pointers 208 from the working device 120.

Figure 42:
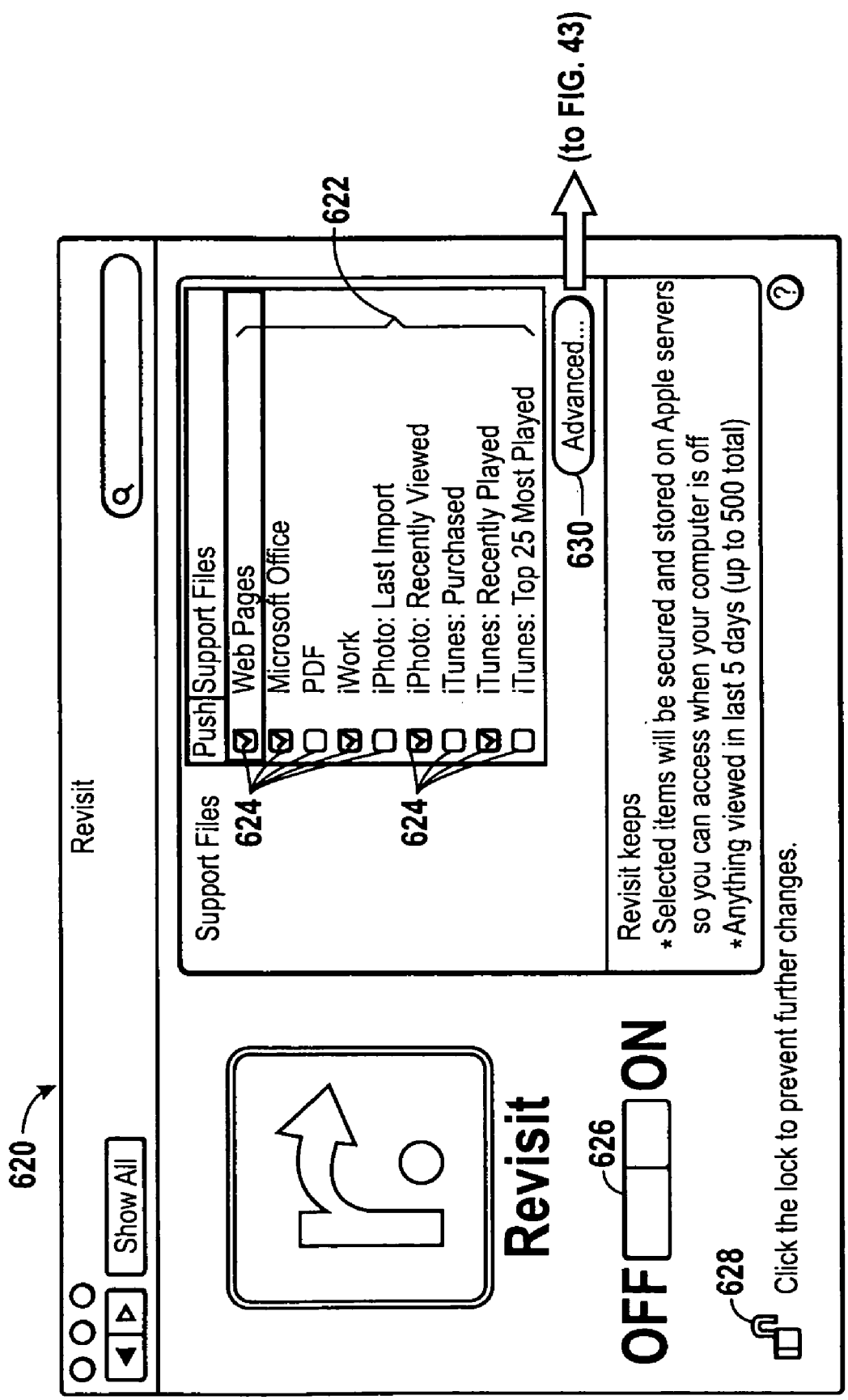
FIG. 42 is a schematic of a screen that may be displayed on a working device for the simplified data transfer of FIG. 37 or FIG. 40.

Turning to FIG. 42, a preference screen 620 may be displayed on an application running on the working device 120 to determine settings for periodically updating the remote storage 460 with the partial device state 572. The screen 620 may include a series of list items 622 having corresponding checkboxes 624. The list items 622 and corresponding checkboxes 624 may enable a user to select particular file types that may be encrypted and sent to the remote storage 460 from the working device 120. Such file types may include, for example, web pages; Microsoft Office documents; PDF documents; iWork® documents; iPhoto® files based on events, such as the last imported photos or recently viewed photos; or iTunes files based on events, such as iTunes media files recently purchased or recently played, or files among the top 25 files played on the working device 120. A button 626 may enable a user to set whether or not the working device 120 may periodically update the remote storage 460, and a button 628 may enable the user to lock desired settings in place. A button 630, labeled "Advanced . . . ," may enable certain advanced preferences, as described below.

Figure 43:
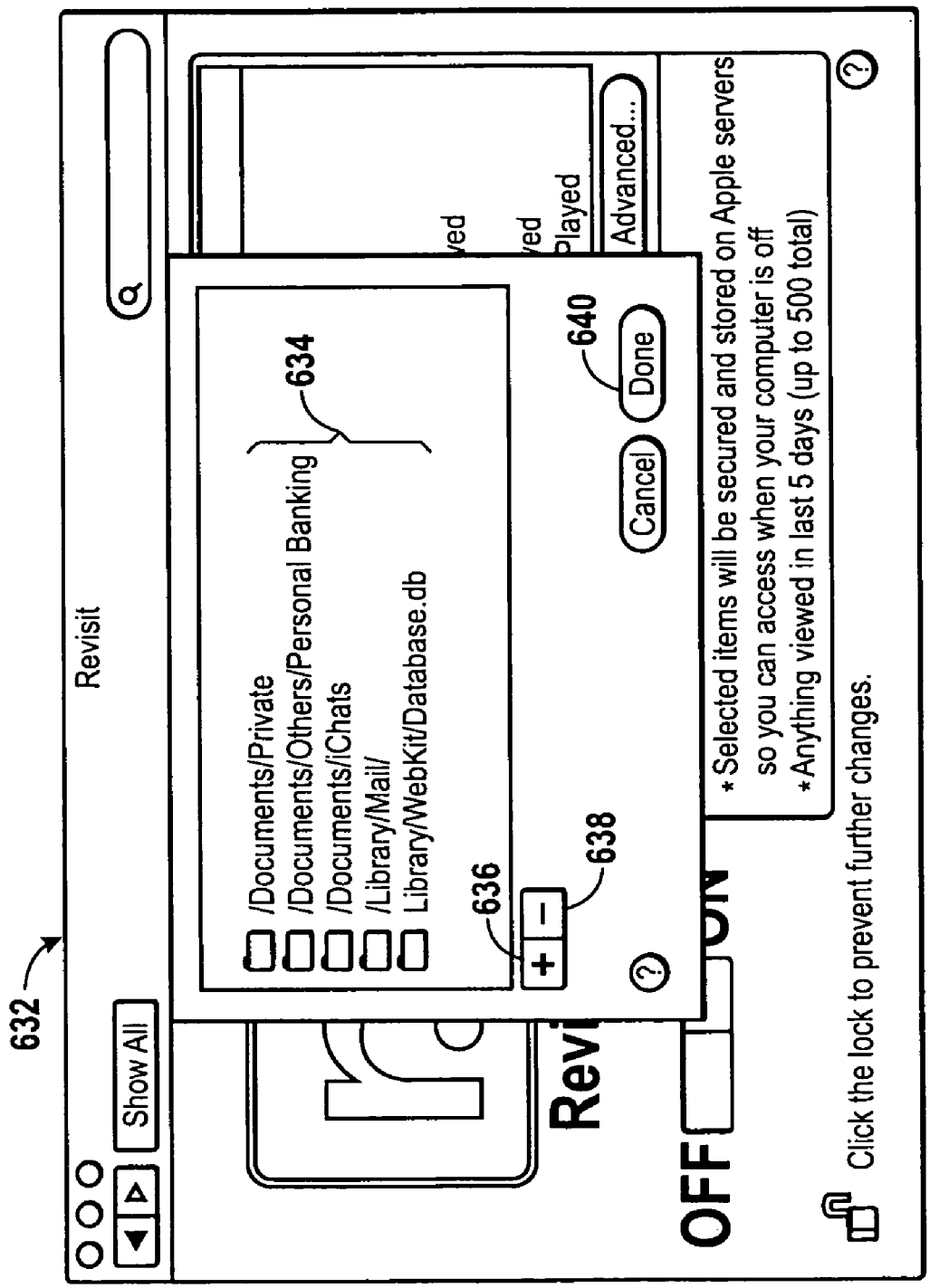
FIG. 43 is a schematic of another screen that may be displayed on a working device for the simplified data transfer of FIG. 37 or FIG. 40.

FIG. 43 may illustrate a screen 632 that may be displayed when a user selects the button 630, labeled "Advanced . . . ." The screen 632 may display a series of list items 634, which may represent selected folders of the working device 120 that may not be included in the transfer of the partial device state 572. For example, such list items 634 may include folders containing private documents, banking documents, iChat® conversations, email messages, or certain work-related files. A button 636 may enable the user to exclude additional folders by adding them to the list items 634. Similarly, a button 638 may enable the user to delete any of the list items 634 that the user may want synchronized onto the remote storage 460. To conclude any changes to the screen 632, the user may select a button 640, labeled "Done."

It should be appreciated that the functionality provided by the software described in FIGS. 42-43 may be implemented in a variety of ways. For example, rather than include all functionality in a single application on the working device 120, the functionality may be distributed across many applications. A photo management application, such as iPhoto®, may automatically cache recently viewed or modified image files to the remote storage 460; a media management application, such as iTunes®, may automatically cache recently played songs to the remote storage 460; a web browser, such as Safari®, may automatically cache recently viewed web pages to the remote storage 460; and/or productivity software, such as Keynote®, may automatically cache recently viewed or modified documents to the remote storage 460.

Figure 44C:
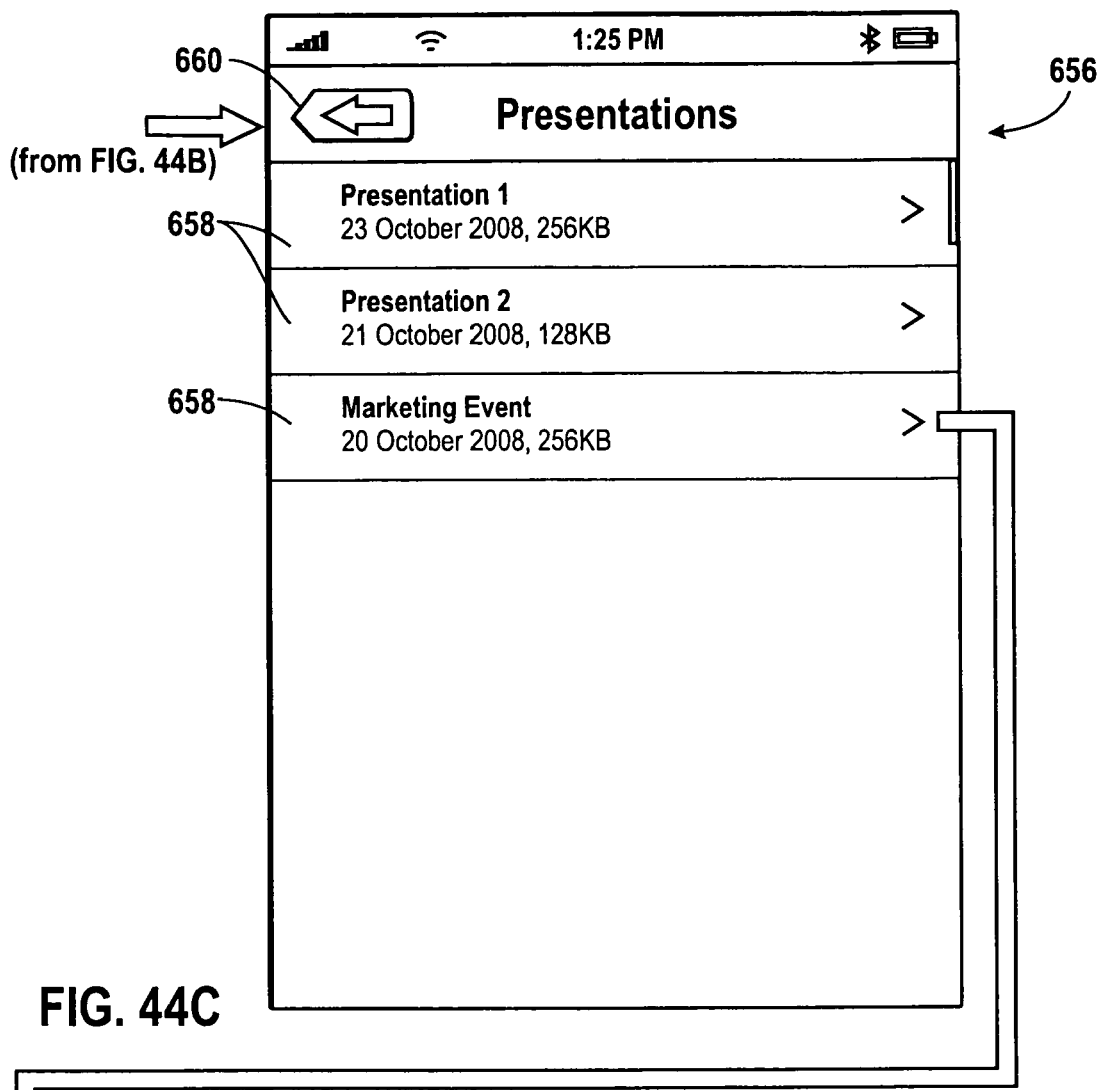
Figure 44D:
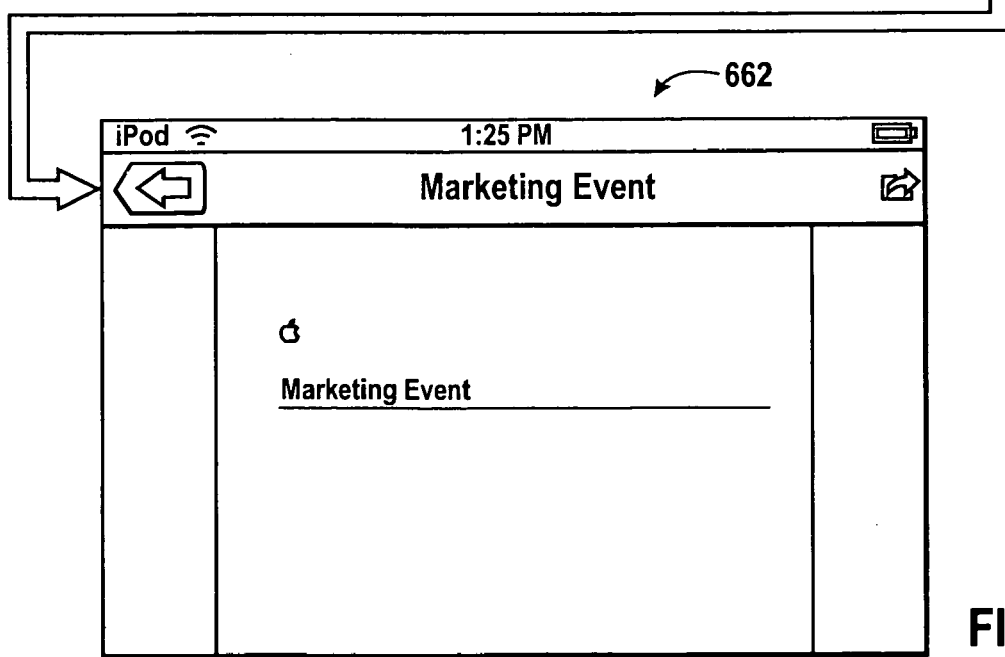

FIGS. 44A-D may illustrate screens that may be displayed on the personal device 122, representing how different types of files from the device state 62 of the working device 120 or the partial device state 572 residing on the remote storage 460 may be obtained on the personal device 122. Turning first to FIG. 44A, a screen.642 may represent a home screen of the personal device 122, which may be, for example, the handheld device 40. When the simplified data transfer application icon 40 is selected, the simplified data transfer application may launch. As should be appreciated, upon the launch of the simplified data transfer application, the personal device 122 may download the partial device state pointers 572 from the remote storage 460 and/or the device state pointers 208 from the working device 120.

As illustrated in FIG. 44B, the handheld device 40 may display a screen 644 when the icon 40 is selected. The screen 644 may include a series of icons 646-652, respectively labeled "Documents," "Web," "Photos," and "Music." As shown in FIG. 44B, the screen 644 may be displayed when the icon 646 labeled "Documents" is selected and highlighted, and a corresponding series of list items 654 may represent various types of document files from the partial device state pointers 572 or the device state pointers 208. A button 655, labeled "Settings," may enable the user to enable certain settings, as described above with reference to FIG. 12.

Selecting the list item 654 labeled "Keynote" may cause the handheld device 40 to display a screen 656, as illustrated in FIG. 44C. The screen 656 may include list items 658 representing Keynote® presentations that may reside on either the remote storage 460 or the working device 120. A button 660 may enable the user to navigate back to the screen 644 of FIG. 44B. When the user selects from among the list items 658, the personal device 122 may request and receive the selected file from either the working device 120 or the remote storage 460. By way of example, the user may select the list item 658 labeled "Marketing Event." In response, the personal device 122 may download the corresponding presentation file. As illustrated by a screen 662 of FIG. 44D, the selected presentation file may thereafter be displayed on the personal device 122.

Figure 45C:
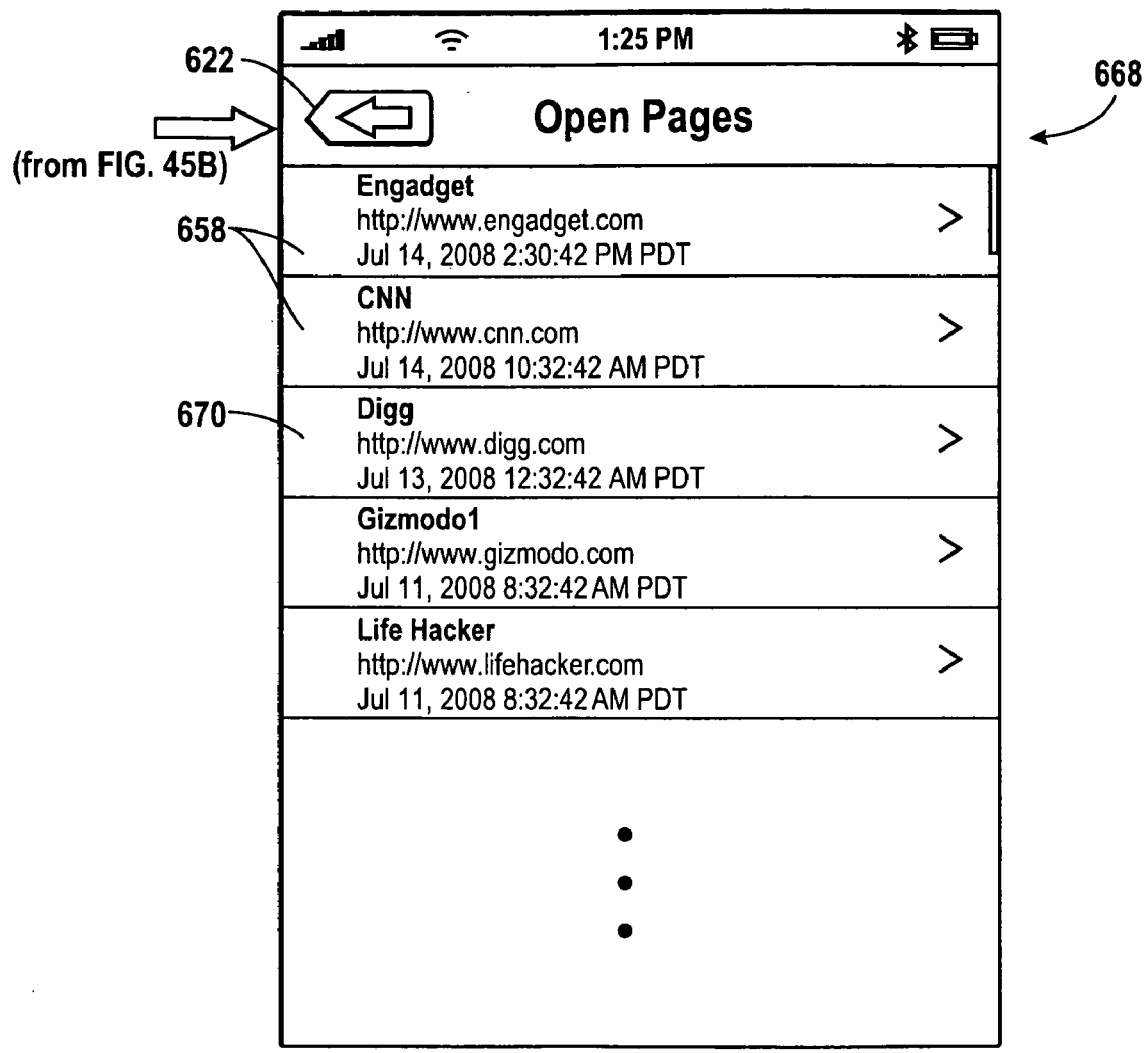

FIGS. 45A-C may also illustrate screens that may be displayed on the personal device 122, representing how different types of files from the device state 62 of the working device 120 or the partial device state 572 residing on the remote storage 460 may be obtained on the personal device 122. Turning first to FIG. 45A, a user may select the simplified data transfer application icon 40 of the screen 642, which may cause the simplified data transfer application may launch. As should be appreciated, upon the launch of the simplified data transfer application, the personal device 122 may download the partial device state pointers 572 from the remote storage 460 and/or the device state pointers 208 from the working device 120.

As illustrated in FIG. 45B, the handheld device 40 may display a screen 664 when the icon 40 is selected and the icon 648, labeled "Web," is also selected. A corresponding series of list items 666 may represent various types of web-related files from the partial device state pointers 572 or the device state pointers 208. The button 655, labeled "Settings," may enable the user to enable certain settings, as described above with reference to FIG. 12.

Selecting the list item 666 labeled "Web Pages" may cause the handheld device 40 to display a screen 668, as illustrated in FIG. 45C. The screen 668 may include list items 670 representing recently viewed web pages that may reside on either the remote storage 460 or the working device 120. A button 672 may enable the user to navigate back to the screen 644 of FIG. 44B. When the user selects from among the list items 658, the personal device 122 may request and receive the selected file from either the working device 120 or the remote storage 460.

FIGS. 46A-B may also illustrate screens that may be displayed on the personal device 122, representing how different types of files from the device state 62 of the working device 120 or the partial device state 572 residing on the remote storage 460 may be obtained on the personal device 122. Turning first to FIG. 46A, a user may select the simplified data transfer application icon 40 of the screen 642, which may cause the simplified data transfer application may launch. As should be appreciated, upon the launch of the simplified data transfer application, the personal device 122 may download the partial device state pointers 572 from the remote storage 460 and/or the device state pointers 208 from the working device 120.

As illustrated in FIG. 46B, the handheld device 40 may display a screen 674 when the icon 40 is selected and the icon 650, labeled "Photos," is also selected. A corresponding series of list items 676 may represent categories of photos from the partial device state pointers 572 or the device state pointers 208. The button 655, labeled "Settings," may enable the user to enable certain settings, as described above with reference to FIG. 12. Selecting each list item 666 may cause the handheld device 40 to correspondingly display lists of photos of the selected category, which may thereafter be downloaded in the manner described above.

Figure 47E:
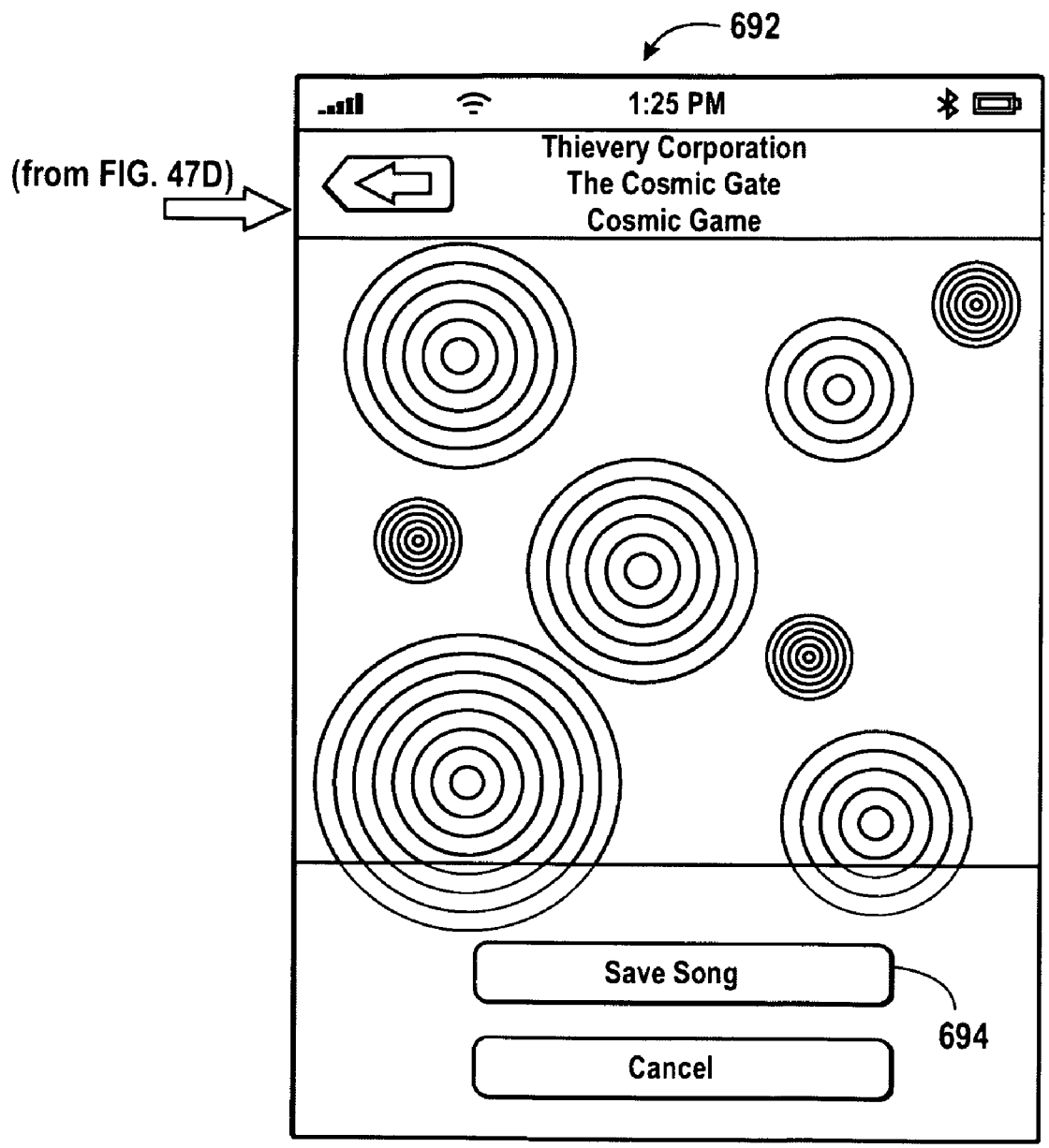

FIGS. 47A-E may also illustrate screens that may be displayed on the personal device 122, representing how different types of files from the device state 62 of the working device 120 or the partial device state 572 residing on the remote storage 460 may be obtained on the personal device 122. Turning first to FIG. 47A, a user may select the simplified data transfer application icon 40 of the screen 642, which may cause the simplified data transfer application may launch. As should be appreciated, upon the launch of the simplified data transfer application, the personal device 122 may download the partial device state pointers 572 from the remote storage 460 and/or the device state pointers 208 from the working device 120.

As illustrated in FIG. 47B, the handheld device 40 may display a screen 678 when the icon 40 is selected and the icon 652, labeled "Music," is also selected. A corresponding series of list items 680 may represent playlists of music from the partial device state pointers 572 or the device state pointers 208. The button 655, labeled "Settings," may enable the user to enable certain settings, as described above with reference to FIG. 12.

Selecting the list item 680 labeled "Purchased" may cause the handheld device 40 to display a screen 682, as illustrated in FIG. 47C. The screen 682 may include list items 684 representing purchased media files that may reside on either the remote storage 460 or the working device 120. A button 684 may enable the user to navigate back to the screen 644 of FIG. 47B. When the user selects a song from among the list items 684, the personal device 122 may request and receive the selected file from either the working device 120 or the remote storage 460. By way of example, the user may select the list item 684 labeled "The Cosmic Gate." In response, the personal device 122 may download or stream the corresponding media file.

As illustrated by a screen 688 of FIG. 47D, the selected presentation file may thereafter be playable on the personal device 122. On the screen 688, a button 684 may enable the user to navigate back to the screen 682 of FIG. 47C. If a user selects a button 690 of the screen 688, the personal device 122 may display a screen 692, as illustrated in FIG. 47E. The screen 692 may include a button 694, labeled "Save Song." Selecting the button 694 may enable the user to save the media file onto the personal device 122. It should be appreciated that saving the media onto the personal device 122 may involve storing the file in the nonvolatile storage 16, such that the file may remain on the personal device 122 after the connection to either the working device 120 or the remote storage 460 has terminated. It should further be appreciated that any file received onto the personal device 122 may be saved in this manner from each native application that receives such files. For example, a photo application may enable saving received photos into the nonvolatile storage 16 in the manner music files may be saved, as described above.

It should be appreciated that the functionality provided by the software described in FIGS. 44-47 may be implemented in a variety of ways. For example, rather than include all of the above-described functionality in a single data transfer application on the personal device 122, the functionality may be distributed across many applications. Thus, an application associated with each type of file that may be retrieved may individually provide interaction with the remote storage 460 or the working device 120. For example, a photo management application on the personal device 122 may include a library called "Recently Viewed on My Desktop." Selecting the library may initiate the simplified data transfer to obtain from the remote storage 460 or the working device 120 an index of all photos recently viewed on the working device 120 and/or automatically transfer all or some of the photos. As should be understood, a media management application on the personal device 122, such as iPod®, may provide similar functionality relating to media files from the working device 120; a web browser on the personal device 122, such as Safari®, may provide similar functionality relating to web pages from the working device 120; and/or productivity software on the personal device 122, such as Keynote® or iWork®, may provide similar functionality relating to documents from the working device 120.

One or more specific embodiments of the present disclosure are described above. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

What is claimed is:

1. A method comprising:
sending a first message from an intermediate electronic device to a first media-playing electronic device playing a media file via near field communication;
receiving a response to the first message on the intermediate electronic device from the first media-playing device, wherein the response to the first message is configured to indicate the media file being played and a point at which the media file was being played when the first message was received by the first media-playing electronic device; and
sending a second message from the intermediate electronic device to a second media-playing electronic device via near field communication, wherein the second message is configured to indicate the media file being played and the point at which the media file was being played when the first message was received by the first media-playing electronic device, and wherein the second message is configured to enable the second media-playing electronic device to begin to play at least a portion of the media file at the point at which the media file was being played on the first media-playing device.

2. The method of claim 1, wherein the first message is sent when an application is launched on the intermediate electronic device.

3. The method of claim 1, wherein the first message is sent via near field communication when the intermediate electronic device is tapped to the first media-playing electronic device and wherein the second message is sent via near field communication when the intermediate electronic device is tapped to the second media-playing electronic device.

4. The method of claim 1, wherein the intermediate electronic device is configured not to play back the media file.

5. The method of claim 1, wherein the intermediate electronic device comprises a remote control, a game controller, or both.

6. The method of claim 1, wherein the response is received via a personal area network, a local area network, a wide area network, or a near field communication channel, or any combination thereof.

7. The method of claim 1, wherein the second message is configured to cause the second media-playing electronic device to determine whether the media file is stored locally on the second media-playing electronic device.

8. The method of claim 7, wherein sending the second message is configured to cause the second media-playing electronic device to issue a request to the first media-playing electronic device for the media file when the media file is determined not to be stored locally on the second media-playing electronic device.

9. The method of claim 8, wherein the request to the first media-playing electronic device is configured to cause the first media-playing electronic device to issue a response to the request, wherein the response to the request comprises a stream of at least a portion of the media file.

10. The method of claim 9, wherein sending the second message is configured to cause the second media-playing electronic device to play at least the portion of the streamed media file.

11. The method of claim 8, wherein the request to the first media-playing electronic device is configured to cause the first media-playing electronic device to issue a response to the request, wherein the response to the request comprises at least a portion of the media file.

12. The method of claim 7, sending the second message is configured to cause the second media-playing electronic device to play a local version of the media file when the media file is determined to be stored locally on the second media-playing electronic device.

13. The method of claim 1, wherein sending the second message is configured to cause the second media-playing electronic device to begin to play at least the portion of the media file, wherein the media file comprises audio, video, or a combination thereof.

14. A destination electronic device comprising:
a processor configured to run a data transfer application;
a memory device operably coupled to the processor and configured to store pointers associated with a media file playing or paused on a source electronic device, wherein pointers identify the media file and a location at which the media file was playing or paused;
an electronic display configured to display a user-selectable prompt based on the pointers;
an input/output interface configured to register a user selection of the media file from the user-selectable prompt; and
a network interface configured to download the pointers, from an intermediate electronic device that had received the pointers via a near field communication transfer with the source electronic device, when the simplified data transfer application is launched on the destination electronic device, to request at least a portion of the user-selected media file from the source electronic device directly or via a remote data storage, and to receive the at least portion of the media file selected by the user from the source electronic device or the remote data storage location.

15. The device of claim 14, wherein the processor is configured to run a media management application and the media management application is configured to play back the at least portion of the media file at a point where the media file was playing or paused on the source electronic device.

16. The device of claim 14, wherein the network interface is configured to receive the requested at least portion of the media file, wherein the media file comprises audio, video, or a combination thereof.

17. The device of claim 14, wherein the network interface comprises a near field communication interface, a personal area network interface, a local area network interface, a wide area network interface, or a combination thereof.

18. The device of claim 17, wherein the pointers are downloaded via the near field communication interface when the destination electronic device and the intermediate electronic device are tapped together.

19. The device of claim 14, wherein the electronic device comprises a portable phone or a handheld computer, or both.

20. A system comprising:
a first media-playing electronic device configured to transfer pointers associated with a media file playing on the first media-playing electronic device in response to a first message and configured to transfer at least a portion of the media file in response to a second message;

an intermediate electronic device configured to send the first message when the intermediate electronic device is tapped to the first media-playing electronic device, receive the pointers from the first media-playing electronic device, and transfer the pointers in response to a third message; and a second media-playing electronic device configured to send the third message, to receive the pointers from the intermediate electronic device, to send the second message, to receive the at least portion of the media file from the first media-playing electronic device, and to play the media file at a point at which the media file was being played when the first message was received by the first media-playing electronic device.

21. The system of claim 20, wherein the first media-playing electronic device is configured to receive the first message via near field communication.

22. The system of claim 20, wherein the first media-playing electronic device is configured to transfer the at least portion of the media file in a streaming format.

23. A method comprising:

playing a media file on a first media-playing electronic device;

receiving a first message on the first media-playing electronic device from an intermediate electronic device when the intermediate electronic device and the first media-playing electronic device are tapped together;

pausing the media file on the first media-playing electronic device when the first message is received;

sending from the first media-playing electronic device to the intermediate electronic device an identification of the media file and a point at which the media file is paused;

receiving a second message on the first media-playing electronic device from a second media-playing electronic device after the second media-playing electronic device has received from the intermediate electronic device the identification of the media file and the point at which the media file is paused; and sending at least a portion of the media file from the first media-playing electronic device to the second media-playing electronic device after receiving the second message.

24. The method of claim 23, wherein playing the media file comprises playing audio, video, or a combination thereof.

25. The method of claim 23, wherein the first message is received via near field communication.

26. The method of claim 23, wherein the second message is received via communication other than near field communication.

27. A method comprising:

tapping a near field communication interface of a first electronic device to a near field communication interface of a second electronic device, wherein the second electronic device is playing back a media file;

receiving pointers onto the first electronic device from the second electronic device, wherein the pointers are configured to identify the media file and a point at which the media file was being played back on the second electronic device when the near field communication interface of the first electronic device was tapped to the near field communication interface of the second electronic device;

tapping the near field communication interface of the first electronic device to a near field communication interface of a third electronic device; and transferring the pointers onto the third electronic device from the first electronic device such that the third electronic device can begin playing back the media file at the point at which the media file was being played back on the second electronic device when the near field communication interface of the first electronic device was tapped to the near field communication interface of the second electronic device.

28. The method of claim 27, wherein the pointers are received or transferred via near field communication.

29. The method of claim 27, wherein the pointers are received or transferred via communication other than near field communication.

30. The method of claim 27, comprising receiving at least a portion of the media file onto the first electronic device from the second electronic device and transferring the copy of the media file from the first electronic device to the third electronic device.

* * * * *

UNITED STATES PATENT AND TRADEMARK OFFICE
CERTIFICATE OF CORRECTION

| | | |
|---|---|---|
| PATENT NO. | : 8,401,681 B2 | Page 1 of 1 |
| APPLICATION NO. | : 12/286509 | |
| DATED | : March 19, 2013 | |
| INVENTOR(S) | : Rosenblatt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this
Fourth Day of November, 2014

Michelle K. Lee
*Deputy Director of the United States Patent and Trademark Office*